United States Patent [19]
Yasukawa et al.

[11] Patent Number: 5,422,962
[45] Date of Patent: Jun. 6, 1995

[54] METHOD AND APPARATUS FOR EXTRACTING LINE SEGMENTS FROM AN IMAGE OF AN OBJECT

[75] Inventors: Yusuke Yasukawa; Fumi Hasegawa; Yasushi Inamoto; Susumu Kawakami, all of Kawasaki, Japan

[73] Assignee: Fujitsu Limited, Kawasaki, Japan

[21] Appl. No.: 32,312

[22] Filed: Mar. 17, 1993

[30] Foreign Application Priority Data

Mar. 19, 1992 [JP] Japan .................. 4-063772
Mar. 19, 1992 [JP] Japan .................. 4-063773
Mar. 19, 1992 [JP] Japan .................. 4-064269

[51] Int. Cl.[6] .................. G06K 9/32; G06K 9/36
[52] U.S. Cl. .................. 382/295; 382/296
[58] Field of Search ............ 382/22, 41, 44-46, 382/48; 364/413.2, 725; G06K 9/48, 9/36, 9/32, 9/20; G06F 15/00, 7/38

[56] References Cited
U.S. PATENT DOCUMENTS 4,189,775 2/1980 Inouye et al. .................. 382/43
5,220,615 6/1993 Ishii et al. .................. 382/22

Primary Examiner—Jose L. Couso
Attorney, Agent, or Firm—Staas & Halsey

[57] ABSTRACT

A method of extracting a line segment contained in an original image includes the steps of clipping an image, which conforms to the size of a receptive field defining a small area, from the original image, projecting the clipped receptive-field image from a predetermined projection direction onto an axis ($p$ axis) that intersects the projection direction to obtain projection values at positions along the $p$ axis, subjecting the projection values to differentiation processing along the $p$ axis, similarly subjecting projection values, which are obtained by successively varying a projection-direction angle $\theta$ incrementally a predetermined amount, to differentiation processing along the $p$ axis to thereby obtain a differential value at each position on a $p$-$\theta$ plane, and extracting a line segment contained in the receptive-field image based upon a peak position $(p,\theta)$ of the differential values.

35 Claims, 67 Drawing Sheets

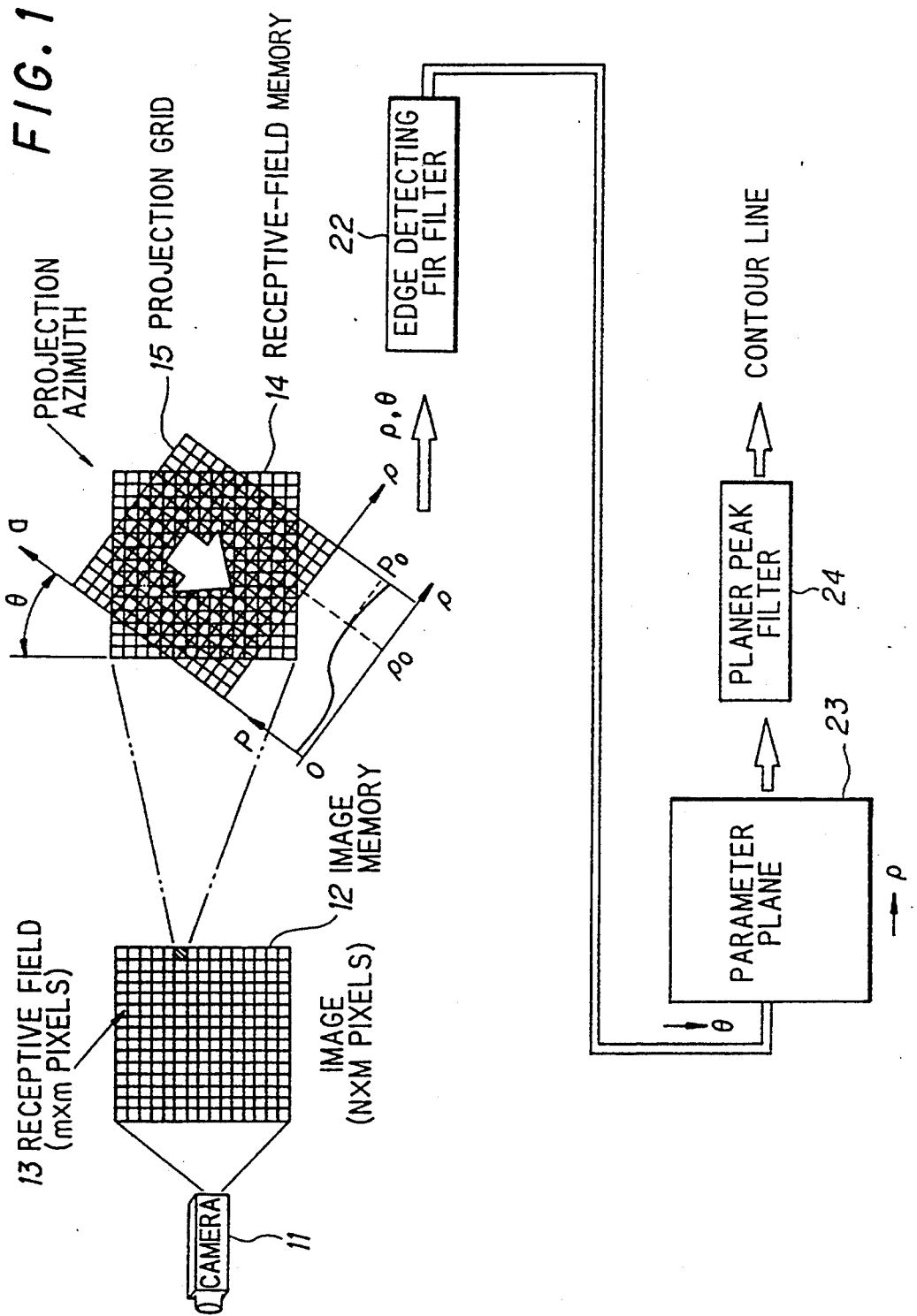

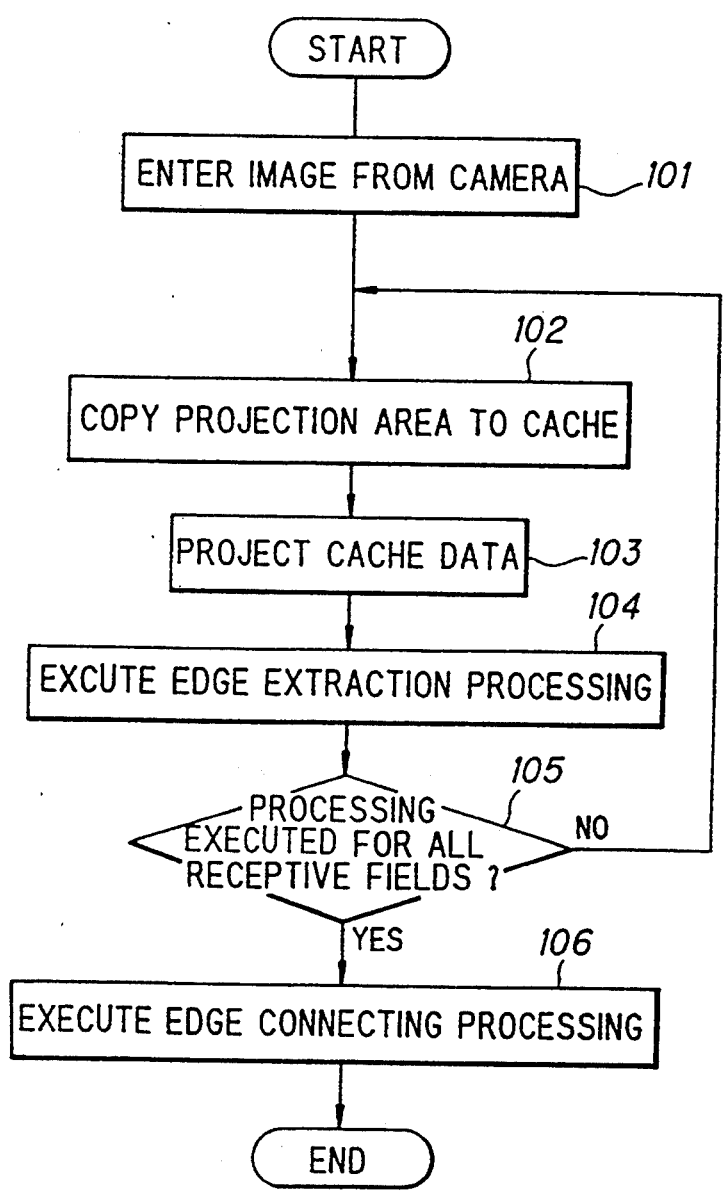

$K_1 = -1.5$
$K_2 = -1$
$K_3 = 0$
$K_4 = 1$
$K_5 = 1.5$

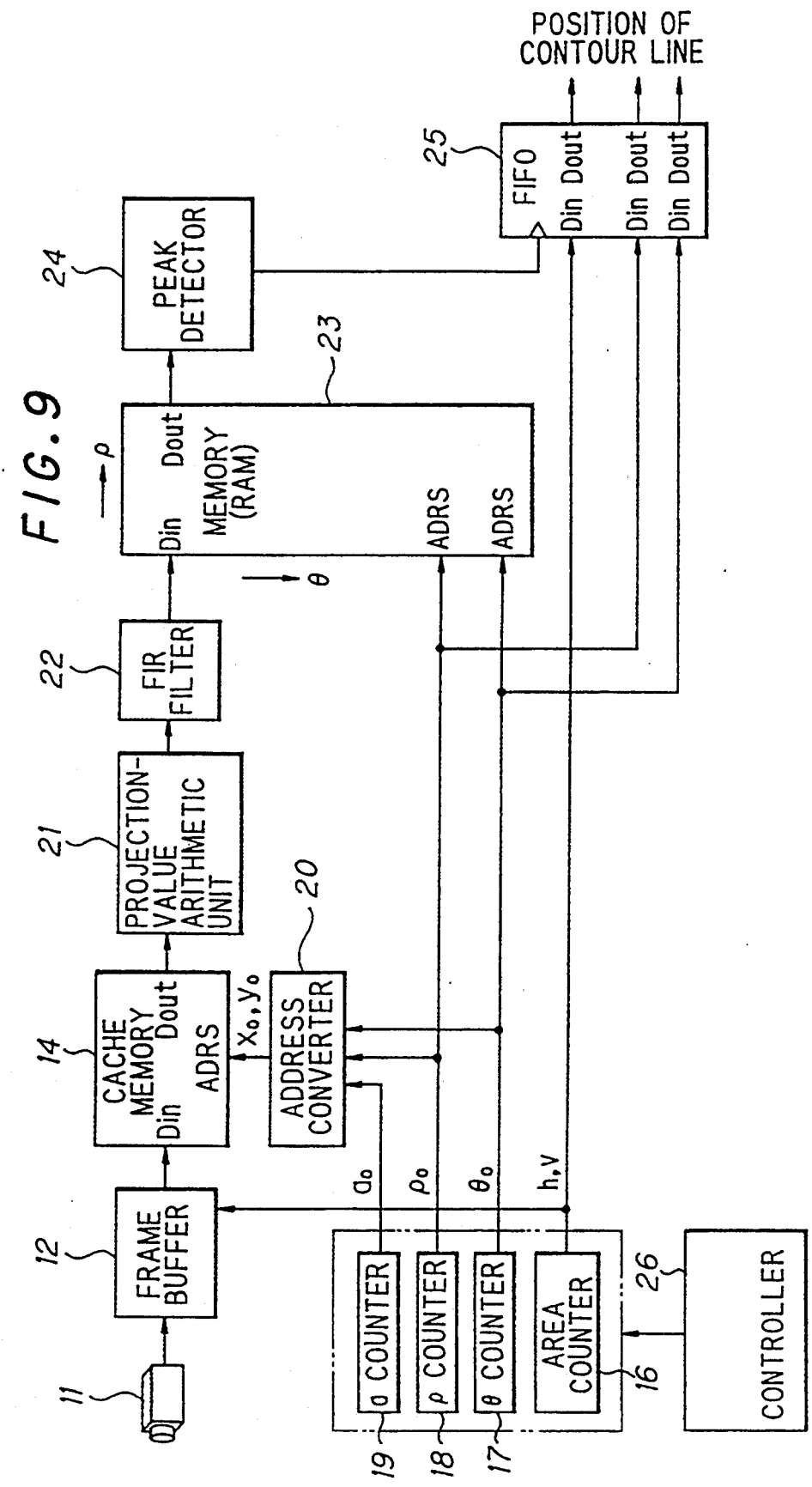

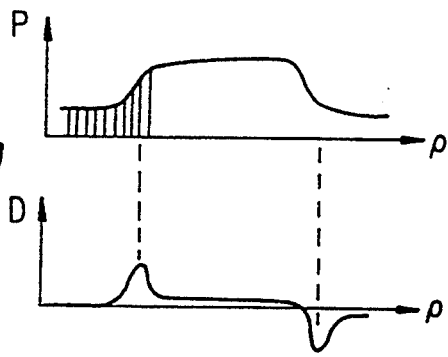
FIG. 13(a)
FIG. 13(b)
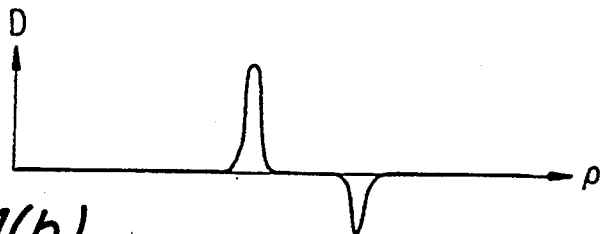
FIG. 14(a)
FIG. 14(b)

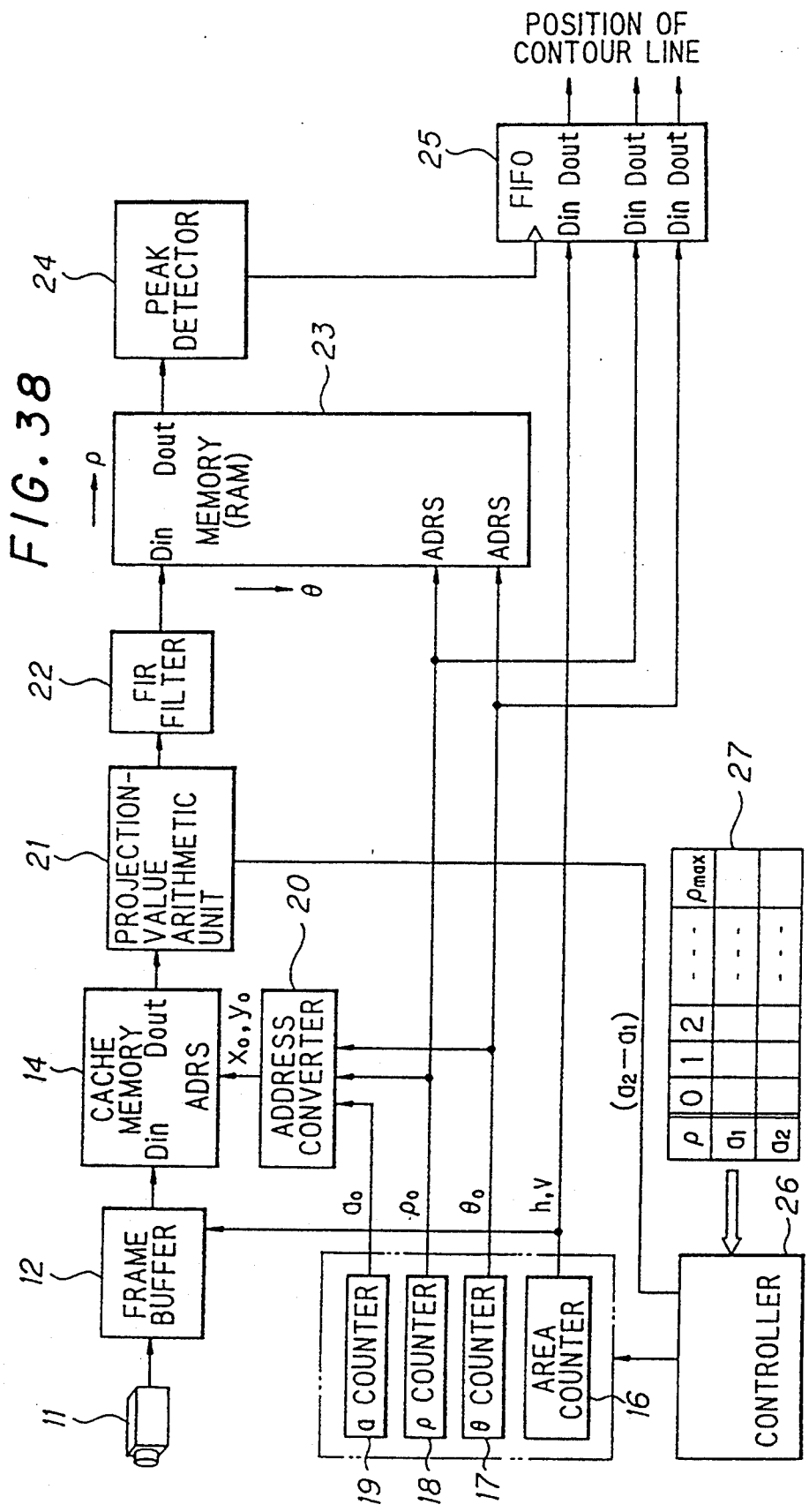

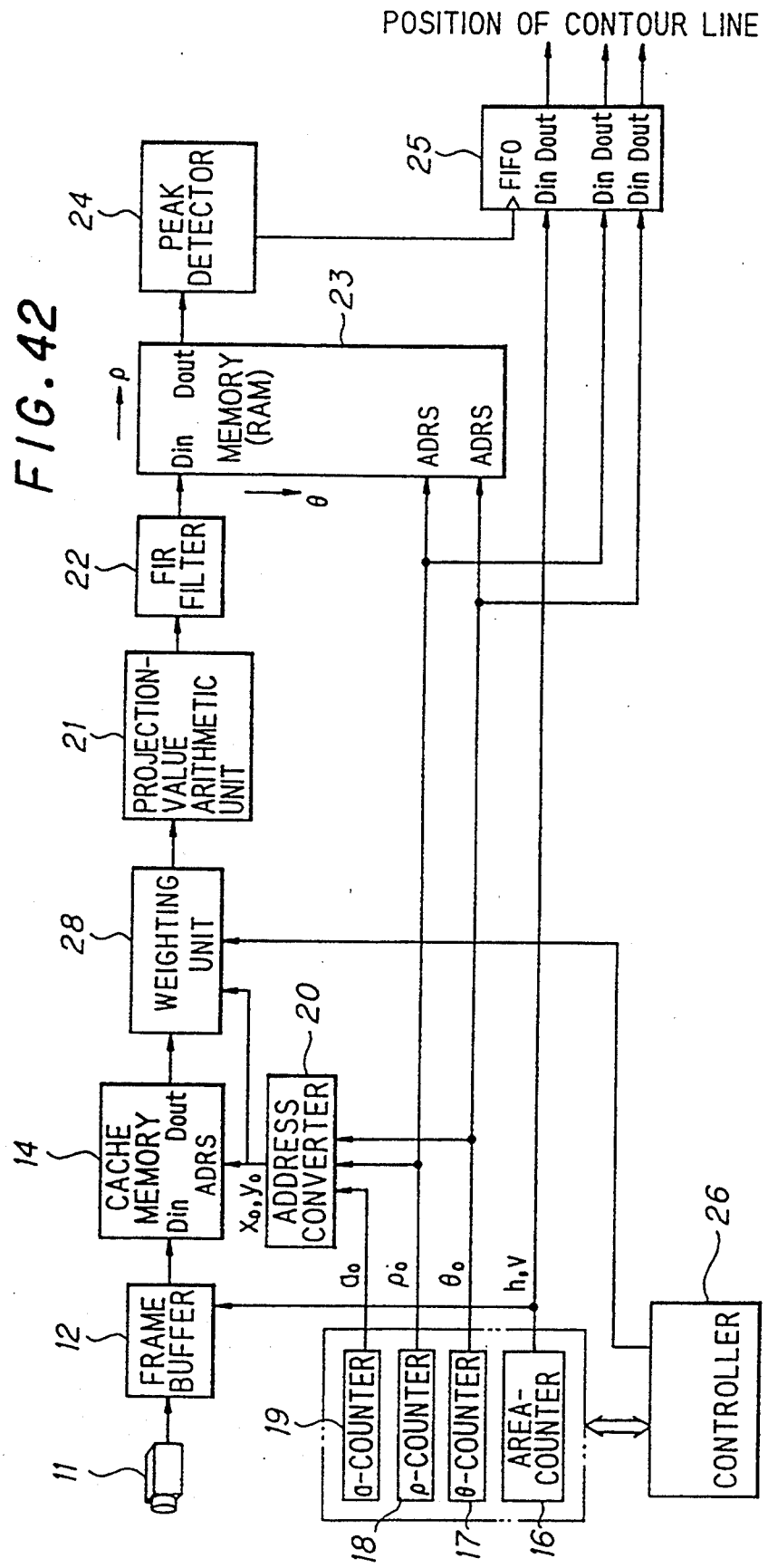

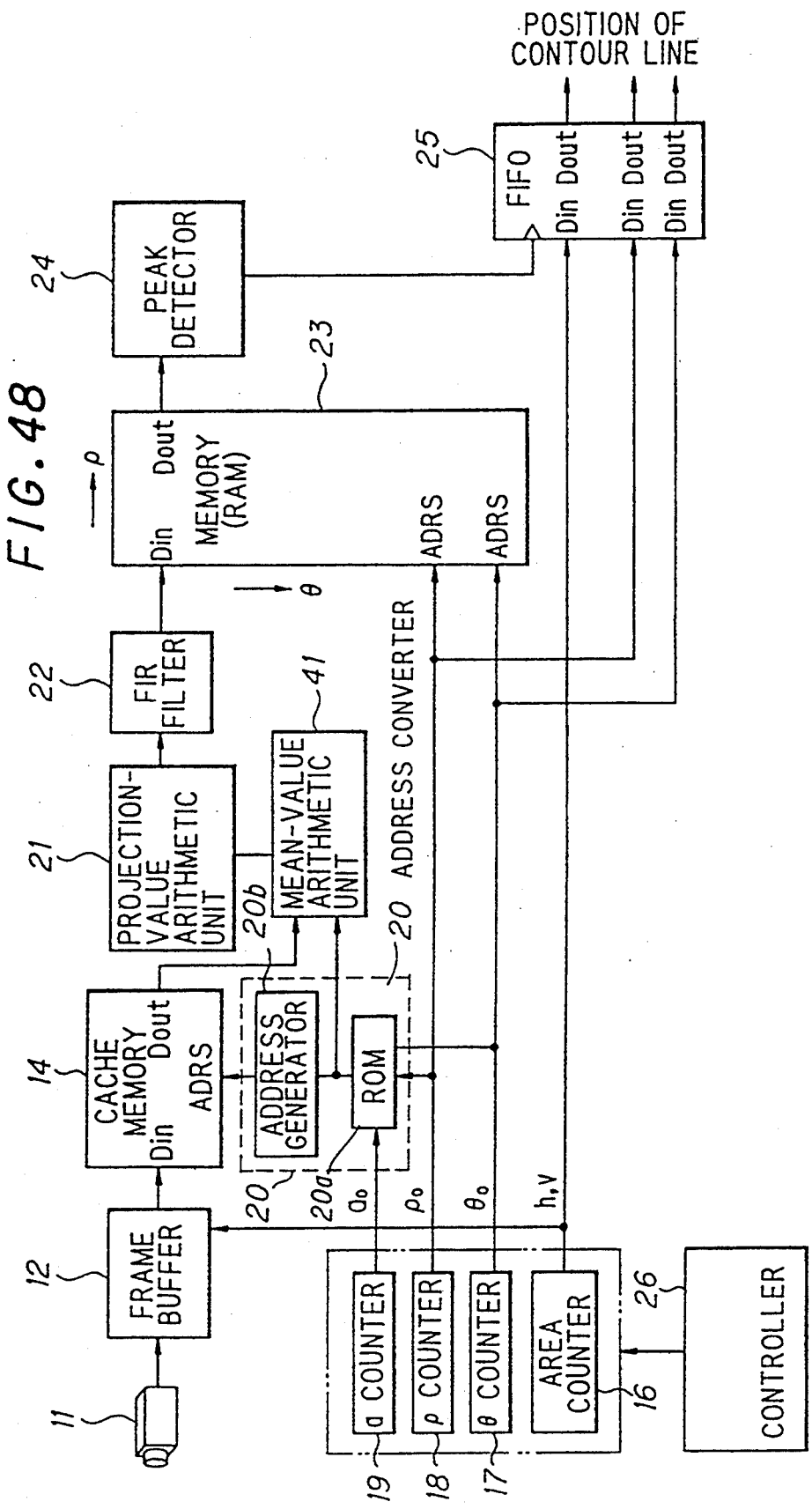

FIG.49(b) ENLARGED

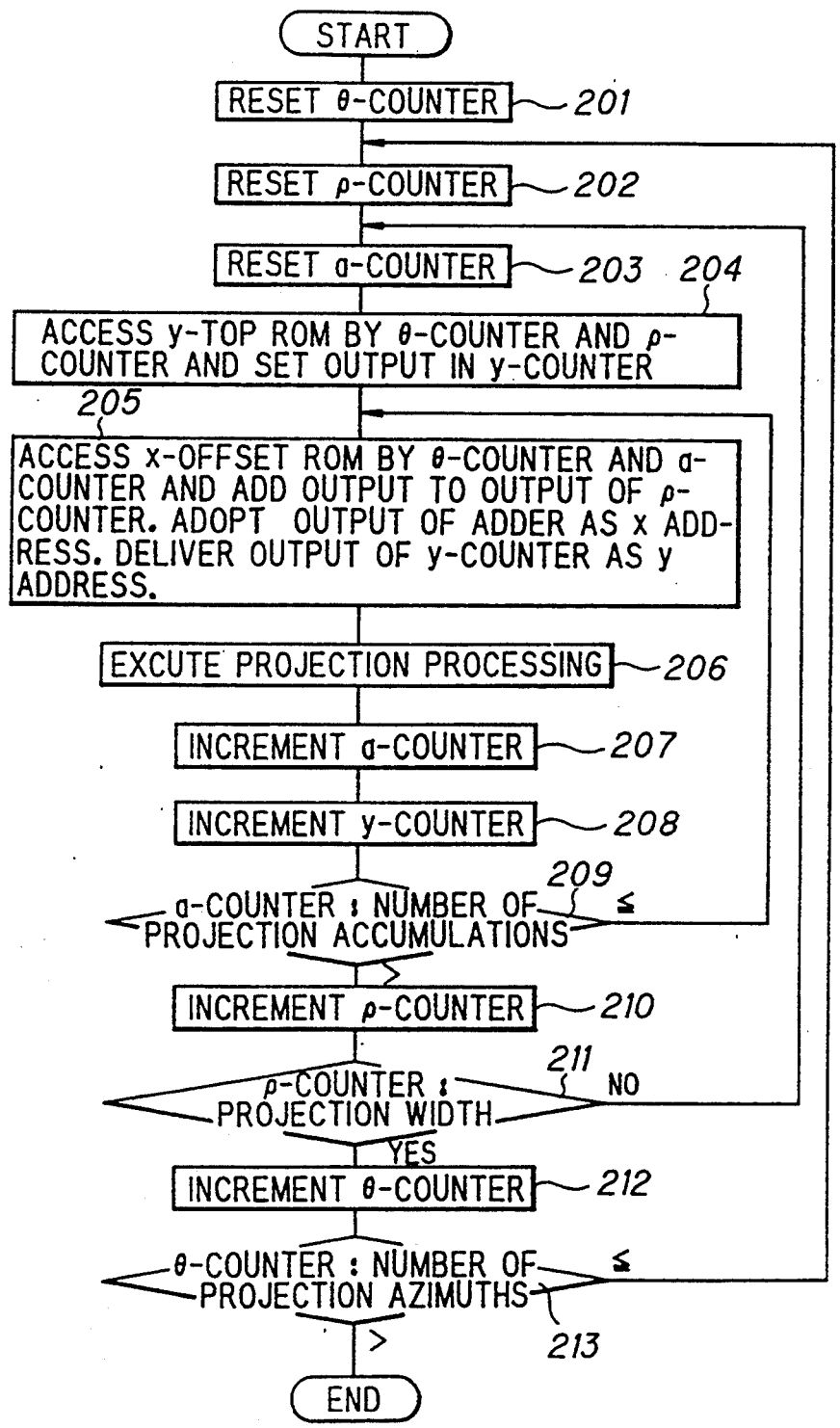

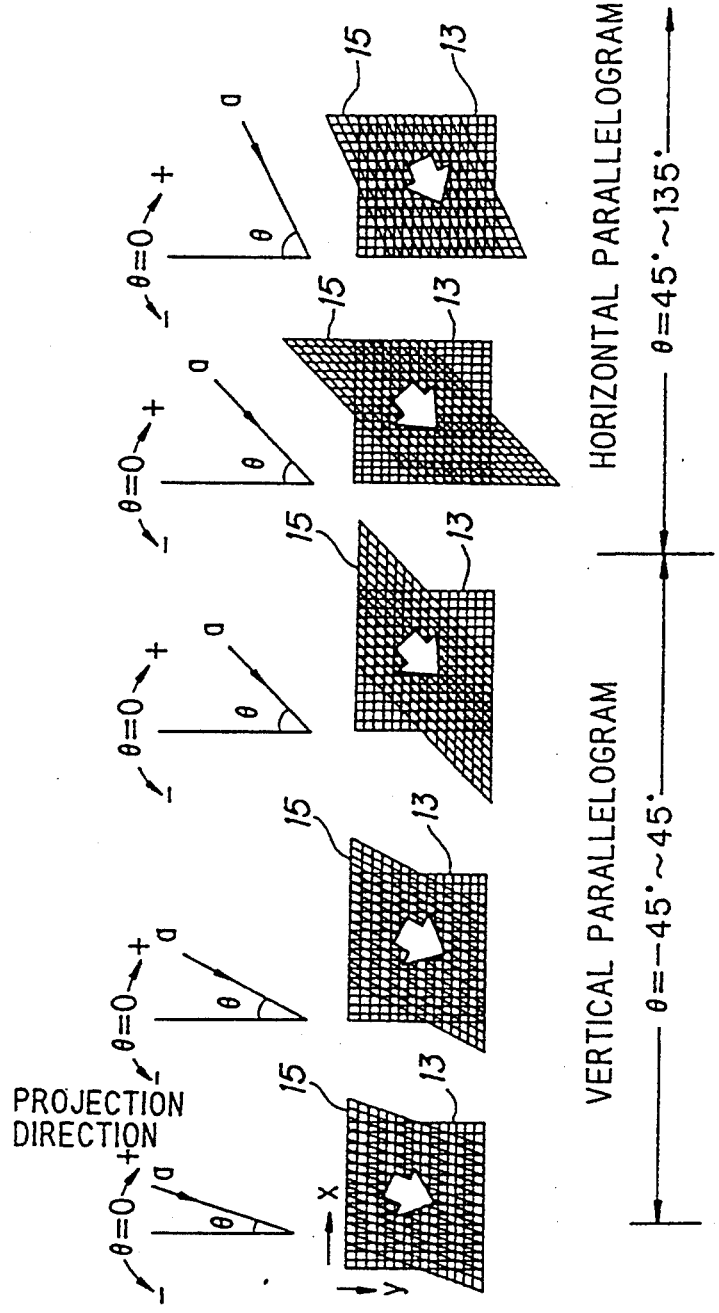

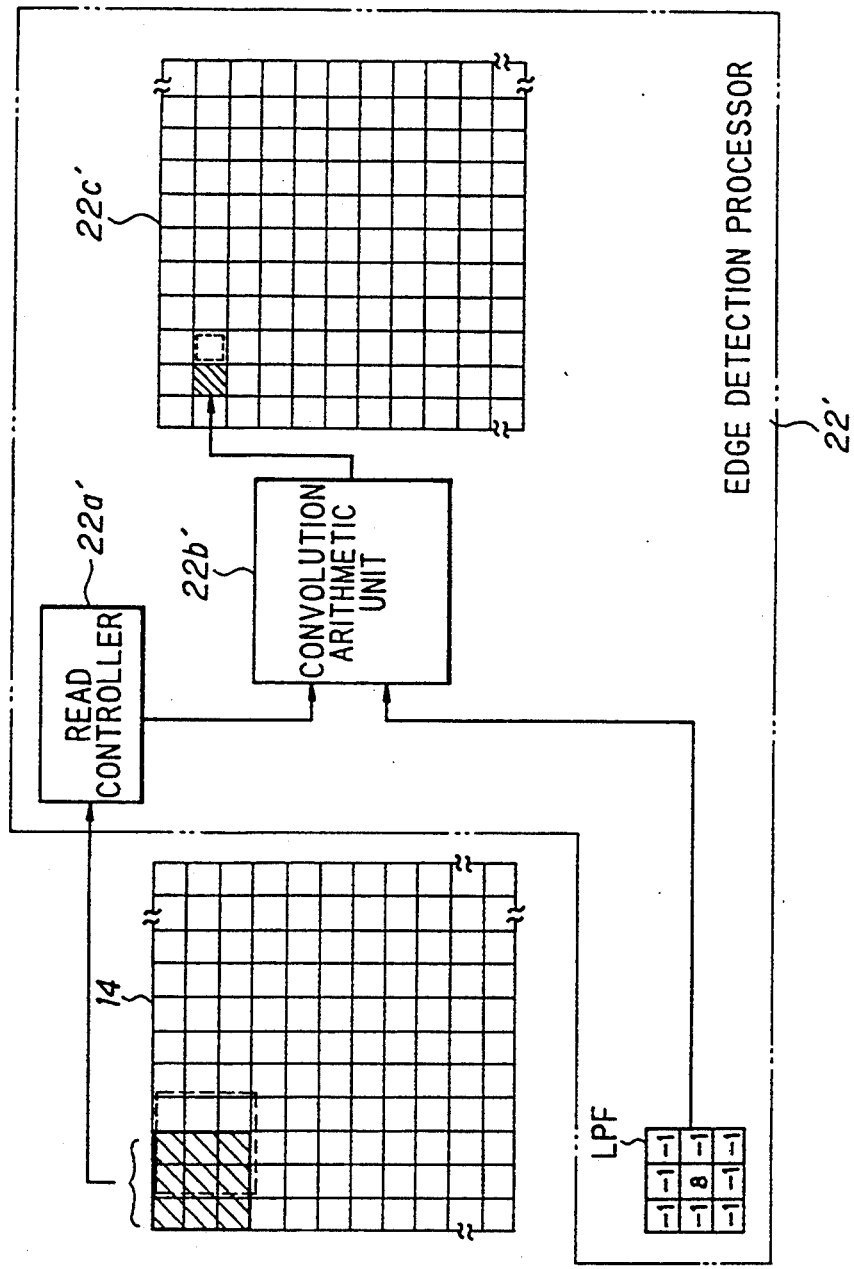

SECTION ALONG LINE A-A' IN (a) ABOVE

SECTION ALONG LINE B-B' IN (a) ABOVE

SECTION ALONG LINE C-C' IN (a) ABOVE

METHOD AND APPARATUS FOR EXTRACTING LINE SEGMENTS FROM AN IMAGE OF AN OBJECT

BACKGROUND OF THE INVENTION

This invention relates to a method of extracting line segments. More particularly, the invention relates to a line-segment extracting method for extracting lines, such as contour lines and boundaries (edges) between light and dark areas, from the image of an object.

Great importance is attached to image measurement in industrial technology. The reason for this is that using an image makes it possible to acquire an enormous amount of information in a short period of time. However, since a large quantity of data is arrayed in two dimensions, it is difficult for an image to be comprehended by a machine such as a robot. Since a robot is required to move while avoiding obstacles and to perform precise operations involving objects, the robot must be able to correctly comprehend its surrounding environment, the particular object, etc. Accordingly, there is demand for a processing method and apparatus for line-segment extraction in which line segments such as the contour line of an object or the boundary (edge) between light and dark areas of the object can be extracted from the image of the object correctly and at high speed.

One example of a prior-art method used to extract line segments involves executing edge emphasizing processing using a two-dimensional filter and then estimating straight lines by means of a least square approximation. Another method relies upon a Hough conversion.

However, processing using a two-dimensional filter is local processing and therefore is susceptible to noise. In addition, in order to apply the method of least squares, clustering of a group of points is essential. More specifically, before the method of least squares is applied, it is necessary to separately detect where the straight line begins and where it ends. This is impractical.

The method based upon the Hough conversion is a line-segment extracting method for a case in which it is assumed that a straight line having an infinite extension exists. Consequently, the positions of end points cannot be determined from the results of conversion. Moreover, if part of an image includes a straight line and noise is present in the vicinity of the extension of the line, detection accuracy declines owing to interference ascribable to the noise. Furthermore, since the peak height (frequency) of points plotted on a $p$-$\theta$ plane by the Hough conversion is influenced by the length of a straight line, adjustment of a threshold value is difficult when detecting the peak.

Accordingly, an object of the present invention is to provide a method and apparatus for extracting line segments, in which line segments such as contours or edges can be detected accurately and at high speed without being influenced by interference from noise.

Another object of the present invention is to provide a method and apparatus for extracting line segments that make it possible to obtain the end points of a line segment.

A further object of the present invention is to provide a method and apparatus for extracting line segments in which the hardware configuration for line-segment extraction can be made more compact and LSI techniques can be employed.

SUMMARY OF THE INVENTION

According to the present invention, the foregoing objects are attained by clipping an image, which corresponds to the size of a receptive field defining a small area, from an original image, projecting the clipped receptive-field image from a predetermined projection direction onto an axis ($p$ axis) that intersects the projection direction and obtaining projection values at positions along the $p$ axis, subjecting the projection values to differentiation processing along the $p$ axis, similarly subjecting projection values, which are obtained by successively varying a projection-direction angle $\theta$ incrementally a predetermined amount, to differentiation processing along the $p$ axis to thereby obtain a differential value at each position of a $p$-$\theta$ plane, and extracting a line segment contained in the receptive-field image based upon a peak position ($p,\theta$) of the differential values Thus, in accordance with the invention, an original image is subdivided into receptive fields, which are small areas, and line segments are extracted in units composed of the receptive-field images. As a result, line segments and end points can be extracted and there is no influence from noise on the extensions of the line segments. Further, in accordance with the invention, the fact that line segments are extracted in units composed of the receptive-field images makes it possible to reduce the hardware to the size of the receptive field and to employ LSI techniques.

Further, the invention includes setting a projection grid, which has sides parallel to an a axis and the $p$ axis, on the receptive field, in which the a axis is an axis in the projection direction and the $p$ axis is an axis that intersects the a axis, accumulating image data of pixels, of the receptive field, that are overlapped by each pixel within the projection grid for which the value along the $p$ axis is $p_0$, and calculating, as a projection value that prevails when the projection-direction angle is $\theta$, each accumulated value obtained by varying $p_0$ incrementally a predetermined amount up to the width of the projection grid. As a result, projection values can be obtained simply and at high speed.

Furthermore, in accordance with the invention, data for transforming each pixel position of the grid into a pixel position in the receptive field is stored in a ROM, and this data is used to obtain the receptive-field pixel positions that are to be accumulated. This makes it possible to calculate projection values at high speed. Moreover, since the data stored is specially contrived, ROM capacity can be reduced. This is useful in reducing size and in lowering cost.

In accordance with the invention, various kinds of correction processing are executed to make possible highly accurate extraction of line segments.

Furthermore, the invention includes subdividing the original image into partial areas in which numbers of pixels in horizontal and vertical directions are $p_1 \cdot m$, $p_2 \cdot m$ (where $p_1$, $p_2$ are integers equal to 2 or more), wherein m, n represent numbers of pixels in horizontal and vertical directions of the receptive field, extracting m pixels from the partial areas every $p_1$ pixels in the horizontal direction and extracting n pixels from the partial areas every $p_2$ pixels in the vertical direction to perform line-segment extraction as a receptive-field image, and performing line-segment extraction while suitably reducing values of $p_1$, $p_2$. This makes it possible to selectively perform general (coarse) line-segment extraction and highly precise line-segment extraction. Moreover, a successive transition can be made from general line-segment extraction to highly precise line-segment extraction.

Furthermore, by adopting a parallelogram as the projection grid, in which the parallelogram has a side parallel to the a axis, which is the projection direction, and a side parallel to the $p$ axis, it is possible to reduce the number of items of data necessary for transforming each pixel position of the grid into a pixel position of the receptive field. This makes possible a further reduction in the capacity of the ROM.

Further, all receptive-field images arrayed in the horizontal direction are projected from the predetermined projection direction and all projection values in the horizontal direction are obtained in one lot. As a result, it is unnecessary to clip the original image into the receptive-field memories individually, thereby making it possible to extract line segments at high speed.

Furthermore, the invention includes clipping an image, which conforms to the size of a receptive field defining a small area, from an original image, applying edge-detection processing to the clipped receptive-field image, projecting the image, which has been objected by the edge-detection processing, from a predetermined projection direction onto an axis ($p$ axis) that intersects the projection direction and obtaining projection values at positions on the $p$ axis, similarly obtaining projection values by successively varying a projection-direction angle $\theta$ incrementally a predetermined amount to thereby obtain a differential value at each position of a $p$-$\theta$ plane, and extracting a line segment contained in the receptive-field image based upon a peak position ($p,\theta$) of the projection values. Thus, an original image is subdivided into receptive fields, which are small areas, and line segments are extracted in units composed of the receptive-field images. As a result, line segments and end points can be extracted and there is no influence from noise on the extensions of the line segments. Further, the fact that line segments are extracted in units composed of the receptive-field images makes it possible to reduce the hardware to the size of the receptive field and to employ LSI techniques.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a schematic explanatory view of a line-segment extracting method according to the present invention;

FIG. 2 is a flowchart illustrating processing for extracting line segments;

FIG. 9 is a block diagram showing an apparatus for extracting line segments according to the present invention;

FIG. 13 is an explanatory view showing that edge detection can be performed by differentiation;

FIG. 14 is a first explanatory view of a method of edge detection;

FIG. 38 is a block diagram illustrating a line-segment extracting apparatus equipped with a grid-shape correcting function;

FIG. 41(b) is a diagram for describing a correction by weighting in conformity with an (x,y) position of a receptive-field image;

FIG. 42 is a block diagram showing a line-segment extracting apparatus equipped with a weighting function;

FIG. 48 is a block diagram illustrating a line-segment extracting apparatus capable of performing processing for correcting projection values;

FIG. 56 is a flowchart showing processing for extracting line segments;

FIG. 69 is a diagram for describing changeover of a projection grid having the shape of a parallelogram;

FIG. 81 is a block diagram showing the hardware configuration of an edge detecting processor;

DESCRIPTION OF THE PREFERRED EMBODIMENTS (a) Embodiments of the invention (a-1) Overview FIG. 1 is a schematic explanatory view of a line-segment extracting method according to the present invention, and FIG. 2 is a flowchart illustrating processing for extracting line segments. An image, which comprises N×M pixels, of an object captured by a camera 11 is stored in an image memory 12 (step 101). The image is read out to a receptive-field memory (cache memory) 14 upon being subdivided into receptive fields 13 each comprising m×m pixels (e.g., 16×16 pixels) (step 102).

Next, an image (referred to as a "receptive-field image") that has been stored in the receptive-field memory 14 is projected, from a predetermined projection direction (a projection-direction angle $\theta$), upon an axis ($\rho$ axis) that is perpendicular to the projection direction, and projection points P along the $\rho$ axis are calculated (step 103).

In other words, if we let an a axis represent the axis of the projection direction, a projection grid 15, which is a rectangle whose sides are parallel to the $\rho$ and a axes, is set on the receptive-field image. It should be noted that the center of the projection grid is made to coincide with the center of the receptive field.

Next, items of image data of receptive-field pixels corresponding to respective ones of a number of pixels, within the projection grid 15, for which the value along the $\rho$ axis is $\rho_0$, is accumulated and a projection value $P_0$ at $\rho_0$ is calculated. Similarly, accumulated values, which are obtained by incrementally varying $\rho_0$ a predetermined amount from zero up to the full width of the projection grid, are calculated as projection values that prevail at the projection-direction angle $\theta$. It should be noted that the grid pixels and the receptive-field pixels immediately underlying the grid pixels are assumed to correspond to each other.

Figures 3A, 3B:
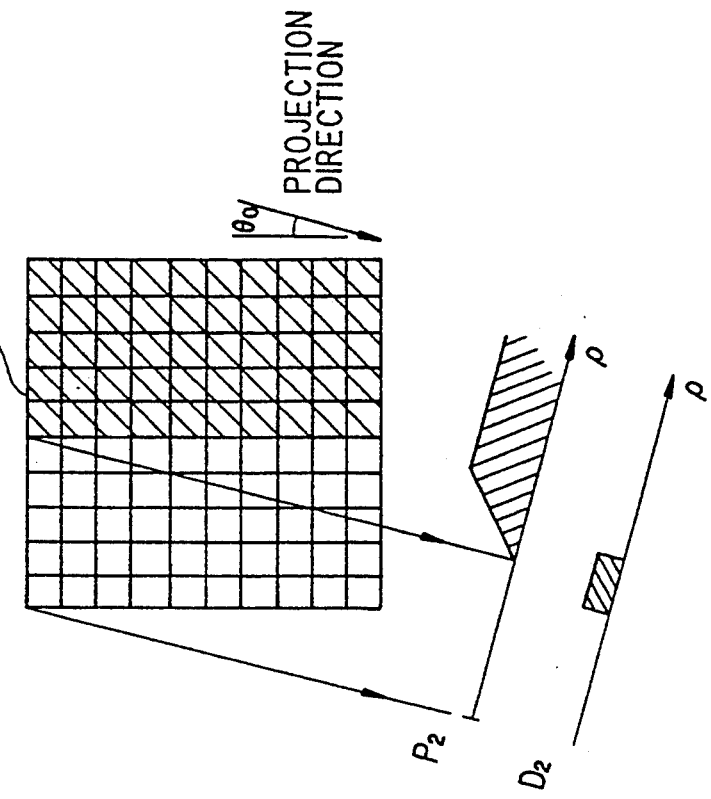
FIGS. 3(a)-(b) are an explanatory view of processing for projection and differentiation.

Assume that the image (the receptive-field image) in the receptive field 13 is such that its left half is dark and its right half is bright, as illustrated in FIG. 3. Then, by virtue of the foregoing operation, when the image is projected from the vertical direction ($\theta=0$), as shown in FIG. 3($a$), a projection value $P_1$ which becomes large at the position of the boundary (the edge) between the bright and dark areas is can be obtained. If the same receptive-field image is projected from a direction $\theta=\theta_0$, as illustrated in FIG. 3($b$), then a projection value $P_2$ can be obtained.

Figure 4A:
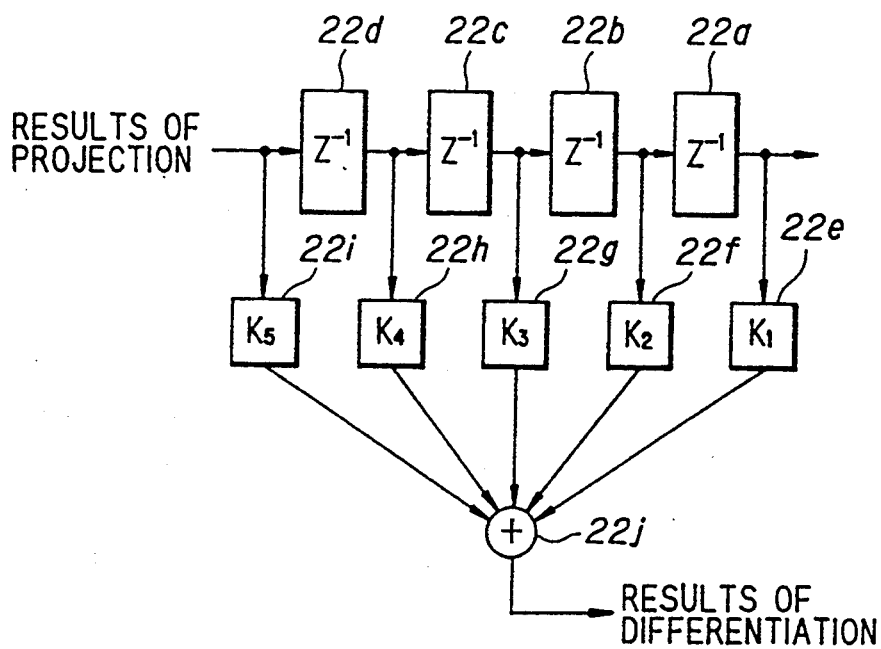
FIGS. 4(a)-(b) are an explanatory view of an FIR filter.
Figure 4B:
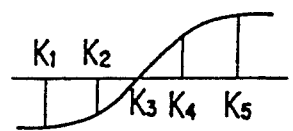

The foregoing is followed by subjecting the projection values obtained to linear differentiation processing along the $\rho$ axis by means of an FIR filter 22 for edge extraction, and then expanding the differentiated results on a $\rho$-$\theta$ parameter plane (memory) 23. As illustrated in FIG. 4($a$), the FIR filter 22 comprises delay units 22$a$~22$d$, multipliers 22$e$~22$i$ for multiplying the outputs of the delay units by coefficients $K_1$~$K_5$, and an adder 22$j$ for adding the resulting products and outputting the results of differentiation. The processing of a linear differentiating filter can be applied by suitably determining the coefficients $K_1$~$K_5$ as, for example, shown in FIG. 4($b$). When this linear differentiation processing is applied to the projection value of FIG. 3($a$), it is possible to obtain a differentiated result $D_1$, which has a sharp peak PK at the position of the edge. When the linear differentiation processing is applied to the projection value of FIG. 3($b$), the differentiated result becomes broader and flatter, as indicated at $D_2$. Using this FIR filter makes it easy to construct the circuitry and facilitates the parameterization of edges desired to be extracted. This can be performed at high speed and with little susceptibility to noise.

Figure 5:
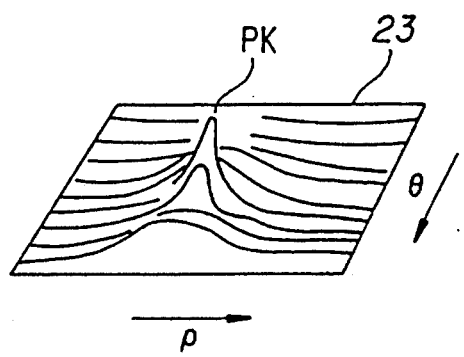
FIG. 5 is an expanded view of differential values on a $p$-$\theta$ plane.

If the foregoing processing is thenceforth repeated while incrementally varying the projection direction by $\Delta\theta$ (e.g., 5.6°) over an azimuth $N\theta$ (=32), the results of differentiation will be developed on the $\rho$-$\theta$ parameter plane (memory) 23 in the manner shown in FIG. 5. That is, if differential values in all projection directions are obtained by successively rotating the projection grid 15 through increments of $\Delta\theta$, the differential values will be developed on the $\rho$-$\theta$ plane as illustrated in FIG. 5.

If the position ($\rho,\theta$) of the peak PK is obtained by a planar peak filter 24 after results of differentiation have been obtained for all projection directions, the direction $\theta$ and position $\rho$ of a line segment such as an edge contained in the receptive field image can be extracted in accordance with the peak position. The foregoing constitutes step 104 of the flowchart.

Figure 6:
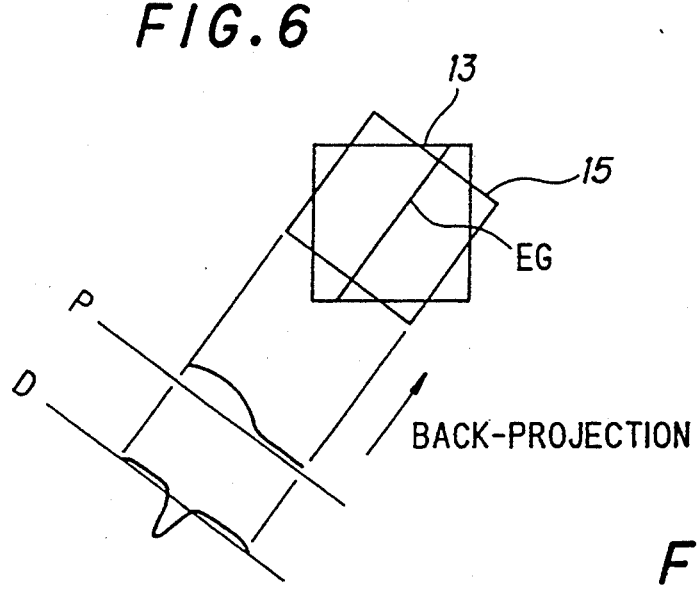
FIG. 6 is a diagram for describing back-projection of a peak position.
Figure 7:
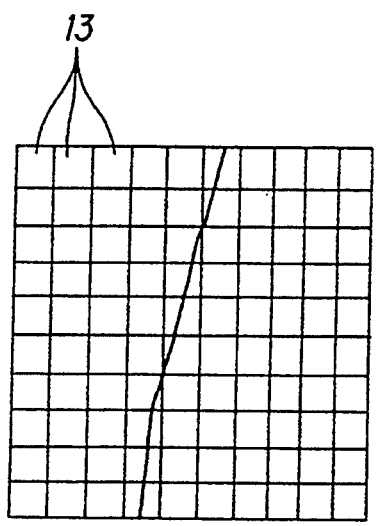
FIG. 7 is a diagram for describing the results of edge extraction.

Next, each peak position ($\rho,\theta$) is back-projected onto the receptive field to obtain an edge EG (see FIG. 6). If the edges obtained with regard to all of the receptive fields are connected (see FIG. 7), then image processing for edge extraction in the entire image ends (steps 105, 106).

Figure 8A:
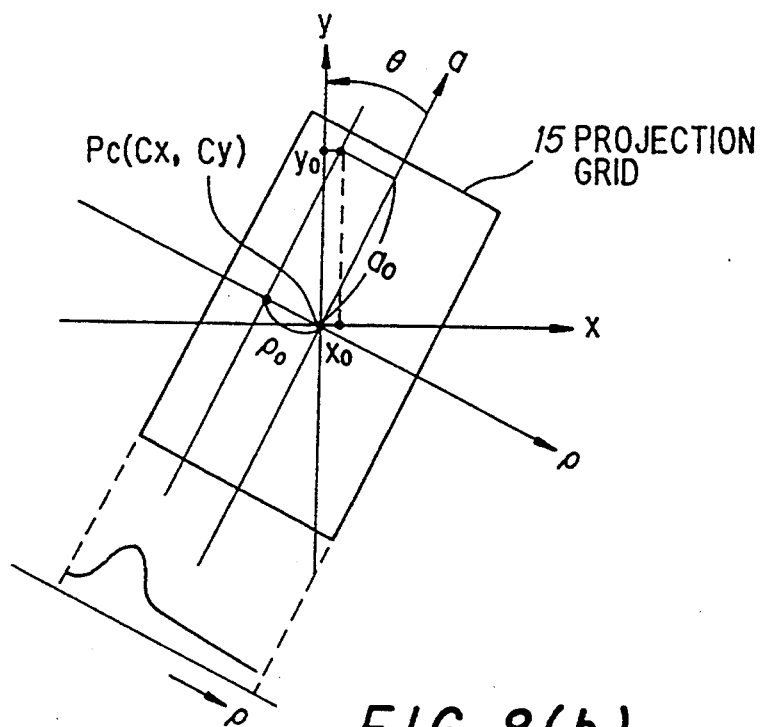
FIGS. 8(a)-(b) are a diagram for describing calculation of pixel addresses of receptive-field pixels.
Figure 8B:
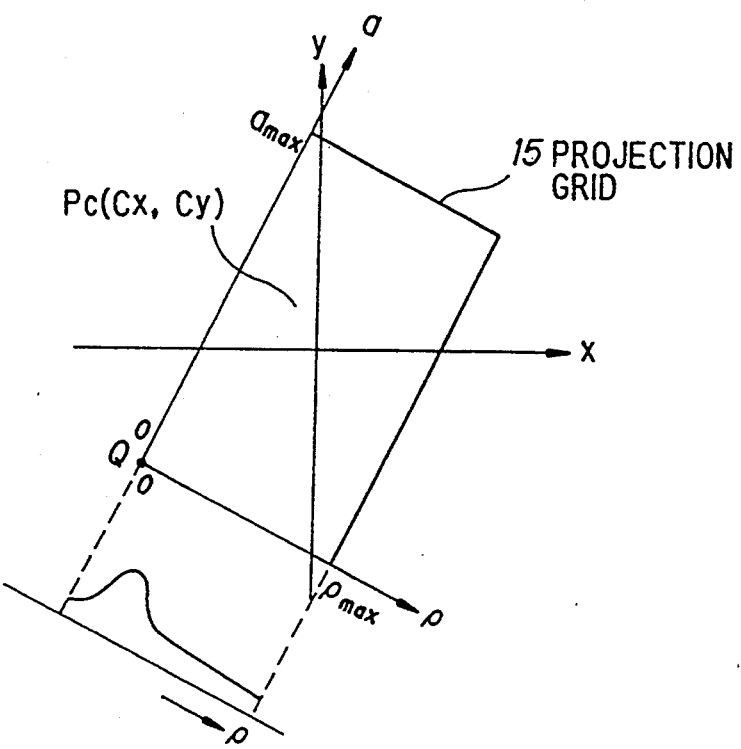

(a-2) Method Of deciding positions of receptive-field pixels corresponding to pixels within the projection grid The positions of pixels of the receptive field 13 that correspond to the pixels in the projection grid 15 are decided by a coordinate transformation. As shown in FIG. 8($a$), a coordinate system x-y is set on the receptive-field image and a $\rho$-a coordinate system, whose origin is the projection center Pc (Cx,Cy) of the receptive-field image, is established by rotation through the projection-direction angle $\theta$. When this is done, coordinate values ($\rho_0,a_0$) in the $\rho$-a coordinate system are transformed into positions ($x_0,y_0$) on the receptive-field image by the following equations:

$$x_0 = Cx + \rho_0 \cdot \cos\theta + a_0 \cdot \sin\theta \quad (1)$$

$$y_0 = Cy - \rho_0 \cdot \sin\theta + a_0 \cdot \cos\theta \quad (2)$$

The pixel positions (pixel addresses) of the receptive-field image are expressed by integers. Therefore, if we let a function for rounding off to the nearest whole number be expressed by I(), a pixel address (xa,ya) of the receptive-field image that corresponds to the position ($X_0,Y_0$) can be expressed as follows:

$$xa = I(Cx + \rho_0 \cdot \cos\theta + a_0 \cdot \sin\theta) \quad (1)'$$

$$ya = I(Cy - \rho_0 \cdot \sin\theta + a_0 \cdot \cos\theta) \quad (2)'$$

Accordingly, if we let f(x,y) represent pixel data at a pixel address (x,y), a projection value $P(\theta_0,\rho_0)$ in the projection direction $\theta$ will be calculated in accordance with the following equation:

$$P(\theta_0,\rho_0) = \Sigma f[I(Cx + \rho_0 \cdot \cos\theta + a_0 \cdot \sin\theta), I(Cy - \rho_0 \cdot \sin\theta + a_0 \cdot \cos\theta)] \quad (3)$$

(a-3) Configuration and operation of line-segment extracting apparatus

FIG. 9 is a block diagram showing a line-segment extracting apparatus according to the present invention. It should be noted that one vertex Q [see FIG. 8($b$)] of the projection grid is the origin of the grid coordinate system.

Numeral 11 in FIG. 9 denotes a camera for capturing an image, which is stored by an image memory (a frame buffer) 12. The receptive-field memory (cache memory) 14 stores the receptive-field image clipped from the image memory 12. An area counter 16 designates horizontal and vertical positions h, v (the initial values of which are 0,0) of the receptive-field image clipped from the image memory 12, a $\theta$-counter 17 (the initial value of which is 0) successively increments the projection-direction angle $\theta_0$ by a predetermined amount, a $\rho$- counter 18 (the initial value of which is 0) successively increments the value $\rho_0$ along the $\rho$ axis by a predetermined amount, and an a-counter 19 (the initial value of which is 0) successively increments the value $a_0$ along the a axis by a predetermined amount. An address converter 20 transforms the pixel positions in the $\rho$-a coordinate system into pixel positions (x-y addresses) in the x-y coordinate system in accordance with Equations (1)' and (2)'.

A projection-value arithmetic unit (accumulator) 21 accumulates the pixel data in accordance with Equation (3) and outputs a projection value P ($\theta_0,\rho_0$). The FIR filter (digital filter) 22 subjects the projection value to linear differentiation processing successively along the $\rho$ axis. A memory (RAM) 23 stores the results of differentiation (differential values) upon expanding them on the $\rho$-$\theta$ plane. By way of example, the RAM 23 has $\theta$ addresses along the vertical direction and $\rho$ addresses along the horizontal direction. A peak detector 24 scans the differential values in the $\rho$-$\theta$ plane and detects a peak position. A storage unit (FIFO memory) 25 stores the peak position on the $\rho$-$\theta$ plane. A control unit 26 executes overall control, inclusive of control of the counters.

In processing for executing a line segment, a receptive-field image designated by the contents (h,v) (the initial values of which are 0,0) of the area counter 16 is clipped from the image memory 12 and stored in the receptive-field memory 14. Next, a calculation is performed to obtain a projection value, which is the result of projecting the receptive-field image onto the $\rho$ axis from the prescribed projection direction $\theta_0$ (the initial value of which is 0°). More specifically, first $\theta_0$, $\rho_0$, $a_0$ are inputted to the address generator 20, where $\rho = \rho_0$ (the initial value of which is 0), $a = a_0$ (the initial value of which is 0). The address converter 20 performs the address conversion in accordance with Equations (1)', (2)' to obtain the x, y addresses ($x_0,y_0$) of the receptive-field memory 14. Image data $f(x_0,y_0)$ designated by the x, y addresses ($x_0,y_0$) is read out of the receptive-field memory 14 and fed into the projection-value arithmetic unit 21. The projection-value arithmetic unit 21 performs the accumulation operation of Equation (3) using the image data that has been entered.

The count in the a-counter 19 is then incremented ($a_0+1 \rightarrow a_0$) and the operation described above is performed again. When the value $a_0$ of the a-counter 19 becomes equal to the width ($=a_{max}$) of the projection grid 15 along the a axis, the projection-value arithmetic unit 21 inputs the accumulated results to the FIR filter 22 as a projection value that prevails when $\rho = \rho_0$ holds. The FIR filter 22 executes linear differentiation processing each time a projection value is outputted by the projection-value arithmetic unit 21. The results are applied to the memory 23, which the differential value at a position (a matrix intersection on the $\rho$-$\theta$ plane) designated by the value $\rho_0$ in the $\rho$-counter 18 and the value $\theta$ in the $\theta$-counter 17.

Next, the count within the $\rho$-counter 18 is incremented ($\rho_0+1 \rightarrow \rho_0$), the count within the a-counter 19 is cleared to zero and the foregoing processing is repeated to obtain a projection value at each $\rho_0$in successive fashion, input the projection values to the FIR filter 22 and store the differential values in the memory 23. When the value $\rho_0$ in the $\rho$-counter 18 becomes equal to the width ($=\rho_{max}$) of the projection grid 15 along the $\rho$ axis, which means that the calculation of projection values has been completed, the calculation of projection values in the projection direction $\theta_0$ ends and all of the differential values along the $\rho$ axis at $\theta = \theta_0$ are stored in the memory 23. Thereafter, the count in the $\theta$-counter 17 is incremented by $\Delta\theta$ ($\theta_0 + \Delta\theta \rightarrow \theta_0$), the counts in the a-counter 19 and $\rho$-counter 18 are cleared to 0, the foregoing processing is repeated and the differential values of the projection values in all projection directions are stored on the $\rho$-$\theta$ plane of memory 23. It should be noted that since $\Delta\theta$ is normalized to 1, the $\theta$-counter is actually incremented by 1 each time.

When the differential values of the projection values in all projection directions are stored on the $\rho$-$\theta$ plane of memory 23, the differentiated results in amounts of $3 \times 3$ pixels are read out of the memory 23 while scanning is performed successively along the $\rho$ and $\theta$ directions, and the results are fed into the peak detector 24. The latter performs peak detecting processing based upon the differentiated results of $3 \times 3$ pixels, thereby obtaining the peak position ($\rho,\theta$). The peak position ($\rho,\theta$) and the horizontal and vertical positions (h,v) of the receptive-field image designated by the area counter 16 are stored in the FIFO memory 25. If the area counter 16 is subsequently incremented and the foregoing processing is executed with regard to all of the receptive-field images, the direction $\theta$ and the $\rho$-direction position regarding the original image are stored in the memory 25.

As described above, the address generator 20 is provided and pixel positions in the $\rho$-a coordinate system are transformed into pixel positions (x-y addresses) in the x-y coordinate system in accordance with Equations (1)', (2)'. However, high-speed image processing cannot be executed because the coordinate transformation takes too much time. In actuality, therefore, the address generator 20 is made a ROM, x and y addresses of the receptive-field memory 14 conforming to ($\theta,\rho,a$) are stored in the ROM in advance and x, y addresses conforming to ($\theta,\rho,a$) are generated at high speed to perform image processing.

Figure 10:
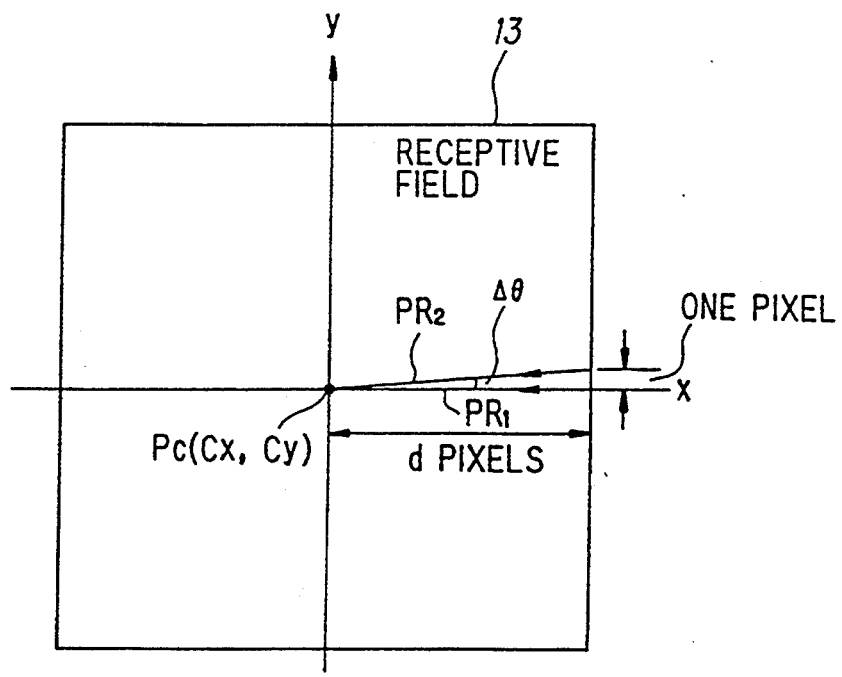
FIG. 10 is a first explanatory view of a method of deciding the rotational pitch of a projection direction.

(a-4) Method of deciding rotational pitch $\Delta\theta$ of projection direction FIG. 10 is an explanatory view of a method of deciding the rotational pitch $\Delta\theta$ of the projection direction based upon the size of the receptive-field image 13. The pixels of two mutually adjacent projection directions PR1, PR2 are set so as to differ by only one pixel at a point distant from the rotational center Pc of the projection grid. Accordingly, the rotational pitch $\Delta\theta$ is decided in accordance with the following equation assuming that the size of the receptive field is $2d \times 2d$:

$$\Delta\theta = arc \tan (1/d)$$

Figure 11:
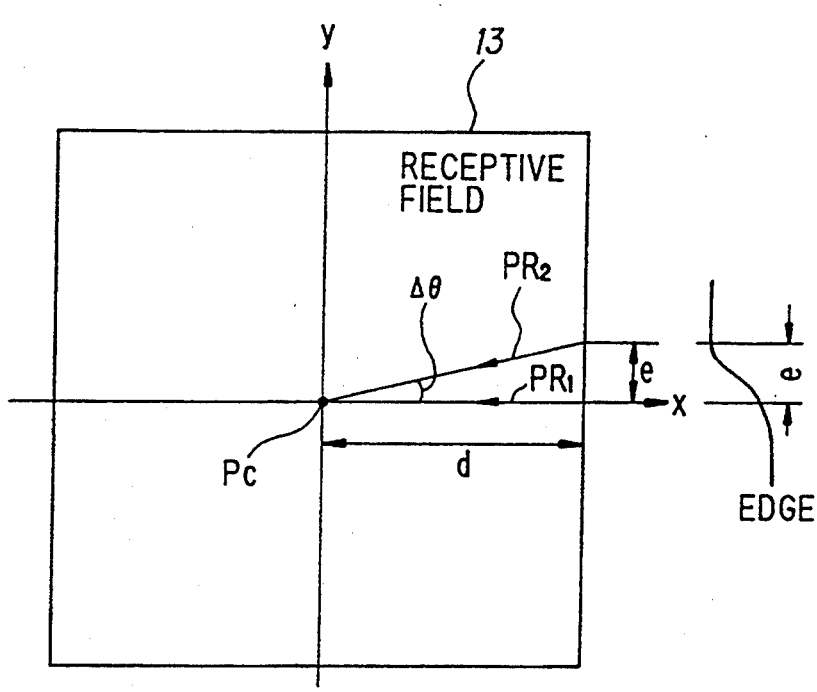
FIG. 11 is a second explanatory view of a method of deciding the rotational pitch of a projection direction.

FIG. 11 is an explanatory view of a method of deciding the rotational pitch $\Delta\theta$ of the projection direction based upon the size of the receptive field and the width of the edge to be extracted. The pixels of two mutually adjacent projection directions PR1, PR2 are set so as to differ by edge width e at a point distant from the rotational center Pc of the projection grid. Accordingly, the rotational pitch $\Delta\theta$ is decided in accordance with the following equation assuming that the size of the receptive field is $2d \times 2d$:

$$\Delta\theta = arc \tan (e/d)$$

(a-5) Deciding range of projection direction

Figure 12A:
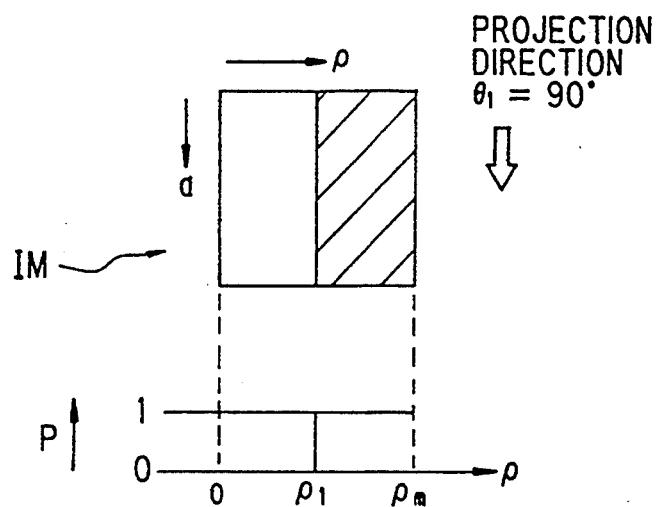
FIGS. 12(a)-(b) are an explanatory view of a method of deciding the range of a projection direction.
Figure 12B:
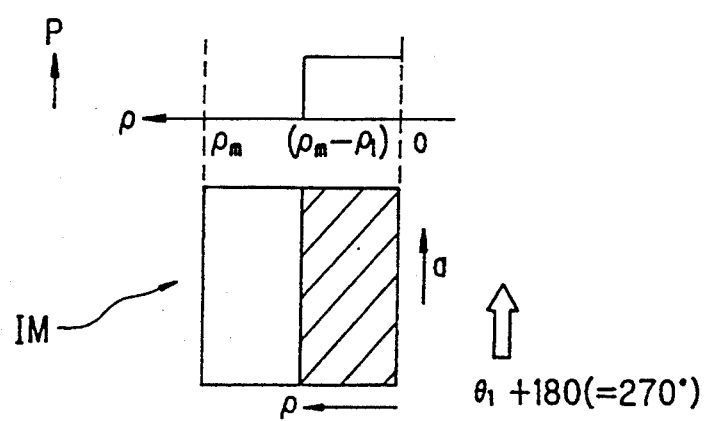

FIG. 12 is a diagram for describing a method of deciding the range of the projection direction. If a certain receptive-field image IM is projected from the direction of $\theta_1$ (e.g., 90°), the projection value P becomes as shown in FIG. 12 (a). If the projection is made from the direction of $\theta_1 + 180°$, the projection value P becomes as shown in FIG. 12 (b). In other words, the projection values obtained by the projections from the directions of $\theta_1$ and $\theta_1 + 180°$ are the reverse of each other in terms of left-right relation. Accordingly, in order to extract a line segment contained in a receptive-field image, it will suffice if the projection direction is rotated from 0 to 180° at the pitch of $\Delta\theta°$.

(a-6) Edge detection by FIR filter.

A line segment (contour line, edge between bright and dark areas) can be detected by differentiating a projection value along the $\rho$ axis by means of FIR filter 22. FIG. 13 is a diagram for describing detection of such a line segment. FIG. 13(a) shows projection values P at positions along the $\rho$ axis, and FIG. 13(b) shows differentiated results D obtained by differentiating the projection values along the $\rho$ axis by means of the FIR filter 22. It will be understood that if the peak position of the differential values D is obtained, then this position will be the position of the line segment (contour line or edge) along the $\rho$ axis.

Figure 15A:
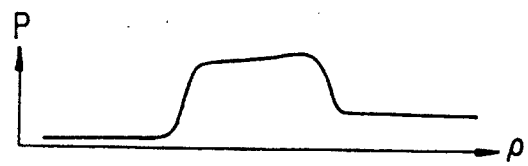
FIG. 15 is a second explanatory view of a method of edge detection.
Figure 15B:
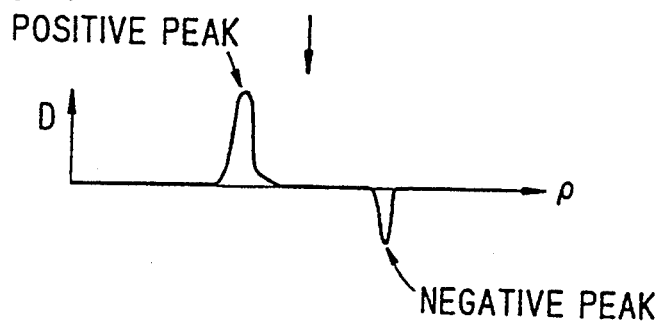
Figure 16A:
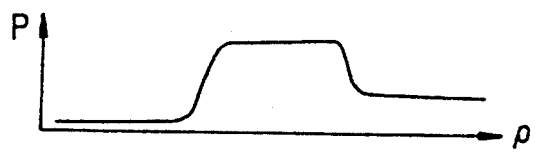
FIG. 16 is a third explanatory view of a method of edge detection.
Figure 16B:
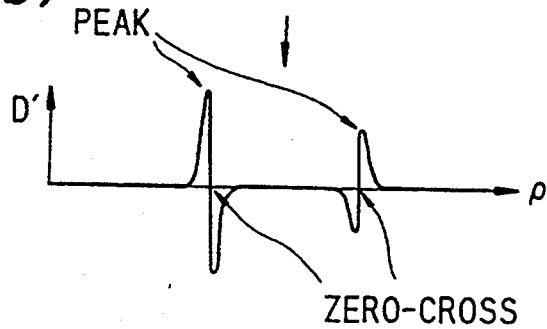
Figure 17A:
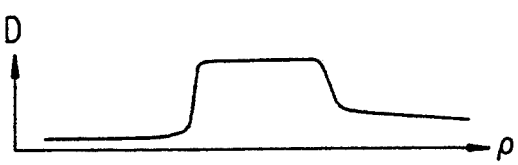
FIG. 17 is a fourth explanatory view of a method of edge detection.
Figure 17B:
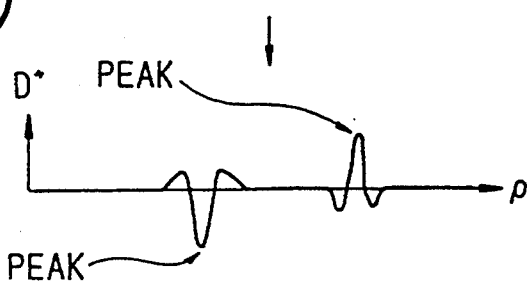
Figure 18A:
FIG. 18 is a fifth explanatory view of a method of edge detection.
Figure 18B:
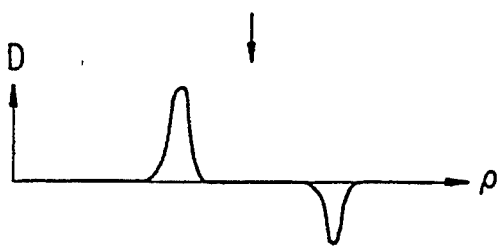
Figure 18C:
Figure 18D:
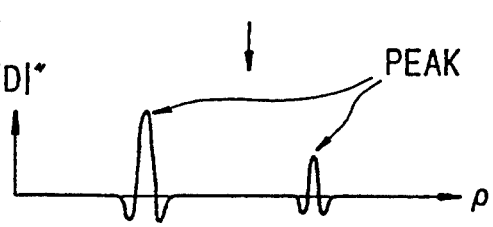
Figure 19A:
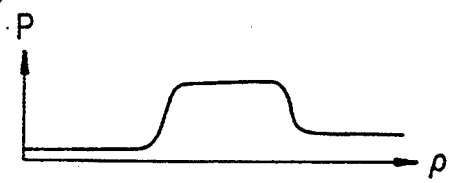
FIG. 19 is a sixth explanatory view of a method of edge detection.
Figure 19B:
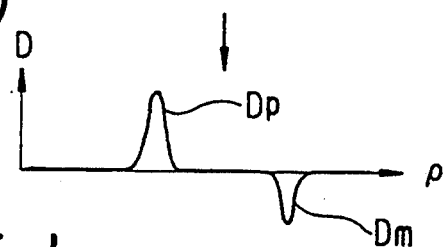
Figure 19C:
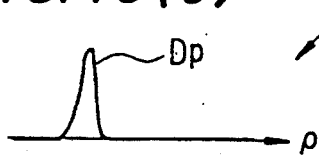
Figure 19E:
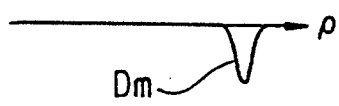
Figure 19F:
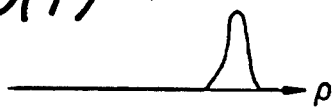
Figure 19D:
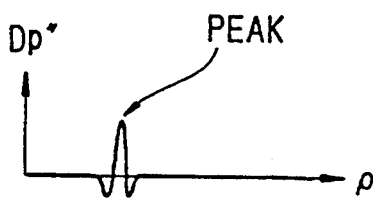
Figure 19G:
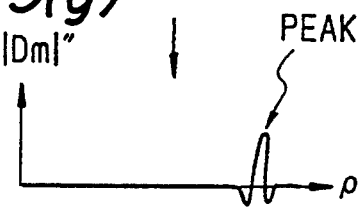

In order to obtain an edge from a differential value (primary derivative) D outputted by the FIR filter, six methods are available: (1) the absolute value $|D|$ of the first-order derivative D is taken to find the peak positions thereof (FIG. 14); (2) a positive peak and negative peak of the first-order derivative D are obtained (FIG. 15); (3) the first-order derivative is differentiated further to obtain a second-order derivative D' and the zero-cross points of this second-order derivative D' are found (FIG. 16); (4) the second-order derivative is differentiated further to obtain a third-order derivative D" and the positive and negative peaks of the third-order derivative are found (FIG. 17); (5) the absolute value $|D|$ of the first-order derivative D is further differentiated twice to obtain the third-order derivative $|D|''$ and the peaks thereof are found (FIG. 18); and (6) a positive peak Dp and a negative peak Dm of the first-order derivative D are separated, the positive peak Dp is further differentiated twice and the negative peak Dm is inverted and then differentiated twice to obtain respective third-order derivatives Dp", $|Dm|''$, and the respective peaks are found (FIG. 19).

In accordance with the method (1) of FIG. 14, the amount of processing is the smallest but the direction of a change in the shading, luminance or hue of the original image cannot be distinguished. With the method (2) of FIG. 15, a change in the shading, luminance or hue of the original image can be distinguished. In accordance with method (3) of FIG. 16, the peak positions are decided by the zero-cross points of the second-order derivative, and therefore the processing for deciding peak position is simple. With the method (4) of FIG. 17, peak half-value width is reduced by taking the third-order derivative, and hence the accuracy of peak position detection is improved. According to the method (5) of FIG. 18, peak half-value width is reduced by taking the third-order derivative and the accuracy of peak position detection is improved as a result. However, a change in the shading, luminance or hue of the original image cannot be distinguished. With the method (6) of FIG. 19, peak half-value width is reduced, a change in the shading and luminance or hue of the original image can be distinguished. Moreover, since the positive and negative peaks are separated before the differentiation processing, interference between crests or valleys produced at the peripheries of the positive and negative peaks by higher-order differentiation is eliminated. As a result, accuracy is improved.

(a-7) Difference processing of projection values

Figure 20:
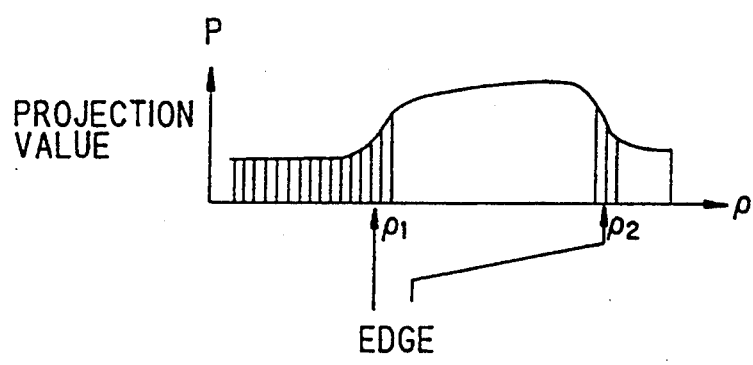
FIG. 20 is an explanatory view showing that edge detection can be performed based upon difference values.
Figure 21:
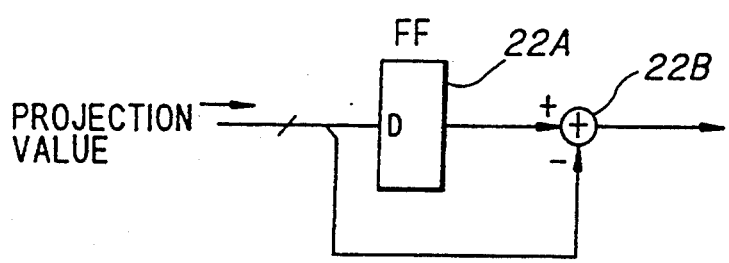
FIG. 21 is a block diagram showing how difference values are obtained.

In the foregoing, the projection value is differentiated by the FIR filter 22 to obtain the size of the slope (edge). However, it is also possible to use a difference value of the projection value. FIG. 20 is an explanatory view of processing for obtaining the size of a slope based upon a difference value. In this case, the difference value (slope) of a projection value can be obtained by subtracting the projection value P at each point along the $\rho$ axis from the immediately preceding projection value, and $\rho$-axis positions $\rho1$, $\rho2$ at which the difference is maximized are obtained. FIG. 21 is a diagram showing a circuit arrangement for obtaining such a difference value. Here the projection value at the immediately preceding position along the $\rho$ axis is stored in a register 22A and outputted. A subtractor 22B calculates the difference value (slope) by subtracting the latest projection value along the $\rho$ axis from the output of the register 22A. The position at which this difference is maximized is the position of the line segment (edge) contained in the receptive-field image. Since processing for obtaining the size of a slope based upon a difference value is very simple, the scale of the circuitry can be reduced and high-speed processing can be executed.

(a-8) Detection of peak position

Figure 22:
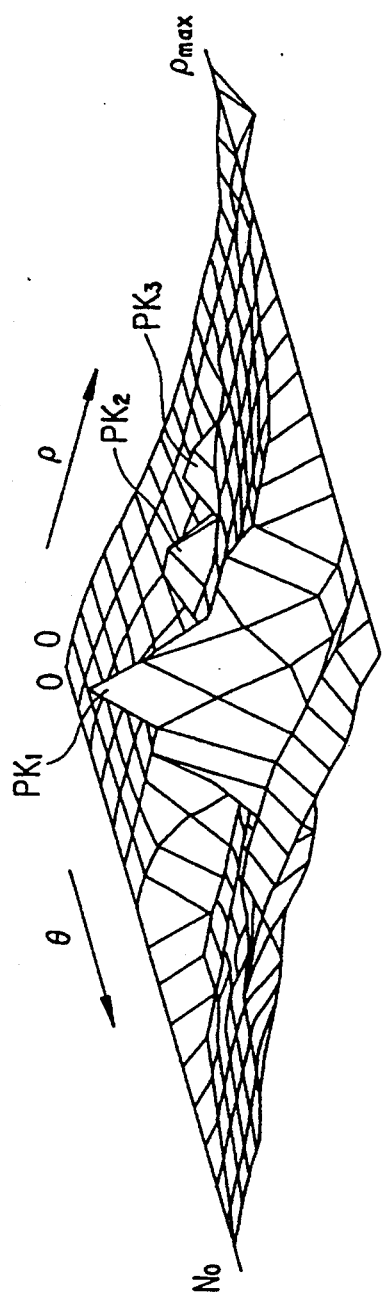
FIG. 22 is a two-dimensional distribution of differential values on the $p$-$\theta$ plane.

The number of differential values processed as through methods (1)~(6) above are $\rho_{max}$ in number for each projection direction, for a total of $\rho_{max} \cdot N\theta$, and these values are stored on the $\rho$-$\theta$ plane of memory 23 in the manner illustrated in FIG. 22. Thereafter, the positions of peaks $PK_1$, $PK_2$, $PK_3$, ... are detected from the two-dimensional distribution of differential values on the $\rho$-$\theta$ plane by means of the peak detector 24.

Detection of maximum peak

Figure 23:
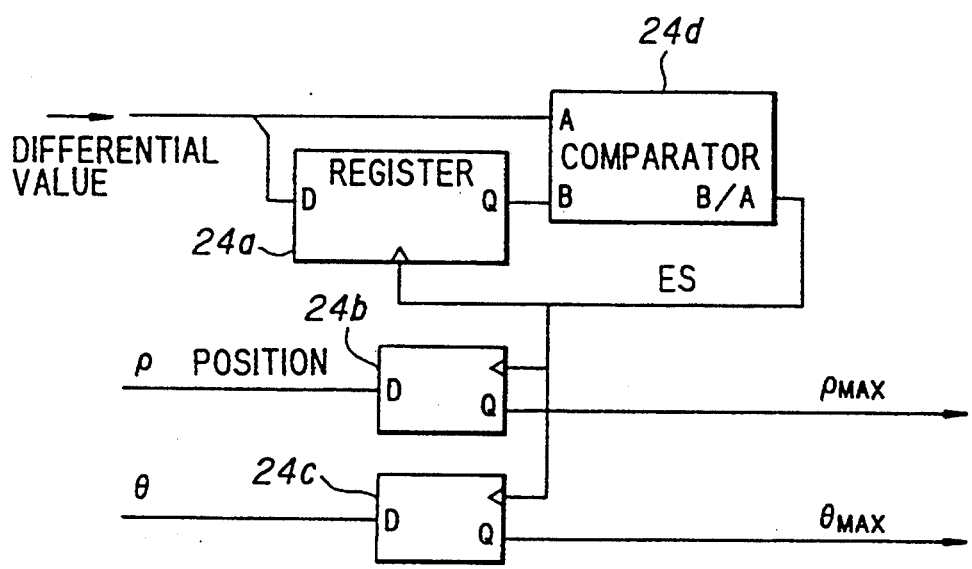
FIG. 23 is a block diagram showing detection of maximum-peak position.

In a simple image, it will suffice if one line segment is extracted for every receptive field. In such case, it will suffice if the maximum peak (the minimum peak in the case of a negative peak) in the two-dimensional distribution of differential values is detected. This maximum peak can be detected by the arrangement shown in FIG. 23, by way of example. The arrangement of FIG. 23 includes registers 24a, 24b, 24c and a comparator 24d.

The $\rho_{max} \cdot N\theta$-number of differential values are successively applied to an A input of the comparator 24d and a data input terminal D of the register 24a. The comparator 24d has two inputs, namely A and B inputs, and outputs an enable signal ES when the A input is larger than the B output. The register 24a is triggered by the enable signal ES, at which time the data input (which is equal to the A input) applied to the input terminal D is latched in this register. Accordingly, of the differential values applied to it up to the present time, the register 24a latches the maximum value. At the same time, the values of $\rho$ and $\theta$ corresponding to the above-mentioned differential values are applied to the registers 24b, 24c, respectively. The registers 24b and 24c are triggered by the enable signal ES, which is outputted by the comparator 24d when its A input is larger than its B input. As a result, the values of $\rho$ and $\theta$ corresponding to the data that has been latched in the register 24a are latched in the registers 24b, 24c. Thus, at the moment all of the $\rho_{max} \cdot N\theta$-number of differential values have entered, the registers 24b, 24c output the positional coordinate values $(\rho, \theta)$ of the maximum peak.

Another method that is slightly different from the foregoing can be used. This involves detecting the positional coordinate value $\rho$, on the $\rho$-$\theta$ plane, that gives the maximum peak for every $\theta$, then detecting the maximum peak value from the maximum peak values that correspond to each $\theta$. A similar method involves detecting the positional coordinate value, on the $\rho$-$\theta$ plane, that gives the maximum peak for every $\rho$, then detecting the maximum peak value from the maximum peak values that correspond to each $\rho$.

Peak detection

The foregoing describes the obtaining of maximum peak. In order to obtain each peak position of a differential value, a two-dimensional logical filter is employed.

Figure 24:
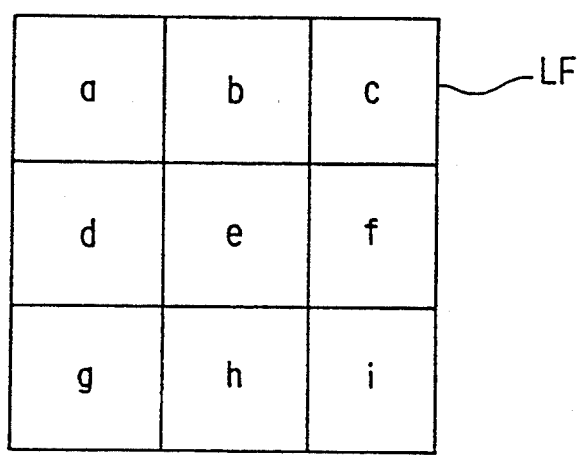
FIG. 24 is an explanatory view of a two-dimensional logical filter used when detecting a plurality of peaks.

FIG. 24 illustrates the simplest example of a two-dimensional logical filter LF for peak detection. The filter has a size of 3×3 pixels. The two-dimensional logical filter is applied to each point of a differential value on the $\rho$-$\theta$ plane and it is determined whether a differential value De, which corresponds to the central pixel, among differential values Da~Di in the $\rho$-$\theta$ plane corresponding to pixels a~i is maximum or minimum. If the differential value De is maximum or minimum, then the $\rho\theta$ position corresponding to the central pixel e is the peak position of the differential value. It should be noted that the two-dimensional logical filter of FIG. 24 encloses the central pixel by only a single layer. However, the filter can be designed to enclose the central pixel by n-number of layers.

Figure 25:
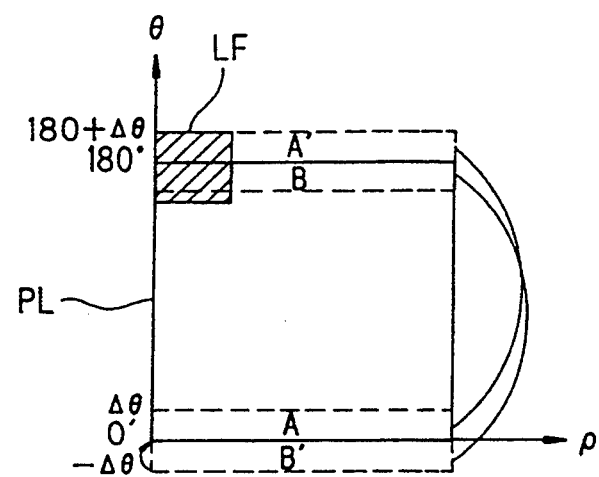
FIG. 25 is an explanatory view of a method of detecting a peak at the edge of the $p$-$\theta$ plane.

When the two-dimensional logical filter LF is applied to positions at $\theta=0°$ and $\theta=180°$ on the $\rho$-$\theta$ plane, as illustrated in FIG. 25, part of the filter protrudes from the $\rho$-$\theta$ plane PL (indicated by the bold frame) and peak points can no longer be detected accurately. As described earlier in connection with FIG. 12, projection values obtained by projections from directions of $\theta_1$ and $\theta_1+180°$ are the reverse of each other in left-right terms. In such case, therefore, a differential value A', which is the result of subjecting a differential value A at $\theta=\Delta\theta°$ to a left-right reversal, is added on above $\theta=180°$ as a differential value at $\theta=180+\Delta\theta$, and a differential value B', which is the result of subjecting a differential value B at $\theta=180°-\Delta\theta°$ to a left-right reversal, is added on below $\theta=0°$ as a differential value at $\theta=-\Delta\theta$. Under these conditions, the two-dimensional filter LF is applied to the positions at $\theta=0°$ and $\theta=180°$ on the $\rho$-$\theta$ plane and then peak position is detected.

Subpixel processing in peak detection

In accordance with the foregoing, a peak position on the $\rho$-$\theta$ plane can be obtained at the accuracy of the pixel level. However, an arrangement is possible in which peak position can be detected at the accuracy of the subpixel level. More specifically, a function $f(\rho)$ that gives the differential value of a peak position and the differential value at a position mutually adjacent to this peak position along the $\rho$ axis is decided, and peak positions of the values of these functions are adopted as the true peak positions. If this arrangement is adopted, peak position can be detected at the accuracy of the subpixel level along the $\rho$ axis.

Figure 26:
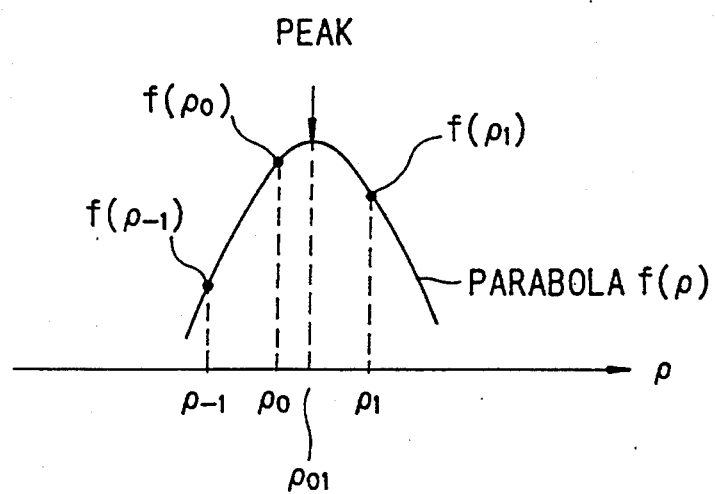
FIG. 26 is an explanatory view of a method of calculating peak position at a subpixel level.

For example, the following processing is executed in order to detect peak position at the subpixel level along the $\rho$ axis: As shown in FIG. 26, assume that differential values in the vicinity of a peak position $\rho_0$ that gives the peak of a differential value can be approximated by a parabola. A parabolic function $f(\rho)$ is decided based upon the peak position $\rho_0$ and positions $\rho_{-1}$, $\rho_1$ on either side of this peak position along the $\rho$ axis, and a $\rho$-axis position $\rho_{01}$ that gives the apex of the parabola is obtained.

$$\rho_{01} = \rho_0 + [\{f(\rho_1) - f(\rho_{-1})/2\{2f(\rho_0) - f(\rho_{-1}) - f(\rho_1)\}\}] \quad (4)$$

It should be noted that the method of detecting peak position at the subpixel level is applicable also in the $\theta$ direction.

Peak detecting using threshold value

Figure 27:
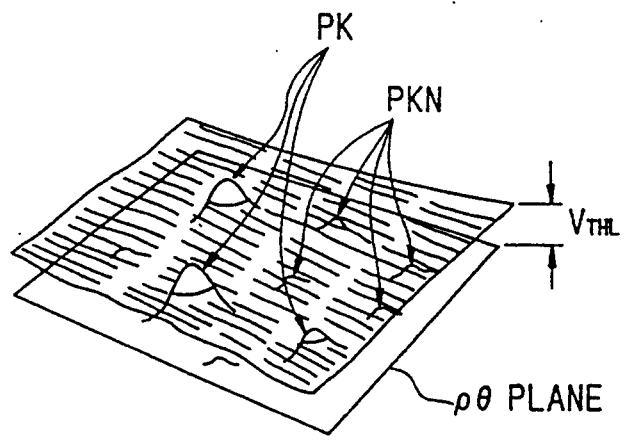
FIG. 27 is an explanatory view of peak detection based upon setting of a threshold value.

In accordance with the peak detection processing described above, all peak positions of differential values on the $\rho$-$\theta$ plane are detected. In actuality, however, a large number of small peaks exist in the two-dimensional distribution of differential values on the $\rho$-$\theta$ plane owing to the effects of noise or the like. In order to arrange it so that peaks produced by the effects of noise or the like are not detected, a threshold value $V_{THL}$ is set for a peak height that is the object of detection, as shown in FIG. 27. It is so arranged that peaks PKN that are lower than this threshold value are regarded as noise and are not detected, while peaks PK higher than the threshold value are detected.

Figure 28A:
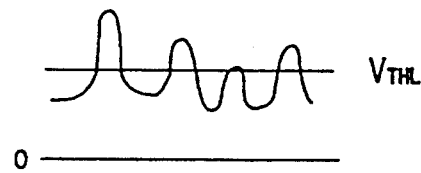
FIG. 28 is a first explanatory view of a method of deciding a threshold value.
Figure 28B:
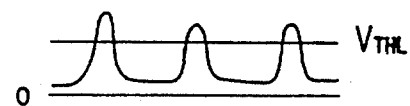

The threshold value can be made a constant value. However, threshold value can be one obtained by multiplying the mean value of differential values by a predetermined constant, as illustrated in FIG. 28. FIG. 28(a) represents a case in which the mean value is high, while FIG. 28(b) represents a case in which the mean value is low. This method is used when peaks are detected at differential values that include only peaks of the same sign (e.g., differential values that are absolute values or differential values that include only positive peaks or only negative peaks). If this method is adopted, it is possible to detect only comparatively large peaks in the entirety of the two-dimensional distribution of differential values in dependence upon the overall level of the differential values.

Figure 29A:
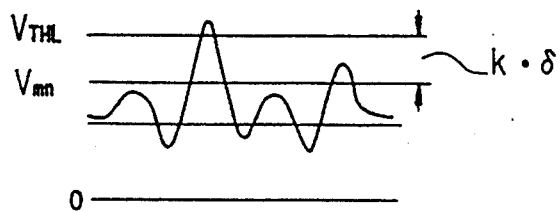
FIG. 29 is a second explanatory view of a method of deciding a threshold value.
Figure 29B:
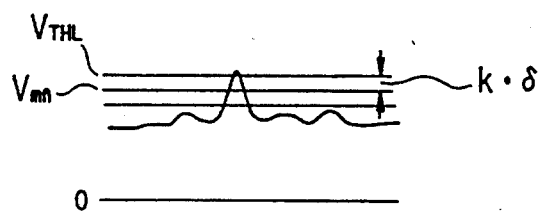

In FIG. 29, a value obtained by multiplying a standard deviation $\sigma$ of the differential values by a predetermined constant k is added to a mean value $V_{mn}$ of the differential values, and the product is adopted as the threshold value. FIG. 29(a) is for a case in which the standard deviation of the differential values is large, and FIG. 29(b) is for a case in which the standard deviation of the differential values is small. This method is used when peaks are detected at differential values that include only peaks of the same sign (e.g., differential values that are absolute values or differential values that include only positive peaks or only negative peaks). If this method is adopted, it is possible to exclude small fluctuations in the vicinity of the mean value and detect only comparatively large peaks in the entirety of the two-dimensional distribution of differential values in dependence upon the overall level of the differential values.

Figure 30A:
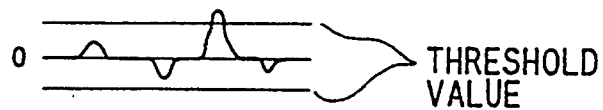
FIG. 30 is a third explanatory view of a method of deciding a threshold value.
Figure 30B:
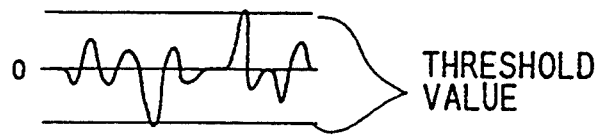

In FIG. 30, a value obtained simply by multiplying the standard deviation $\sigma$ of the differential values by a predetermined constant k' is adopted as the threshold value. FIG. 30(a) is for a case in which the standard deviation of the differential values is large, and FIG. 30(b) is for a case in which the standard deviation of the differential values is small. If this method is adopted, it is possible to exclude peaks that are fairly small in comparison with the maximum peak, thereby enabling only comparatively large peaks to be detected.

Figure 31A:
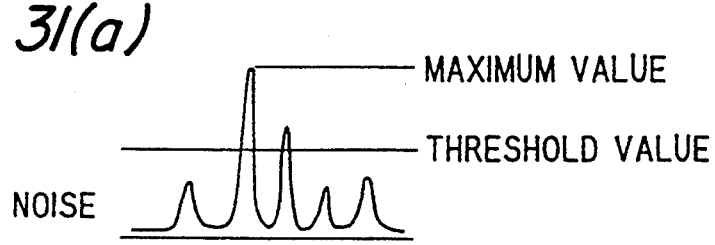
FIG. 31 is a fourth explanatory view of a method of deciding a threshold value.
Figure 31B:
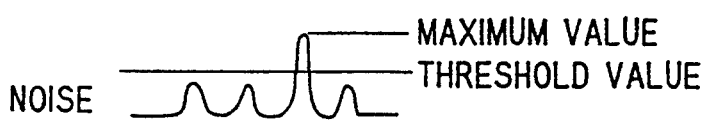

In FIG. 31, values obtained by multiplying positive and negative maximum values of differential values by a predetermined constant smaller than 1 are adopted as positive and negative threshold values. FIG. 31(a) is for a case in which the maximum value of differential values is large, and FIG. 31(b) is for a case in which the maximum value of differential values is small. This method also is used when peaks are detected at differential values that include only peaks of the same sign (e.g., differential values that are absolute values or differential values that include only positive peaks or only negative peaks). If this method is adopted, it is possible to exclude peaks that are fairly small in comparison with the maximum peak, thereby enabling only comparatively large peaks to be detected.

Figure 32A:
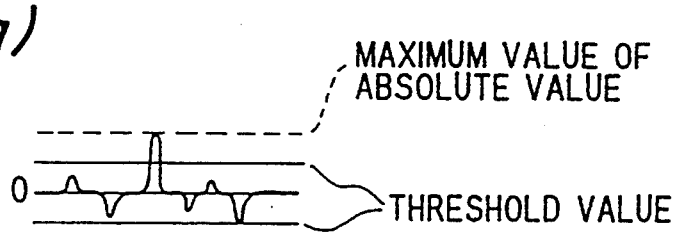
FIG. 32 is a fifth explanatory view of a method of deciding a threshold value.
Figure 32B:
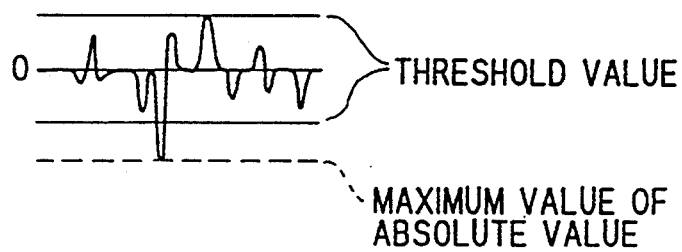

In FIG. 32, a value obtained simply by multiplying the maximum value of differential values by a predetermined constant smaller than 1 is adopted as the threshold value. FIG. 32(a) is for a case in which the maximum value of differential values is large, and FIG. 32(b) is for a case in which the maximum value of differential values is small. If this method is adopted, it is possible to exclude small fluctuations in the vicinity of the mean value and detect only comparatively large peaks in the entirety of the two-dimensional distribution of differential values in dependence upon the overall level of the differential values.

Figure 33:
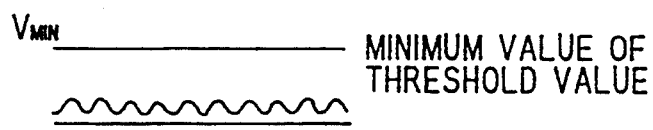
FIG. 33 is a diagram for describing elimination of noise by setting a threshold value to a minimum value.
Figure 34:
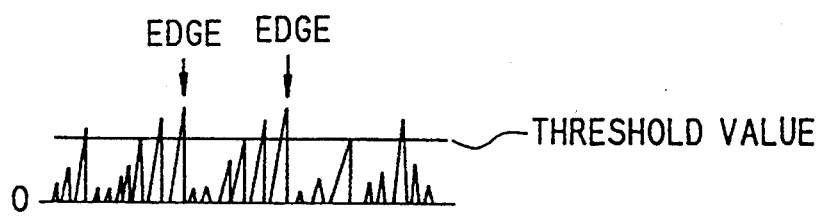
FIG. 34 is another explanatory view of a peak detecting method.

With the methods of FIGS. 28~32, a problem is that if the differential data on the $\rho$-$\theta$ plane is noise only, the larger noise peaks will be extracted. Accordingly, in the methods of FIGS. 28 ~32, a minimum value VMIN of threshold values is further provided. As a result, if the differential values on the $\rho$-$\theta$ plane is noise only, noise peaks will not be detected, as shown in FIG. 33.

Further, depending upon the method among the methods of FIGS. 28-32, there are occasions where a peak due to an edge and a peak due to noise cannot be readily isolated, as a result of which a very large number of peaks are detected. When such is the case, it is so arranged that only peaks up to a prescribed maximum number are extracted, in the order of peak size, from among those peaks that exceed the threshold value. If this approach is employed, the capacity of the memory that stores the extracted peaks can be reduced. Further, it is possible to adopt an arrangement in which only peaks up to a prescribed maximum number are extracted, in the order of peak size, without providing a threshold value.

Figure 35:
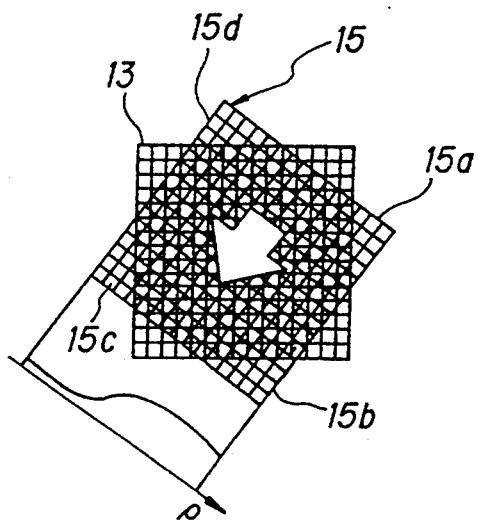
FIG. 35 is a diagram for describing the need for a correction owing to the shape of a projection grid.

(b) Correction processing based upon shape of the projection grid If the projection grid 15 is made square or rectangular in shape, portions 15a~15d of the projection grid 15 that do not overlap the receptive field 13 arise in an oblique projection, as illustrated in FIG. 35, the number of pixels over which image data is accumulated varies depending upon position along the $\rho$ axis and accurate projection results cannot be obtained. Further, projection values change suddenly at positions along the $\rho$ axis at which the number of pixels accumulated changes, and therefore accurate line-segment extraction can no longer be carried out. For these reasons it is required that correction processing be executed in order to reduce the effects produced by a change in the number of pixels accumulated.

(b-1) Enlargement of the receptive field

Figure 36:
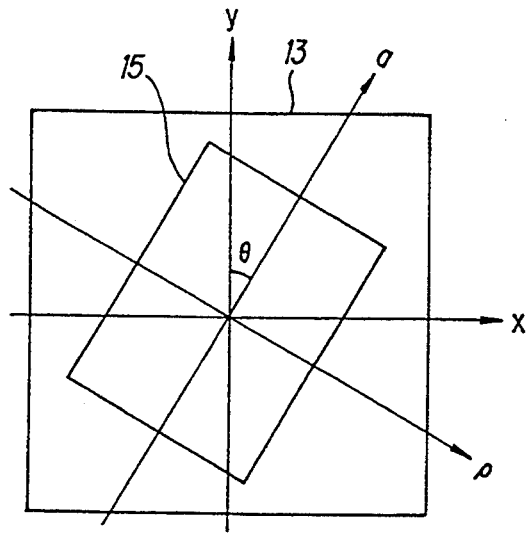
FIG. 36 is a diagram for describing size of a receptive field.

The above mentioned problem is solved by making the size of the receptive field 13 larger than that of the projection grid 15 as illustrated in FIG. 36 so that the projection grid 15 always overlaps the receptive field 13 in the oblique projection resulting in conformity of the number of pixels accumulated.

(b-2) Correction by normalization

Figure 37A:
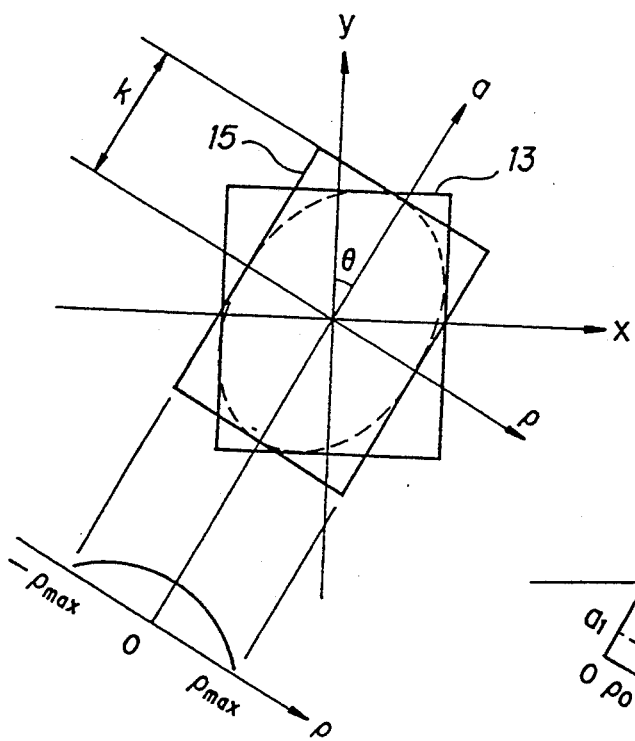
FIGS. 37(a)-(b) are a diagram for describing correction processing based upon shape correction and normalization.

FIG. 37a is diagram for describing correction processing in which the number of pixels accumulated is changed gradually in dependence upon position along the $\rho$ axis and normalization is performed by dividing the number of accumulated pixels by the projection value.

The shape of the projection grid 15 is corrected, as indicated by the dashed line, in such a manner that the number of pixels accumulated decreases as the edge of the projection grid is approached from the center thereof. For example, if the shape of the dashed-line portion is made sinusoidal, the following equation will be established:

$$f(\rho) = k_1 \cdot \sin\{(90 \cdot \rho / \rho_{max}) + 90\} \quad (5)$$

where $-\rho_{max} \leq \rho \leq \rho_{max}, k_1 = a_{max}$ hold.

Figure 37B:
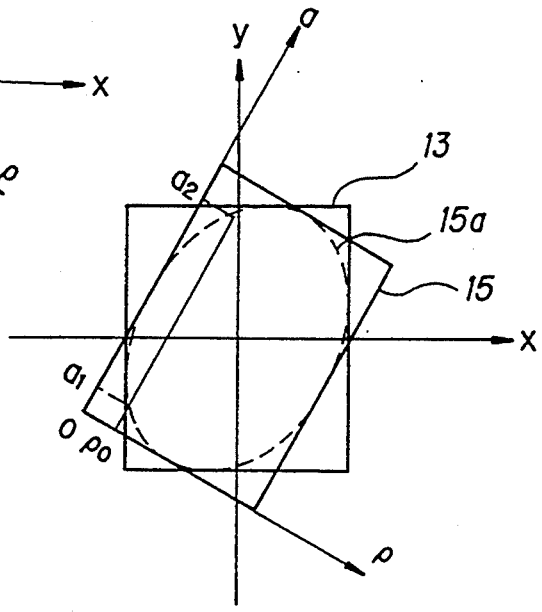

As a result, the number of pixels accumulated can be changed continuously as both sides of the projection grid are approached. By dividing the number of pixels accumulated by the projection value at the position along the $\rho$ axis, it is possible to reduce the error ascribed to the fluctuation in the number of accumulated pixels. It should be noted that the $\rho$-$\theta$ coordinate system is assumed to be established as shown in FIG. 37(b) in the embodiment below.

FIG. 38 is an embodiment having a function for correcting grid shape. Elements in FIG. 38 identical with those shown in the embodiment of FIG. 9 are designated by like reference numerals. This embodiment differs from that of FIG. 9 in the following respects:

(1) A memory 27 is provided. This memory stores, in correlation with position along the $\rho$ axis, a pixel starting position $a_1\theta$see FIG. 37(b)] and pixel end position $a_2$, along the a axis, with regard to the accumulation of pixel data.

(2) The control unit 26 sets the a-counter 19 to the pixel starting position $a_1$, which conforms to the position $\rho_0$ along the $\rho$ axis, as an initial value. When the counted value $a_0$ in the a-counter reaches the pixel end position $a_2$, the control unit 26 increments the position along the $\rho$ axis and sets the a counter to the pixel end position $a_1$, which conforms to a new position along the $\rho$ axis.

(3) The projection value at the position along the $\rho$ axis is divided by the accumulated number of pixels ($=a_2-a_1$) to normalize the projection value. It should be noted that the values of $a_1$, $a_2$ are decided based upon the shape of a corrective projection grid 15a, as shown in FIG. 37(b).

(b-3) Correction by weighting

The fact that the portions 15a~15d of the projection grid which do not overlap the receptive field occur (see FIG. 35) means that the importance of the receptive-field image corresponding to the pixels at the edges of the projection grid is small. Accordingly, projection values are calculated upon weighting the receptive-field image in dependence upon position along the $\rho$ axis, position along the a axis or the position ($\rho$,$\theta$).

Figure 39:
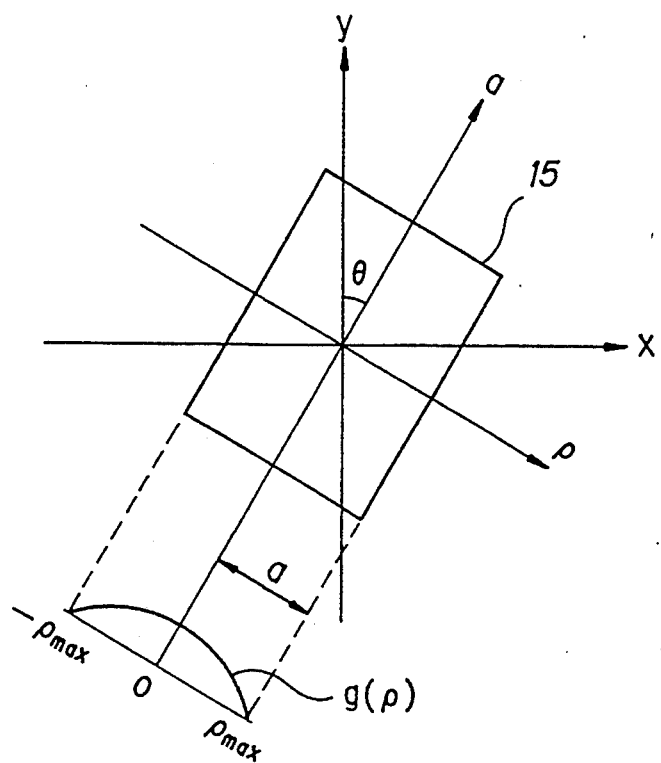
FIG. 39 is a diagram for describing a correction by weighting in conformity with position along a $p$ axis.

FIG. 39 is an explanatory view for a case in which a receptive-field image is weighted in dependence upon position along the $\rho$ axis. The weighting of the image data is reduced as both sides of the projection grid are approached. Let g represent the weighting function. By way of example, the weighting function g can be expressed as follows:

$$g(\rho) = \sin\{(90 \cdot \rho/\rho_{max}) + 90\} \quad (6)$$

where $-\rho_{max} \leq \rho \leq \rho_{max}$ holds.

Figure 40:
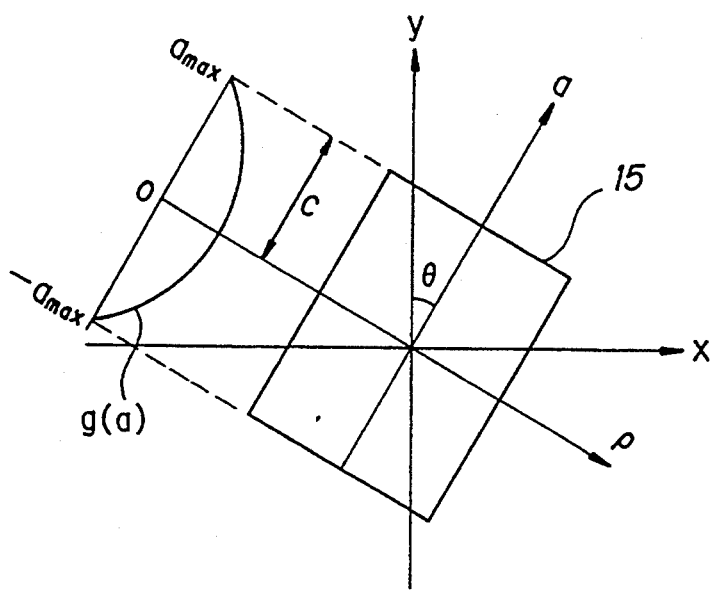
FIG. 40 is a diagram for describing a correction by weighting in conformity with position along an a axis.

FIG. 40 is an explanatory view for a case in which a receptive-field image is weighted in dependence upon position along the a axis. The weighting of the image data is reduced as both sides of the projection grid are approached. By way of example, the weighting function g can be expressed as follows:

$$g(a) = \sin\{(90 \cdot a/a_{max}) + 90\} \quad (7)$$

where $-a_{max} \leq \rho \leq a_{max}$ holds.

Figure 41A:
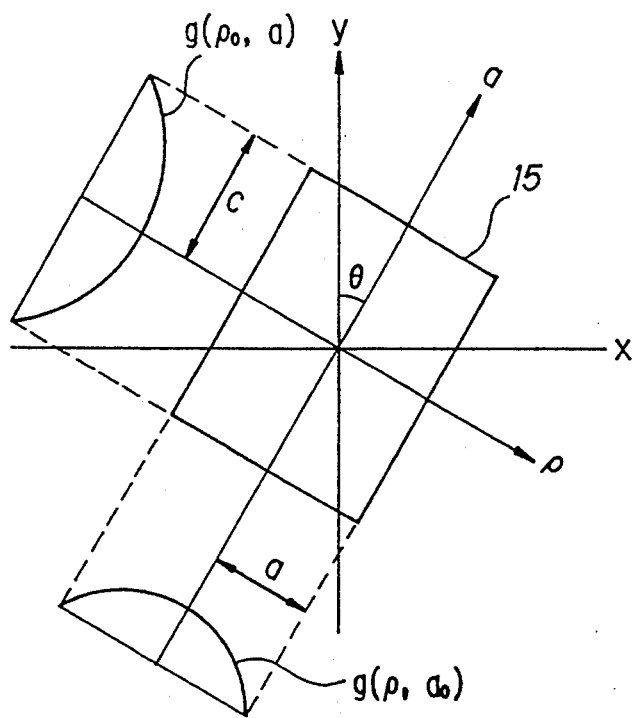
FIGS. 41(a)-(b) are a diagram for describing a correction by weighting in conformity with a (ρ,θ) position.

FIG. 41(a) is an explanatory view for a case in which a receptive-field image is weighted in dependence upon the position $\rho,\theta$. By way of example, a weighting function $h(\rho,\theta)$ can be expressed as follows:

$$h(\rho,\theta) = \sin t \quad (8)$$

$$t = 90 \cdot (\sqrt{\rho^2 + a^2})/\left(\sqrt{\rho_{max}^2 + a_{max}^2}\right) + 90$$

Figure 41B:
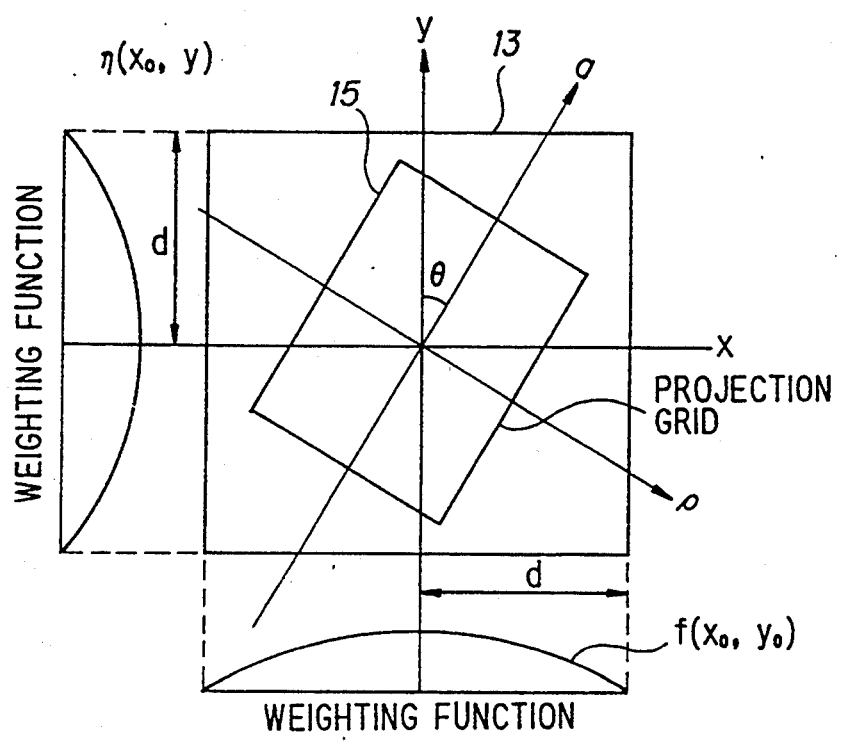

Though the weighting function is decided based upon the position $\rho$, a of the projection grid, it is also possible to decide the weighting function based upon the position (x,y) of receptive-field pixels. FIG. 41(b) is an explanatory view for such a case. Here it is so arranged that the size of the projection grid 15 will not protrude beyond the receptive field 13 at all four corners even if the projection grid 15 is rotated. In order to so arrange it that the size of the projection grid 15 will not protrude beyond the receptive field 13, the size of the projection grid 15 is reduced or the size of the receptive field is enlarged.

Here a weighting function $\eta(x,y)$ can be expressed as follows, by way of example:

$$\eta(x,y) = \sin t \quad (9)$$

$$t = 90 \cdot (\sqrt{x^2 + y^2})/\left(\sqrt{x_{max}^2 + y_{max}^2}\right) + 90$$

Thus, the closer the pixel position in the receptive field is to the periphery, the smaller weighting becomes. In FIG. 41, $x_{max} = y_{max} = d$.

FIG. 42 is a block diagram showing a line-segment extracting apparatus for a case in which projection values are calculated upon weighting a receptive-field image based upon the position (x,y) of receptive-field pixels.

This apparatus differs from that of the embodiment of FIG. 9 in that a weighting unit 28, which performs weighting in accordance with Equation (9), between the receptive-field memory 14 and the projection-value arithmetic unit 21. The weighting unit 28 calculates weighting $\eta(x_0,y_0)$ in accordance with Equation (9) based upon a pixel position $(x_0,y_0)$ entered from the address converter 20, multiplies the image data, which has been read out of the receptive-field memory (memory cache) 14, by this weighting and applies the product to the projection-value arithmetic unit 21.

(b-4) Correction by vignette processing

The fact that the portions $15a \sim 15d$ of the projection grid which do not overlap the receptive field occur means that the importance of the receptive-field image corresponding to the pixels at the edges of the projection grid is small. Accordingly, projection values are calculated upon weighting the receptive-field image in dependence upon the $(\rho,\theta)$ position.

Figure 43:
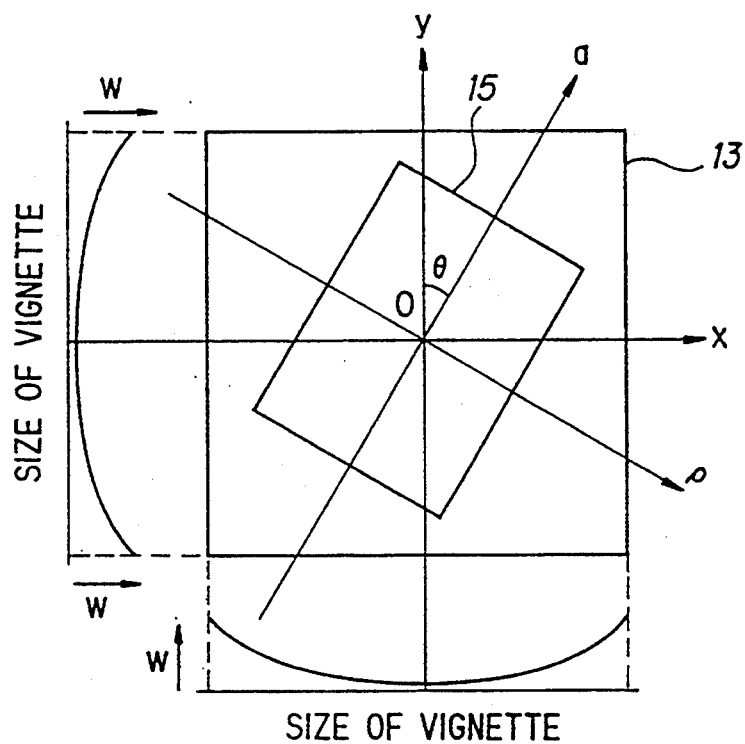
FIG. 43 is a diagram for describing a correction by vignette processing in conformity with a (ρ,θ) position.

FIG. 43 is an explanatory view for a case in which a receptive-field image is subjected to vignette processing in dependence upon the $(\rho,\theta)$ position. Here it is so arranged that the size of the projection grid 15 will not protrude beyond the receptive field 13 at all four corners even if the projection grid 15 is rotated. The closer the pixel position in the receptive field is to the periphery, the larger the size w of the vignetting shade becomes.

Figure 44:
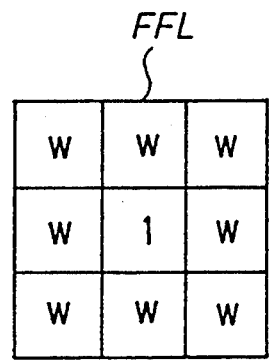
FIG. 44 is an explanatory view of a two-dimensional filter used in vignette processing.

In vignette processing, a two-dimensional filter FFL is provided, as shown in FIG. 44. The filter FFL comprises, say, 3×3 pixels, among which the central pixel is assigned a weight of 1 while the peripheral pixels are assigned a weight of w ($0 < w < 1$). The method includes superimposing the two-dimensional filter FFL upon the receptive-field image, calculating the sum of the products of the weight of each pixel of the filter FFL and the image data of the receptive-field pixels corresponding to the pixels of the filter, dividing the sum of the products by the total value W of weighting (W=n·w+1, where n is the number of pixels in the filter), and adopting the quotient as image data of the receptive-field pixel conforming to the central pixel of the two-dimensional filter FFL.

More specifically, assume that the items of image data of receptive-field pixels corresponding to the pixels of the 3×3 two-dimensional filter FFL are $f(x-1,y-1)$, $f(x,y-1)$, $f(x+1,y-1)$, $f(x-1,y)$, $f(x,y)$, $f(x+1,y)$, $f(x-1,y+1)$, $f(x,y+1)$, $f(x+1,y+1)$. In such case, vignette image data $F(x,y)$ at (x,y) in the receptive field 13 will be calculated in accordance with the following equation:

$$F(x,y) = \{w \cdot f(x-1,y-1) + w \cdot f(x,y-1) + \quad (10)$$
$$w \cdot f(x+1,y-1) + w \cdot f(x-1,y) +$$
$$w \cdot f(x,y) + w \cdot f(x+1,y) +$$
$$w \cdot f(x-1,y+1) + w \cdot f(x,y+1) +$$
$$w \cdot f(x+1,y+1)\}/(8 \cdot w + 1)$$

In this case, vignetting is not applied when w=1 holds. The smaller the value of w, the larger the amount of vignetting. If we let r represent the distance from the center of the receptive field, then w cab be expressed by the following equation:

$$w(r) = C\left(r/\sqrt{x_{max}^2 + y_{max}^2}\right) \quad (11)$$

where $r = \sqrt{x^2 + y^2}$ holds and C( ) is decided by a function that raises fractions of the numerical value within the parentheses.

Figure 45:
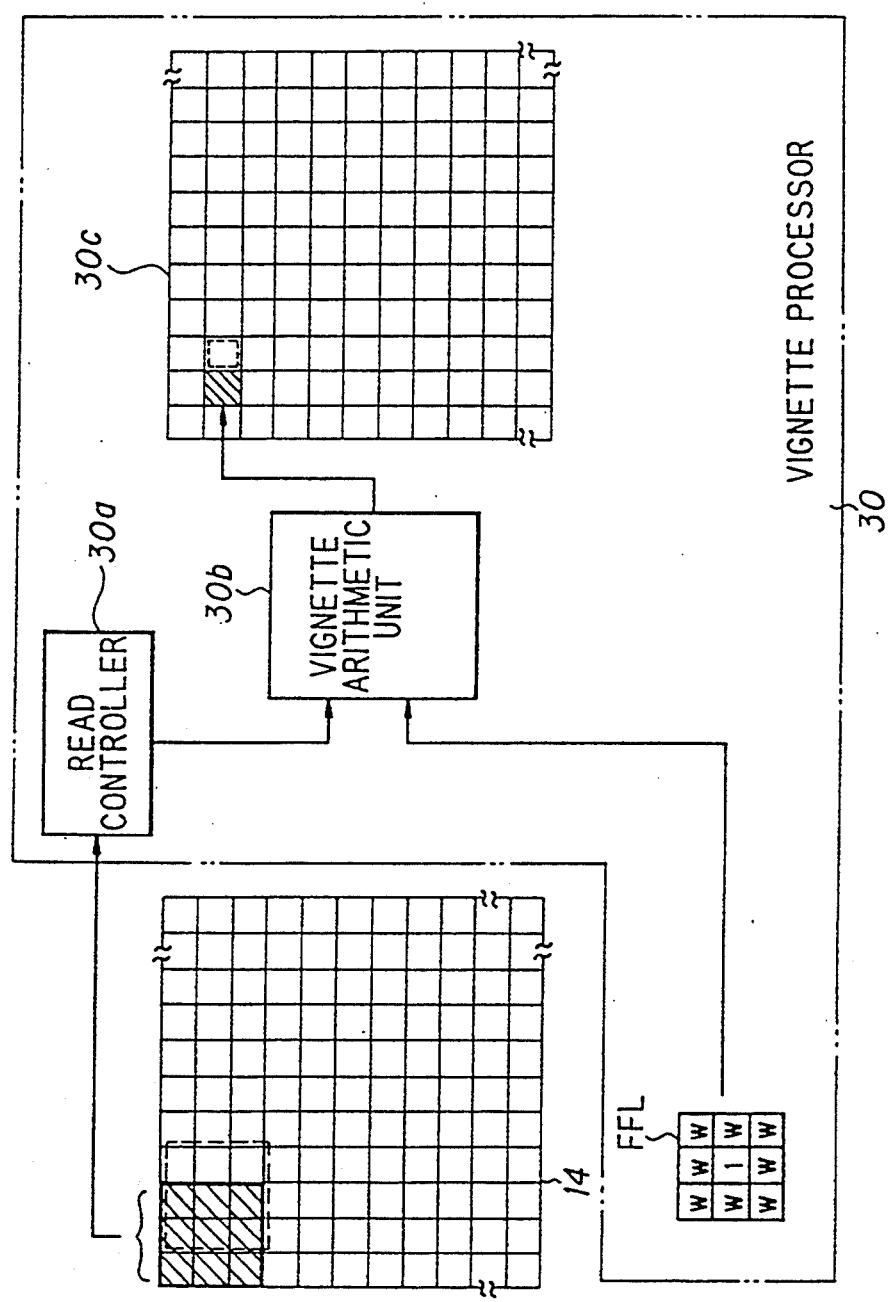
FIG. 45 is a block diagram of a hardware configuration for executing vignette processing.

FIG. 45 is a block diagram of the hardware configuration for executing vignette processing. Numeral 14 denotes the receptive-field memory, and numeral 30 designates a vignette processing unit, which includes a read controller 30a, a vignette arithmetic unit 30b for executing vignette processing in accordance with Equations (10), (11), a memory 30c for storing the results of vignette processing, and the two-dimensional filter FFL. The read controller 30a reads out the image data of the 3×3 area (the hatched portion) on which the two-dimensional filter is superimposed and inputs the read data to the vignette arithmetic unit 30b. The arithmetic unit 30b calculates the vignette coefficient w(r) in accordance with Equation (11), computes the vignette image data in accordance with Equation (10) and stores the results at the hatched location of the memory 30c. Next, the read controller 30a shifts the 3×3 area overlapped by the two-dimensional filer one pixel to the right in the horizontal direction (see the dashed line), similar vignette processing is executed and the results of calculation are stored in the location of memory 30c indicated by the dashed line. Thereafter, and in similar fashion, vignette processing is executed by shifting the position of the 3×3 receptive-field image, which is read out of the receptive-field memory 14, one pixel at a time in the manner of raster scanning.

Figure 46:
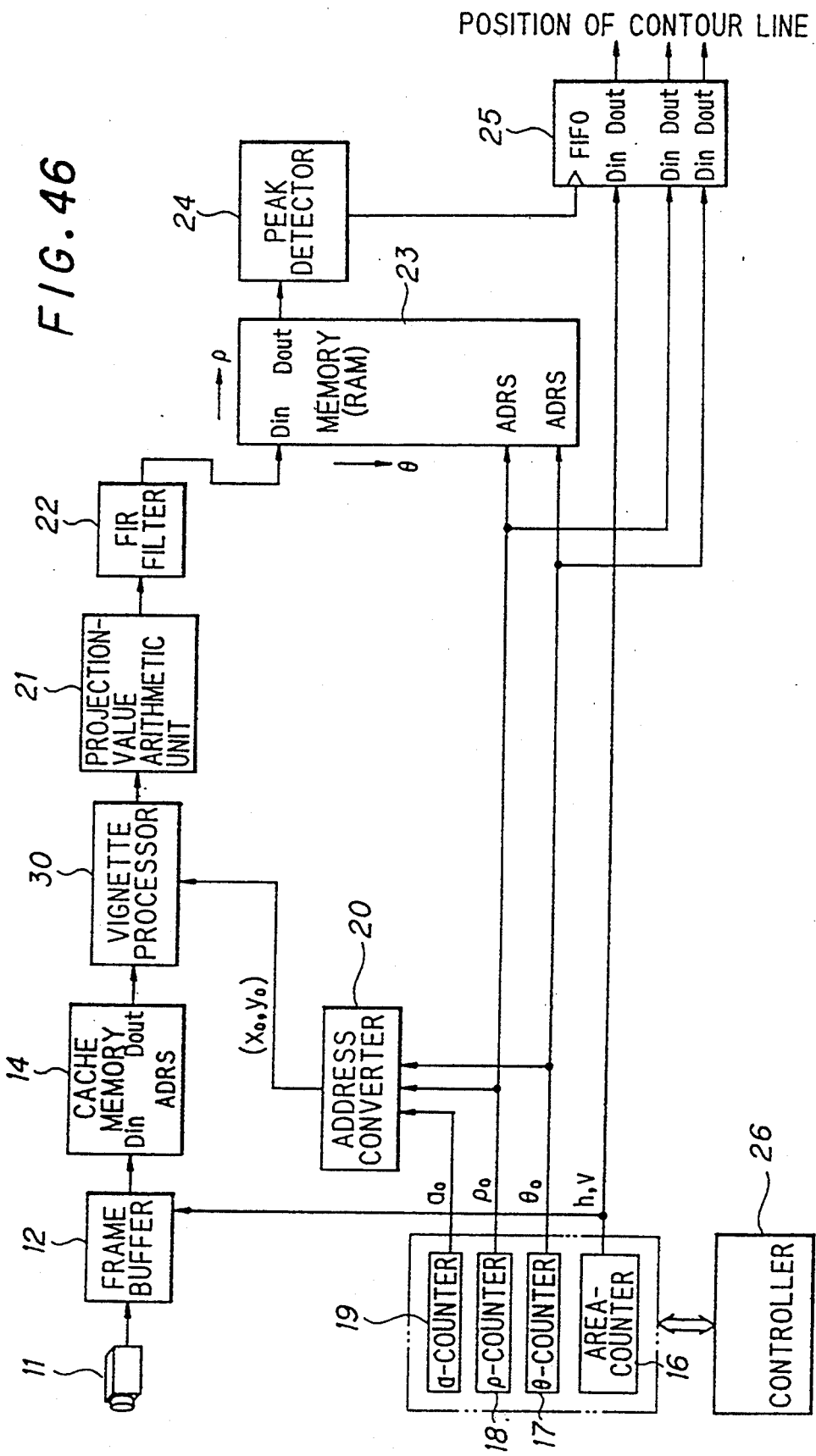
FIG. 46 is a block diagram illustrating a line-segment extracting apparatus equipped with vignette function.

The image data to which this vignette processing has been applied is subjected to calculation for obtaining projection values. FIG. 46 is a block diagram showing an embodiment of a line-segment extracting apparatus for a case in which projection values are calculated upon applying vignette processing to a receptive-field image based upon the position (x,y) of receptive-field pixels.

This apparatus differs from that of the embodiment of FIG. 9 in that the vignette processing unit 30 of FIG. 45 is provided between the receptive-field memory (memory cache) 14 and the projection-value arithmetic unit 21. Data is read out of the memory 30c (FIG. 45) from the location designated by the address $(x_0,y_0)$ outputted by the address converter 20, and the read data is fed into the projection-value arithmetic unit 21.

(c) Processing for correcting projection values

In the foregoing description, pixel positions within the receptive field that correspond to the pixels within the projection grid 15 are found by rounding $(x_0,y_0)$ to the nearest whole number, wherein $(x_0,y_0)$ is obtained by the coordinate transformation according to Equations (1)′, (2)′ (see FIG. 8). This means that projection data is calculated by approximating a certain pixel within the projection grid 15 as being one that overlaps one pixel even if it overlaps a plurality of pixels within the receptive field, and accumulating the pixel data of this pixel. Consequently, with the line-segment extracting method described above, noise due to quantization (noise due to approximation) is contained in the results of projections.

(c-1) Principle of reducing quantization noise

Figure 47:
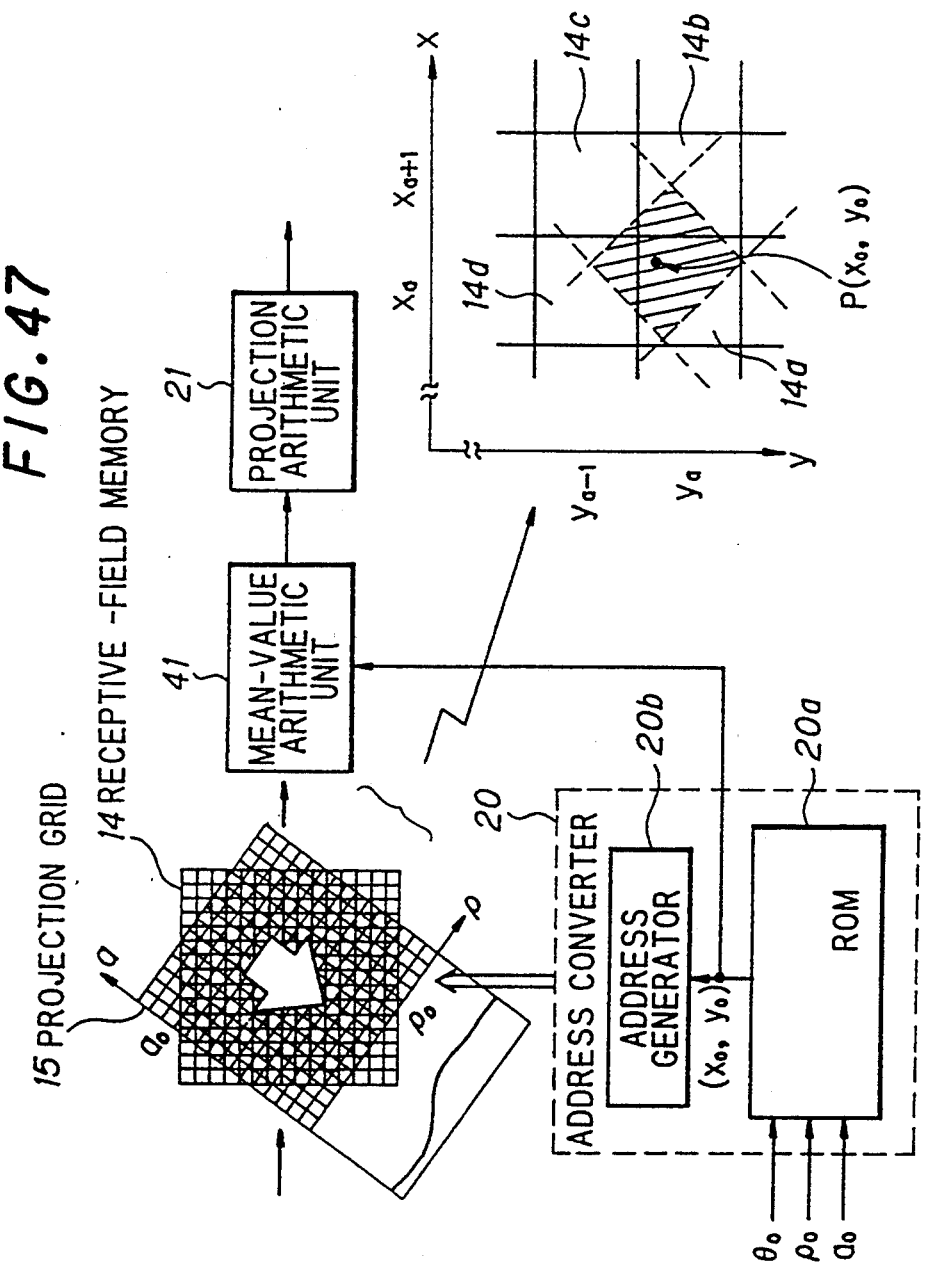
FIG. 47 is an explanatory view of processing for correcting projection values.

FIG. 47 is an explanatory view for describing the reduction of quantization noise.

The receptive-field memory (cache memory) 14 stores the receptive-field image clipped from the image memory. The rectangular projection grid 15 has sides parallel to the projection direction (a-axis direction) and the direction ($\rho$-axis direction) perpendicular to the projection direction. Numeral 20 denotes the address converter, 41 a mean-value arithmetic unit for calculating the weighted mean value of the image data of adjoining pixels, and 21 the projection-value arithmetic unit, which outputs a projection value upon accumulating the weighted mean value of the pixel data. The address converter 20 in FIG. 47 includes a ROM 20a and an address generator 20b.

Here x-y coordinate values $(x_0,y_0)$ (which include decimal places) in the receptive field that conform to pixel positions $(\rho,a)$ within the projection grid are stored beforehand, for every projection direction, in the ROM 20a of the address converter 20. In a case where a projection value is calculated at a projection direction $\theta_0$ and $\rho=\rho_0$ under these conditions, position data $(x_0,y_0)$ of a point P in the x-y coordinate system that conforms to a pixel position $(\rho_0,a_0)$ within the projection grid is read out of the ROM 20a. The address generator 20b successively generates pixel addresses $(x_a,y_a)$, $(x_{a+1},y_a)$, $(x_a,y_{a-1})$, $(x_{a+1},y_{a-1})$ of a pixel 14a within the receptive field and conforming to the position $P(x_0,y_0)$, and of pixels 14b~14d adjacent to the pixel 14a, thereby causing the image data of each pixel to be read out of the receptive-field memory 14 and fed into the mean-value arithmetic unit 41. As a result, the mean-value arithmetic unit 41 calculates the weighted mean value of each entered item of image data based upon the distance from, say, the position $P(x_0,y_0)$ to the center of each of the neighboring pixels 14a~14d. Thereafter, and in similar fashion, the mean-value arithmetic unit 41 calculates the weighted mean value with respect to each pixel at value $\rho_0$ along the $\rho$ axis in the projection grid 15, and the projection-value arithmetic unit 21 accumulates the weighted mean values to calculate the projection value in the $\theta$ direction at $\rho=\rho_0$. Accordingly, if a pixel within the projection grid 15 overlaps a plurality of pixels within the receptive field, the image data of each pixel is weighted in conformity with the degree of overlapping, the mean value thereof is calculated and the mean value is used to obtain a highly precise projection value. The result is that highly precise line-segment extraction can be performed.

(c-2) Embodiment of projection-value correction

Figure 49A:
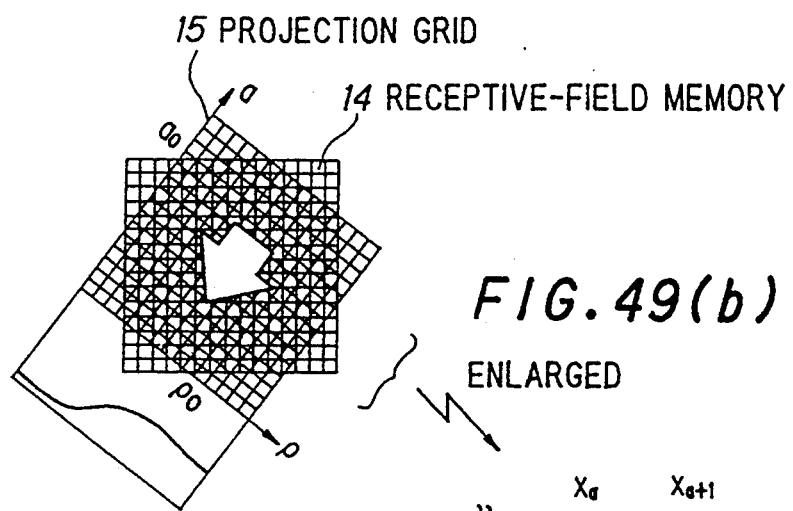
FIGS. 49(a)-(b) are an explanatory view of address conversion.
Figure 49C:
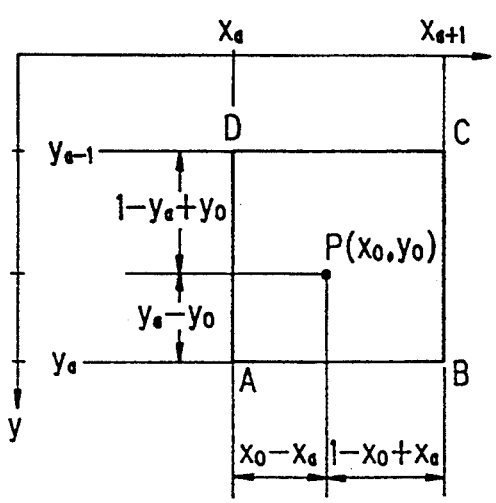

FIG. 48 is a block diagram illustrating a line-segment extracting apparatus capable of performing processing for correcting projection values, and FIG. 49 is an explanatory view of address conversion. Numeral 11 denotes the camera for capturing an image, which is stored by the image memory (a frame buffer) 12. The receptive-field memory (cache memory) 14 stores the receptive-field image clipped from the image memory 12. The rectangular projection grid 15 (see FIG. 49) has sides parallel to the projection direction (a-axis direction) and the direction ($\rho$-axis direction) perpendicular to the projection direction. The area counter 16 designates horizontal and vertical positions h, v (the initial values of which are 0,0) of the receptive-field image clipped from the image memory 12, the $\theta$-counter 17 (the initial value of which is 0) successively increments the projection-direction angle $\theta_0$ by a predetermined amount $\Delta\theta$, the $\rho$-counter 18 (the initial value of which is 0) successively increments the value $\rho_0$ along the $\rho$ axis, and the a-counter 19 (the initial value of which is 0) successively increments the value $a_0$ along the a axis.

The address converter 20, which generates the addresses of a plurality of adjacent pixels of the receptive field conforming to one pixel within the projection grid 15, has the ROM 20a and the address generator 20b. Here x-y coordinate values $(x_0,y_0)$ (which include decimal places) in the receptive field that conform to pixel positions $(\rho,a)$ within the projection grid 15 are stored, for every projection direction $\theta$, in the ROM 20a. The address generator 20b successively generates pixel addresses $(x_a,y_a)$, $(x_{a+1},y_a)$, $(x_a,y_{a-1})$, $(x_{a+1},y_{a-1})$ of a pixel 14a, within the receptive field, that includes a receptive-field position P [see FIG. 49(b)] conforming to the position $(\rho_0,a_0)$ within the projection grid 15, and of pixels 14b~14d adjacent to the pixel 14a.

Numeral 41 denotes the mean-value arithmetic unit for calculating the weighted mean value of the image data of adjoining pixels. Let the centers of the four mutually adjacent pixels $14a \sim 14d$ be represented by A, B, C, D [see FIGS. 49(b), (c)], respectively. In such case, the x, y coordinates of each of the center points A, B, C, D will be $(x_a, y_a)$, $(x_{a+1}, y_a)$, $(x_a, y_{a-1})$, $(x_{a+1}, y_{a-1})$. Further, the distances from point P to point A in the x and y directions are $(x_0 - x_a)$, $(y_a - y_0)$; the distances from point P to point B in the x and y directions are $(1 - x_0 + x_a)$, $(y_a - y_0)$; the distances from point P to point C in the x and y directions are $(1 - x_0 + x_a)$, $(1 - y_a + y_0)$; and the distances from point P to point D in the x and y directions are $(x_0 - x_a)$, $(1 - y_a + y_0)$. Accordingly, the mean-value arithmetic unit 41 calculates the weighted mean value of the image data of mutually adjacent pixels in accordance with the following equation, in which Ia, Ib, Ic, Id represent the image data of the pixels $14b \sim 14d$:

$$\begin{aligned} Im = \ & (1 - x_0 + x_a) \cdot (1 - y_a + x_0) \cdot Ia \ + \\ & (x_0 - x_a) \cdot (1 - y_a + y_0) \cdot Ib \ + \\ & (x_0 - x_a) \cdot (y_a - y_0) \cdot Ic \ + \\ & (1 - x_0 + x_a) \cdot (y_a - y_0) \cdot Id \end{aligned} \quad (12)$$

The projection-value arithmetic unit 21 accumulates the weighted mean values of the pixel data to calculate the projection values. The FIR filter (digital filter) 22 subjects the projection values to linear differentiation processing successively along the $\rho$ axis. The memory (RAM) 23 stores the results of differentiation upon expanding them on the $\rho$-$\theta$ plane. By way of example, the RAM 23 has $\theta$ addresses along the vertical direction and $\rho$ addresses along the horizontal direction. The peak detector 24 scans the differential values in the $\rho$-$\theta$ plane and detects a peak position, and the storage unit (FIFO memory) 25 stores the peak position on the $\rho$-$\theta$ plane. The control unit 26 executes overall control.

(c-3) Overall operation

The image of an object captured by the camera 11 is stored in the image memory 12, after which the receptive-field image designated by the content (h,v) (the initial values of which are 0,0) of the area counter 16 is clipped from the image memory 12 and stored in the receptive-field memory 14.

Next, a projection value, which is obtained by projecting the receptive-field image upon the $\rho$ axis from a predetermined projection direction $\theta_0$ (the initial value of which is 0), is calculated. More specifically, $\theta_0$, $\rho_0$, $a_0$ are inputted to the address converter 20, wherein the relations $\rho = \rho_0$ (the initial value of which is 0) and $a = a_0$ (the initial value of which is 0) hold. As a result, the ROM 20a inputs the x,y coordinate values $(x_0, y_0)$ of the receptive-field point P [see FIG. 49(b)], which conforms to $(\theta_0, \rho_0, a_0)$, to the address generator 20b an mean-value arithmetic unit 41.

Using the x,y coordinate values $(x_0, y_0)$ of the receptive-field point P entered from the ROM 20a, the address generator 20b successively generates, and applies to the receptive-field memory 14, the pixel addresses $(x_a, y_a)$, $(x_{a+1}, y_a)$, $(x_a, y_{a-1})$, $(x_{a+1}, y_{a-1})$ of the pixel 14a, within the receptive field, that includes the position P, and of pixels $14b \sim 14d$ adjacent to the pixel 14a. If it is assumed that F( ) is a function for forming a whole number by discarding figures before the decimal place, then $x_a$, $y_a$ can be expressed as follows:

$$x_a = F(x_0), y_a = F(y_0)$$

The receptive-field memory 14 reads the items of image data Ia, Ib, Ic, Id out of the locations designated by the entered pixel addresses $(x_a, y_a)$, $(x_{a+1}, y_a)$, $(x_{a+1}, y_{a-1})$, $(x_{a+1}, y_{a-1})$ and inputs this data to the mean-value arithmetic unit 41. The latter calculates the weighted mean of these four items of image data in accordance with Equation (12) and inputs the weighted mean to the projection-value arithmetic unit 21. The latter successively accumulates the weighted mean values applied thereto.

This is followed by incrementing $(a_0 + 1 \rightarrow a_0)$ the count in the a-counter 19, applying the count to the address converter 20 and performing the control described above. When the value $a_0$ of the a-counter 19 becomes equal to the width of the projection grid 15 along the a axis, the projection-value arithmetic unit 21 inputs the accumulated results to the FIR filter 22 as the projection value which prevails when $\rho = \rho_0$ holds.

Each time a projection value enters from the projection-value arithmetic unit 21, the FIR filter 22 executes linear differentiation processing and applies the results to the memory 23. The memory 23 then stores the results at a location (a matrix intersection on the $\rho$-$\theta$ plane) designated by the value $\rho_0$ in the $\rho$-counter 18 and the count $\theta_0$ in the $\theta$-counter 17.

Next, the count in the $\rho$-counter 18 is incremented $(\rho_0 + 1 \rightarrow \rho_0)$, the count in the a-counter 19 is cleared to zero and the foregoing processing repeated. Projection values at points $\rho_0$ are successively obtained and fed into the FIR filter 22, and the differential values are stored in the memory 23. When the value $\rho_0$ in the $\rho$-counter 18 becomes equal to the width of the projection grid 15 along the $\rho$ axis, which means that the calculation of projection values has been completed, the calculation of projection values in the projection direction $\theta_0$ ends and all of the differential values along the $\rho$ axis at $\theta = \theta_0$ are stored in the memory 23.

Thereafter, the count in the $\theta$-counter 17 is incremented $(\theta_0 + 1 \rightarrow \theta_0)$, the counts in the a-counter 19 and $\rho$-counter 18 are cleared to 0, the foregoing processing is repeated and the differential values of the projection values in all projection directions are stored on the $\rho$-$\theta$ plane of memory 23. When the differential values along the $\rho$ axis of the projection values in all projection directions are stored on the $\rho$-$\theta$ plane of memory 23, the differential values in amounts of $3 \times 3$ pixels are read out of the memory 23 while scanning is performed successively along the $\rho$ and $\theta$ directions, and the results are fed into the peak detector 24. The latter performs peak detecting processing based upon the differential values of $3 \times 3$ pixels, thereby obtaining the peak position $(\rho, \theta)$. The peak position $(\rho, \theta)$ and the contents (h,v) of the area counter 16 are stored in the FIFO memory 25. As a result, the direction $\theta$ of the line segment, such as an edge or contour line, contained in the prescribed receptive-field image and the position along the $\rho$ axis are stored in the FIFO memory 25.

If the area counter 16 is subsequently incremented and the foregoing processing is executed with regard to all of the receptive-field images, the direction $\theta$ and the $\rho$-direction position regarding the entire image will be stored in the FIFO memory 25.

Thus, if a pixel within the projection grid 15 overlaps a plurality of pixels within the receptive field, the image data of each pixel is weighted in conformity with the degree of overlapping, the mean value thereof is obtained and the mean value is used to obtain a highly precise projection value. The result is that highly precise line-segment extraction can be performed.

Though the relationship between the receptive field and the size of the projection grid is not described above, it is assumed that the size of the projection grid 15 is such that the four corners of the grid will not protrude from the receptive field even when the grid is rotated.

(c-4) Alternative embodiment of method of calculating weighted mean values

FIG. 50 is a diagram for describing another embodiment of a method of calculating weighted mean values.

Figure 50A:
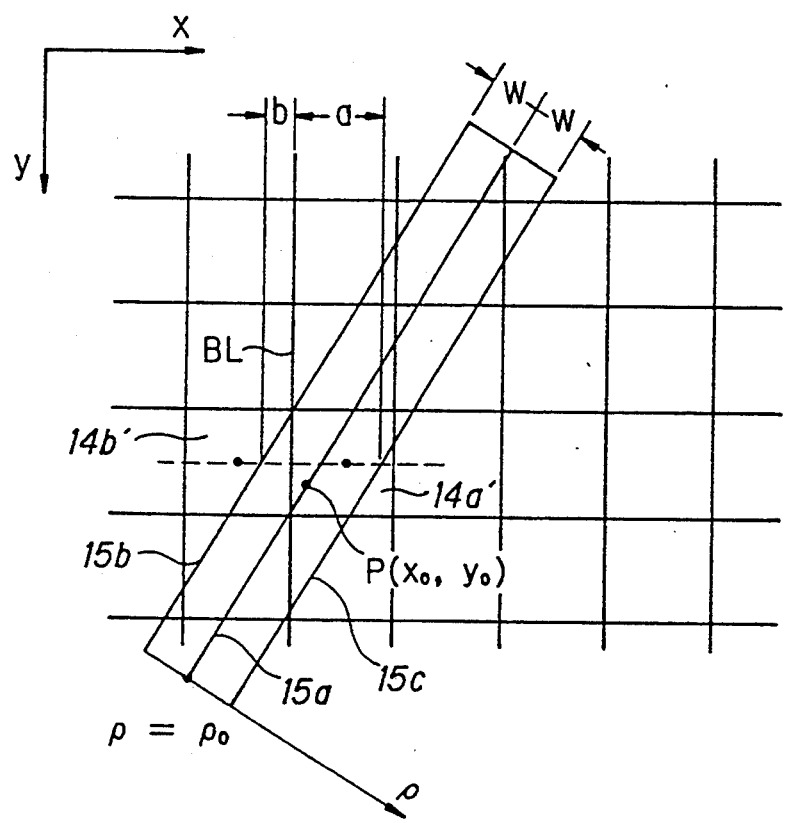
FIGS. 50(a)-(b) are a diagram for describing a method of calculating a weighted mean value.

When $\theta_0$, $\rho_0$, $a_0$ are inputted to the address converter 20, the ROM 20a inputs the x, y coordinates $(x_0, y_0)$ of the receptive-field position P [see FIG. 50(a)] conforming to $(\theta_0, \rho_0, a_0)$ to the address generator 20b and mean-value arithmetic unit 41. As a result, the address generator 20b successively generates the pixel address $(x_a, y_a)$ of a pixel 14a', within the receptive field, that includes the receptive-field position P $(x_0, y_0)$, as well as the pixel address $(x_{a-1}, y_a)$ of a pixel 14b' adjacent the pixel 14a' in the horizontal direction. It should be noted that of the pixels neighboring the pixel 14a' to its left and right, that pixel nearest to the point P has its address generated as the adjacent pixel.

The receptive-field memory 14 reads image data $I_a'$, $I_b'$ out of the locations designated by the pixel addresses $(x_a, y_a)$, $(x_{a-1}, y_a)$ and inputs this data to the mean-value arithmetic unit 41. The latter then calculates the weighted mean of these two items of image data in the manner set forth below and inputs the weighted mean to the projection-value arithmetic unit 21. Specifically, the arithmetic unit 21 sets first and second parallel lines 15b, 15c (FIG. 50) at positions on both sides of a projection center line 15a at a distance w from the center line. The projection center line 15a connects the centers of pixels, within the projection grid, for which the value along the $\rho$ axis is $\rho_0$. Next, the arithmetic unit 21 calculates horizontal and vertical distances a, b from a boundary line BL between the mutually adjacent pixels 14a', 14b' to the first and second parallel lines 15b, 15c, respectively, calculates the weighted mean value in accordance with the equation $$Im = I_a \cdot a/L + I_b \cdot b/L \quad (13)$$

Figure 50B:
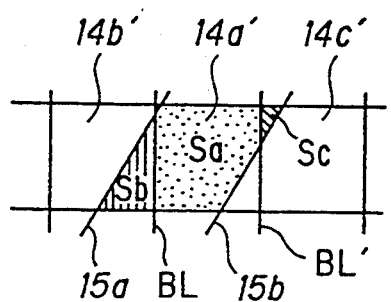

(where $a+b=L$) and inputs the weighted value to the projection-value arithmetic unit 21. Furthermore, as illustrated in FIG. 50(b), the mean-value arithmetic unit 41 is capable of calculating areas Sa, Sb, Sc of regions bounded by boundary lines BL, BL' between the three contiguous pixels 14a', 14b', 14c' in the horizontal direction and the parallel lines 15b, 15c, and of calculating the weighted mean value in accordance with the following equation:

$$Im = I_a \cdot S_a/S + I_b \cdot S_b/S + I_c \cdot S_c/S \quad (14)$$

(where $S_a + S_b + S_c = S$).

(d) Method of generating addresses

In the foregoing description, the x-y addresses, in the receptive field, conforming to all pixel positions $(\rho, a)$ within the projection grid 15 are stored in the ROM 20a for each and every projection direction $\theta$. As a consequence, a very large-capacity ROM is required.

(d-1) Principle through which ROM capacity is reduced

Figure 51:
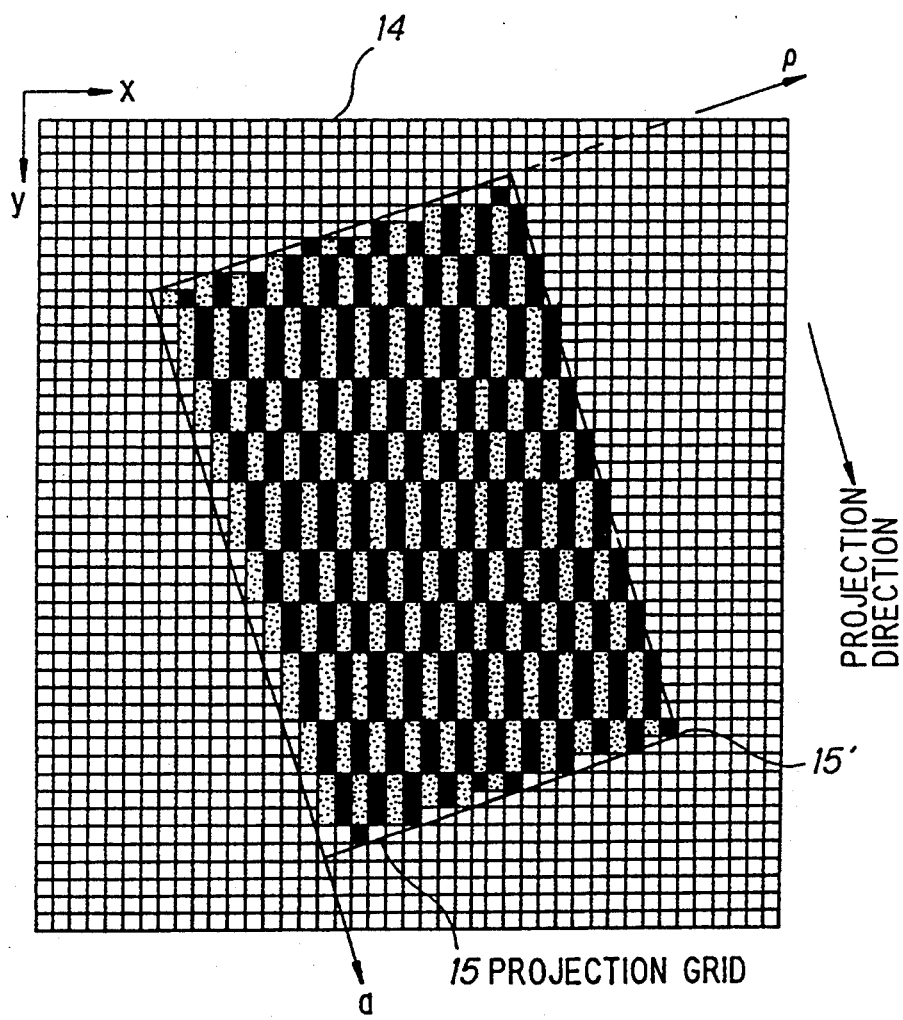
FIG. 51 is a diagram for describing the principle through which pixel addresses of a receptive-field image are generated.

The principle through which ROM capacity can be reduced will be described in accordance with FIGS. 51 through 53.

The projection grid 15 (FIG. 51), whose sides are parallel to the projection direction (a-axis direction) and $\rho$-axis direction, is subdivided into square meshes (pixels) of one-pixel width, and 1:1 correlation is established between these pixels and the pixels of the receptive-field memory 14 overlapped to the greatest extent. When this is done, the overall shape 15' of the receptive-field pixels corresponding to the pixels of the projection grid 15 is indicated in gray (the dotted areas) and black in FIG. 51, and each side forms a polygonal line that varies in a step-like manner along the $\rho$ axis and a axis. The overall shape 15' of the receptive-field pixels has the following three characteristics:

(1) The receptive-field pixel pattern (the polygonal-line pattern indicated by gray or black along the a axis) corresponding to the group of pixels, within the projection grid 15, for which the position along the $\rho$ axis is $\rho_0$ has the same shape even if $\rho$ changes.

(2) The y address of the leading pixel of each receptive-field pixel pattern varies in dependence upon the angle $\theta$ of the projection direction. Within one pattern, the y address is always incremented along the a axis.

(3) The x address varies in dependence upon the angle $\theta$ of the projection direction within one receptive-field pixel pattern. The pattern is always incremented whenever there is a shift to the right.

Accordingly, if the y address of the lead pixel of each receptive-field pixel pattern is stored in the ROM in advance, the y address of a predetermined pattern can be obtained by reading the y address of the lead pixel of the pattern out of the ROM and successively incrementing it. Further, if the x address of each pixel in a receptive-field pixel pattern conforming to $\rho=0$ is stored in the ROM in correlation with the y address, the x address of each pixel of any receptive-field pixel pattern can be obtained by a translation from the x address that has been stored in the ROM.

Figure 52:
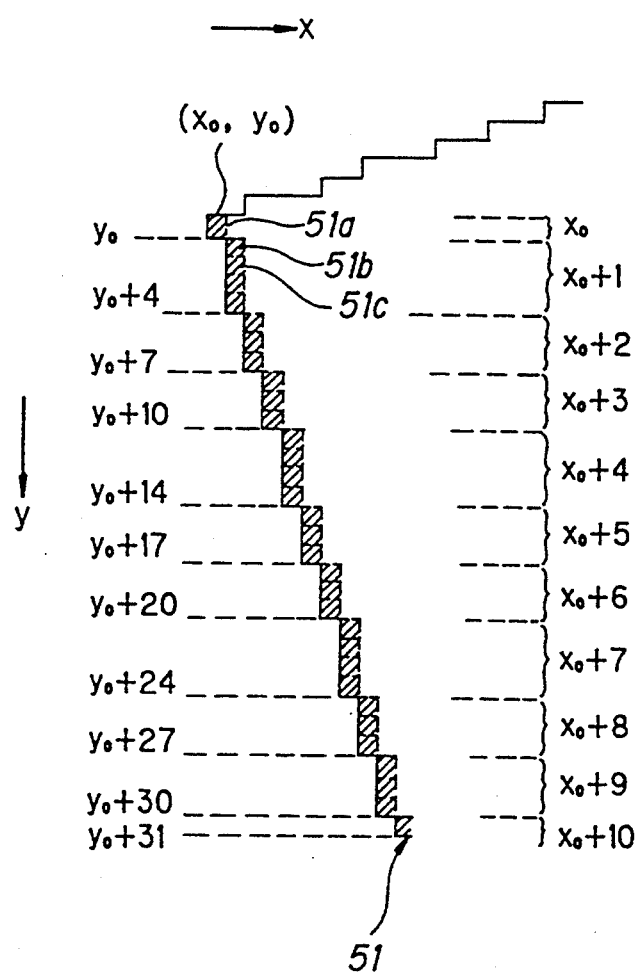
FIG. 52 is a diagram for describing the correlation between y and x addresses.

FIG. 52 is a diagram useful in describing the manner in which the x address of each pixel in a receptive-field pixel pattern 51, which conforms to $\rho=0$, is stored in a ROM in correlation with the y address. Let $y_0$ represent the y address of a lead pixel 51a in the receptive-field pixel pattern 51. The y addresses of pixels 51b, 51c, ... are successively incremented. The x addresses change in a manner which varies depending upon the angle $\theta$ of the projection direction. In the example of FIG. 52, the x address is $x_0$ when the y address is $y_0$; $x_0+1$ when the y addresses are $y_0+1 \sim y_0+4$; $x_0+2$ when the y addresses are $y_0+5 \sim y_0+7$; ... ; and $x_0+10$ when the y address is $y_0+31$. Accordingly, the correlation between the y address and x address is stored in the ROM for each and every angle $\theta$ of the projection direction.

Figure 53:
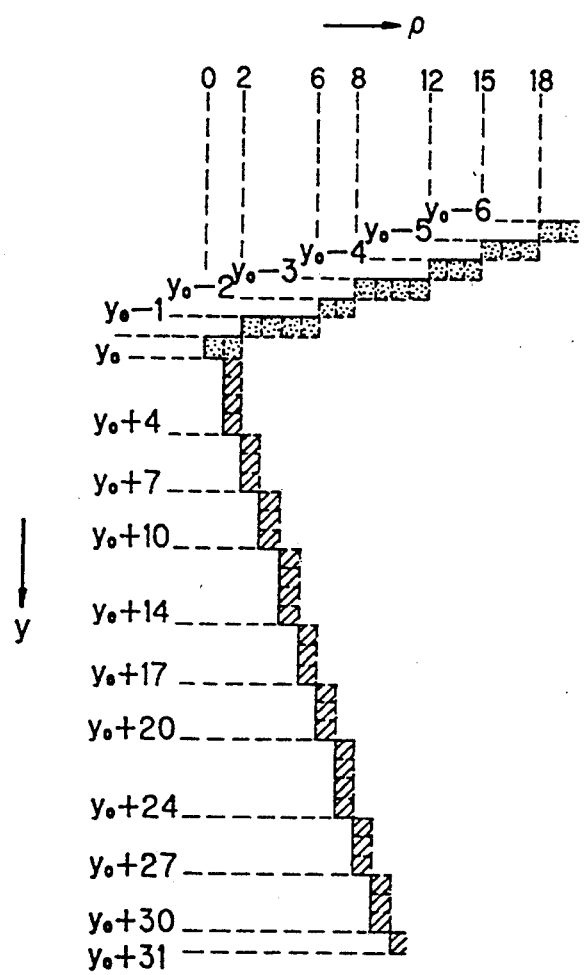
FIG. 53 is a diagram for describing the correlation between values of ρ and y addresses.

FIG. 53 is a diagram showing the correlation between the y address of the lead pixel in each receptive-field pixel pattern and value along the $\rho$ axis. The y address of the lead pixel changes in a manner which varies depending-upon the angle $\theta$ of the projection direction. In the example of FIG. 53, the y address is $y_0$ when $\rho$ is $0 \sim 1$; $y_0-1$ when $\rho$ is $2 \sim 5$; $y_0-2$ when $\rho$ is $6 \sim 7$; ... ; $y_0-5$ when $\rho$ is $15 \sim 17$; and $y_0-6$ when $\rho$ is 18 or greater. Accordingly, the correlation between the ρ value and y address is stored in the ROM for each and every angle θ of the projection direction.

(d-2) Configuration of address generator

Figure 54:
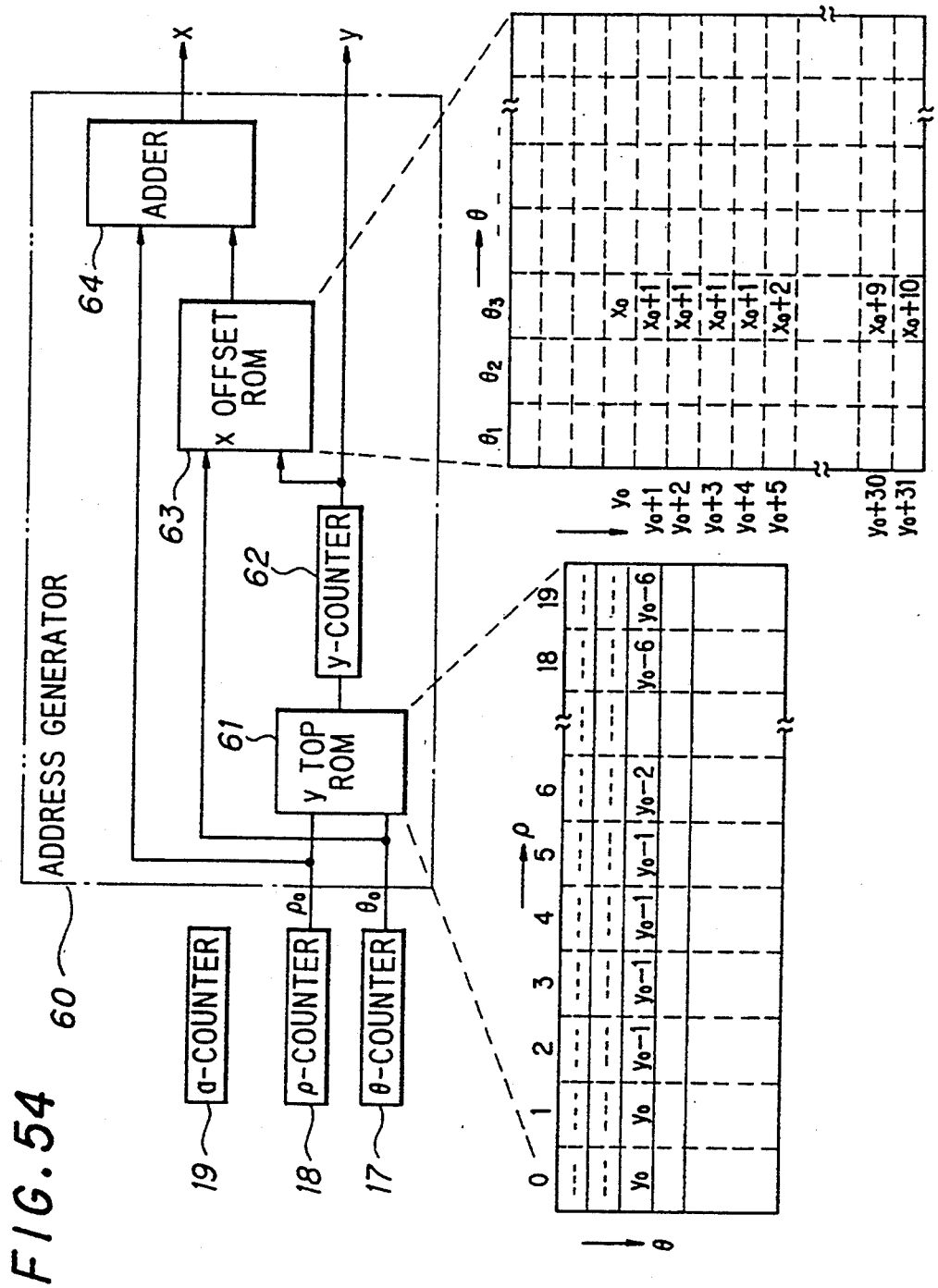
FIG. 54 is a block diagram showing an address generator for reducing ROM capacity.

FIG. 54 is a block diagram showing the configuration of an address generator for reducing ROM capacity. Only the portion that generates the x, y addresses of the receptive-field memory is illustrated.

Shown in FIG. 54 are the θ-counter 17 (the initial value of which is 0) that increments the projection-direction angle θ by a predetermined amount, the ρ-counter 18 (the initial value of which is 0) that increments the value $\rho_0$ along the 92 axis, the a-counter 19 (the initial value of which is 0) that increments the value $a_0$ along the a axis, and an address generator 60 that generates the x and y addresses of the receptive-field memory.

The address generator 60 includes a first memory (y-top ROM) 61 of ROM construction for storing the y address of the lead pixel (see FIG. 53) of each receptive-field pixel pattern in correlation with the value of ρ while varying the angle $\theta_0$ of the projection direction, a y-counter 62, in which the y address of the lead pixel in a prescribed receptive-field pixel pattern is set, with the y address being incremented in successive fashion, a second memory (x-offset ROM) 63 of ROM construction for storing the x address of each pixel in the receptive-field pixel pattern (see FIG. 52), which conforms to $\rho = 0$, in correlation with the y address while varying the angle $\theta_0$ of the projection direction, and an adder 64, which adds the content $\rho_0$ of the ρ-counter to the x address outputted by the second memory 63, and outputs the x address of each pixel of the receptive-field pixel pattern at $\rho = \rho_0$.

Figure 55:
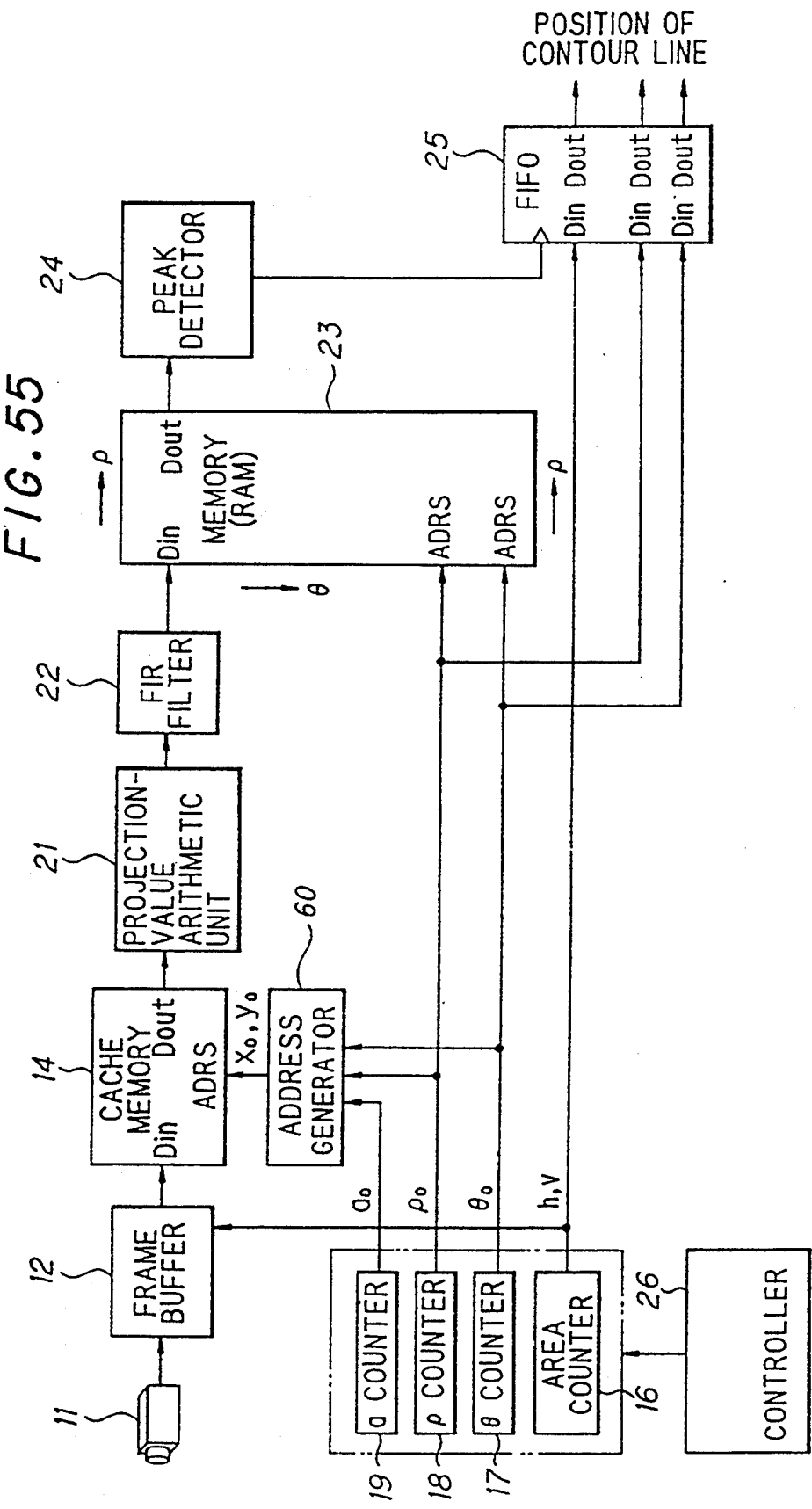
FIG. 55 is a block diagram illustrating a line-segment extracting apparatus that uses an address generator.

FIG. 55 is a block diagram showing the configuration of the line-segment extracting apparatus for the case in which use is made of the address generator 60 shown in FIG. 54. Elements in FIG. 55 identical with those in FIG. 48 are designated by like reference characters. The arrangement differs from that of FIG. 48 in that the address converter 20 and mean-value arithmetic unit 41 are eliminated from the line-segment extracting apparatus of FIG. 48 and are replaced by the address generator 60.

(d-3) Overall operation

FIG. 56 is a flowchart illustrating line-segment extraction processing for the case in which the address generator 60 is used.

The θ-counter 17, ρ-counter 18 and a-counter 19 are reset to 0 by starting the processing for line segment extraction. That is, the operations $0 \to \theta_0$, $0 \to \theta_0$ and $0 \to a_0$ are performed (steps 201~203). Next, the first memory 61 is accessed by the counts $\theta_0$, $\rho_0$ of the θ-counter 17 and ρ-counter 18, the y address of the lead pixel of the receptive-field pixel pattern at $\theta = \theta$ and $\rho = \rho_0$ is read out and this is set in the y-counter 62 (step 204).

Next, the second memory 63 is accessed by the count $\theta_0$ of the θ-counter 17 and the count of the counter 22, the x address of the lead pixel of the receptive-field pixel pattern at $\rho = \rho_0$ is read out and the x address is fed into the adder 64. The adder 64 adds the x address to the presently prevailing count ($= \rho_0$) of the ρ-counter and outputs the x address (step 205).

The receptive-field memory 14 (FIG. 55) reads out image data from the x, y addresses that have been calculated and inputs these addresses to the projection-line arithmetic unit 21. The latter successively accumulates the entered image data (step 206).

Thereafter, the count in the a-counter 19 is incremented by one ($a_0 + 1 \to a_0$) and the count in the y-counter 62 is incremented by one ($y_0 + 1 \to y_0$) to obtain the y address of the next pixel (steps 207~208).

Next, it is determined (step 209) whether the count $a_0$ in the a-counter 19 has exceeded a predetermined number of projection accumulations (the width of the projection grid along the a axis). If the decision rendered is "NO", the program returns to step 205, the x address of the next pixel is obtained and processing is repeated. When the count $a_0$ in the a-counter 19 exceeds the width of the projection grid along the a axis owing to repetition of the foregoing processing, the projection value at $\rho = \rho_0$ for a projection direction of $\theta_0$ is obtained and the projection-value arithmetic unit 21 inputs the accumulated results to the FIR filter 22 as the projection value prevailing at $\rho = \rho_0$. The FIR filter 22 executes the linear differentiation processing whenever a projection value enters from the projection-value arithmetic unit 21. The resulting differential value is applied to the memory 23, which stores the differential value at a location designated by the count $\rho_0$ of the ρ-counter 18 and the count $\theta_0$ of the θ-counter 17.

Next, the content of the ρ-counter 18 is incremented by one ($\rho_0 + 1 \to \rho_0$) (step 210) and it is determined (step 211) whether the value $\rho_0$ of the ρ-counter 18 has exceeded the width of the projection grid 15 along the ρ axis. If the answer at step S211 is "NO", the program returns to step 203, the count in the a-counter 19 is cleared to 0 and the foregoing processing is repeated.

Thereafter, projection values at each ρ0 are obtained in successive fashion by the foregoing processing, and projection values are applied to the FIR filter 22 and the resulting differential values are stored in the memory 23. When the value $\rho_0$ of the ρ-counter 18 has exceeded the width of the projection grid 15 along the ρ axis, the calculation of the projection values at the projection direction $\theta_0$ is completed and all of the differential values along the ρ axis at $\rho = \theta_0$ are stored in the memory 23.

Next, the count in the θ-counter 17 is incremented ($\theta_0 + 1 \to \theta_0$) (step 212) and it is determined (step 213) whether the count $\theta_0$ in the θ-counter 17 is greater than the set number of projection azimuths. If the count $\theta_0$ is equal to or less than the set number of projection azimuths, the program returns to step 202, the contents of the a-counter 19 and ρ-counter 18 are cleared to 0 and the foregoing processing is repeated. The differential values of the projection values in all projection directions are stored in the memory 23. When the differential values of the projection values in all projection directions are stored on the ρ-θ plane of the memory 23, the differential values in amounts of 3×3 pixels are read out of the memory 23 while scanning is performed successively along the ρ and θ directions, and the differential values are applied to the peak detector 24. The latter executes peak detection processing based upon the differential values entered in amounts of 3×3 pixels, obtains the peak position (ρ,θ) and stores the peak position (ρ,θ), along with the contents (h,v) of the area counter 16 at this time, in the FIFO memory 25. As a result, the direction θ of the line segment, such as an edge or contour line, contained in the prescribed receptive-field image and the position along the ρ axis are stored in the FIFO memory 25. If the area counter 16 is subsequently incremented and the foregoing processing is executed with regard to all of the receptive-field images, the direction $\theta$ and the $\rho$-direction position regarding the entire image will be stored in the FIFO memory 25.

(d-4) Alternative method of reducing ROM capacity

ROM capacity can be reduced greatly if a method is adopted in which the projection grid is made rectangular and the x, y addresses of the receptive-field memory conforming to the group of pixels constituting the two sides of the rectangle are stored for each and every projection direction. With this method, however, both the first memory (y-top ROM) 61 and the second memory (x-offset ROM) 63 are required. By making a modification, however, the first memory (y-top ROM) 61 can be eliminated.

Figure 57A:
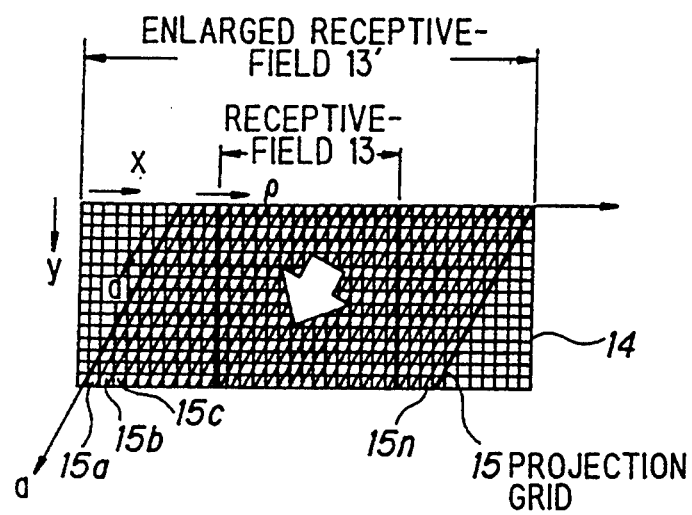
FIGS. 57(a)-(b) are a diagram for describing an address generating principle for reducing ROM capacity using a projection grid having the shape of a parallelogram.
Figure 57B:
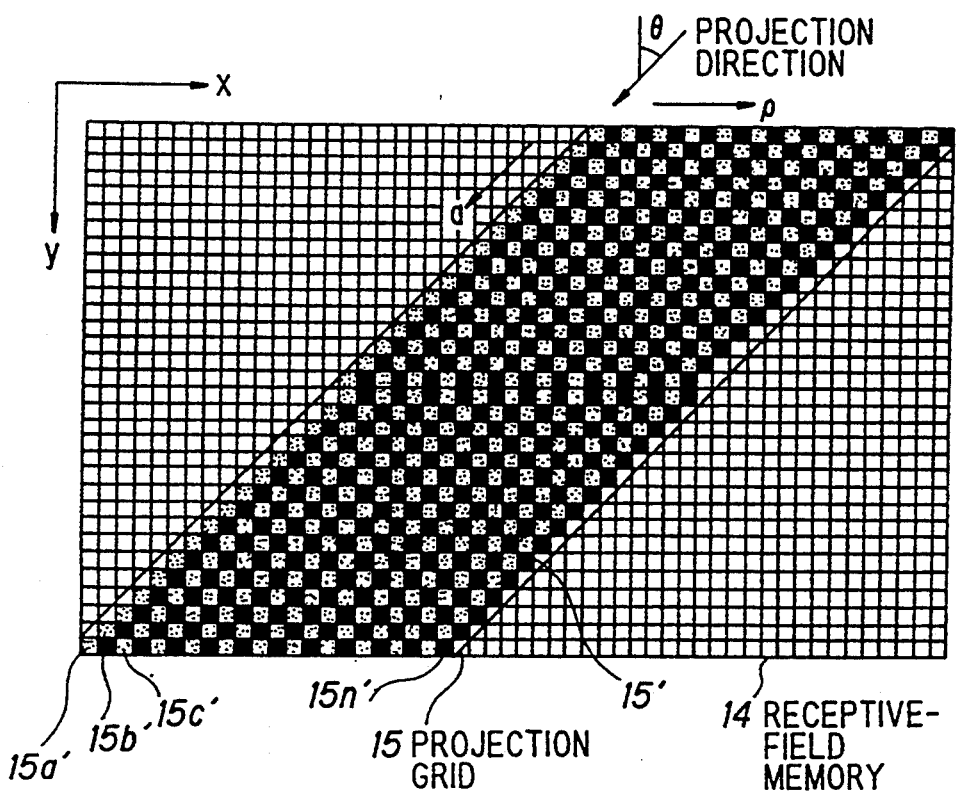

More specifically, as shown in FIG. 57, an enlarged receptive field 13', which is larger than the receptive field 13, is considered, an x-y coordinate system is set up on the receptive-field memory 14, whose size is the same as that of the enlarged receptive field 13', and the projection grid 15 is made a parallelogram having one side parallel to the projection direction (the a axis) and another side parallel to the x axis or y axis [the x axis in the example of FIG. 57(a)]. The projection grid 15 having the shape of the parallelogram is subdivided into diamond-shaped meshes (pixels) the length of one side of which is equivalent to the width of one pixel, 1:1 correlation is established between these diamond-shaped pixels and the pixels of the enlarged receptive-field memory 14 overlapped to the greatest extent. When this is done, the overall shape 15' of the receptive-field pixels corresponding to the pixels of the projection grid 15 is as indicated in FIG. 57(b).

The overall shape 15' of the receptive-field pixels has the following three characteristics:

(1) When the projection grid 15 is subdivided into slit-shaped parallelograms 15a, 15b, 15c, . . . , 15n[FIG. 57(a)] that have a width of one pixel and extend in the projection direction, receptive-field pixel patterns [the polygonal-line patterns indicated by gray (the dotted areas) or black along the a axis ] 15a', 15b', . . . , 15n' corresponding to the groups of pixels of the enlarged receptive field overlapped by the slit-shaped parallelograms have the same shape.

(2) The y addresses of the leading pixel in each of the receptive-field pixel patterns 15a', 15b', . . . , 15n' corresponding to the slit-shaped parallelograms 15a, 15b, 15c, . . . , 15n are identical (=0). Moreover, the y addresses of the pixels following the lead pixel, namely the second pixel, third pixel and so on, are always incremented.

(3) The x address varies in dependence upon the angle $\theta$ of the projection direction within one receptive-field pixel pattern. The pattern is always incremented whenever there is a shift to the right.

Accordingly, if the y address of the lead pixel of each receptive-field pixel pattern is made 0 and is incremented successively, the y address of each pixel can be obtained. Further, if the x address of the pixel group in the receptive-field pixel pattern conforming to the slit-shaped parallelogram 15a is stored in the ROM in correlation with the y address, the x address of each pixel of any receptive-field pixel pattern can be obtained by a translation from the x address that has been stored in the ROM.

(d-5) Overall configuration

Figure 58:
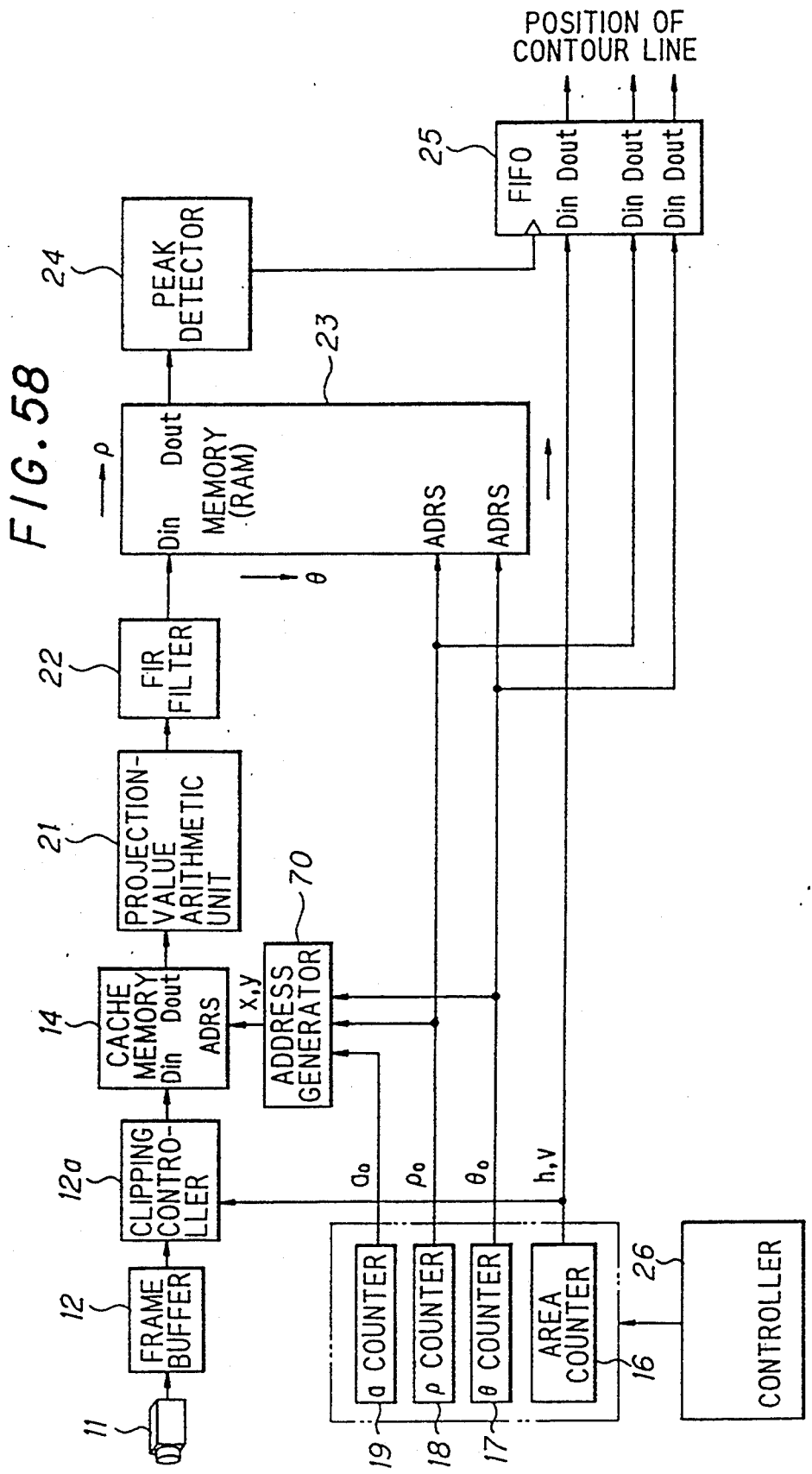
FIG. 58 is a block diagram illustrating a line-segment extracting apparatus that employs the address generating principle.

FIG. 58 is a block diagram illustrating a line-segment extracting apparatus that employs the method of reducing ROM capacity described above. This apparatus differs from that of FIG. 55 in that a clipping controller 12a is provided for clipping the enlarged receptive-field image from the image memory 12 and outputting the enlarged receptive-field image, the address generator 70 is constructed as illustrated in FIG. 59 and the projection grid has the shape of a parallelogram.

Figure 59:
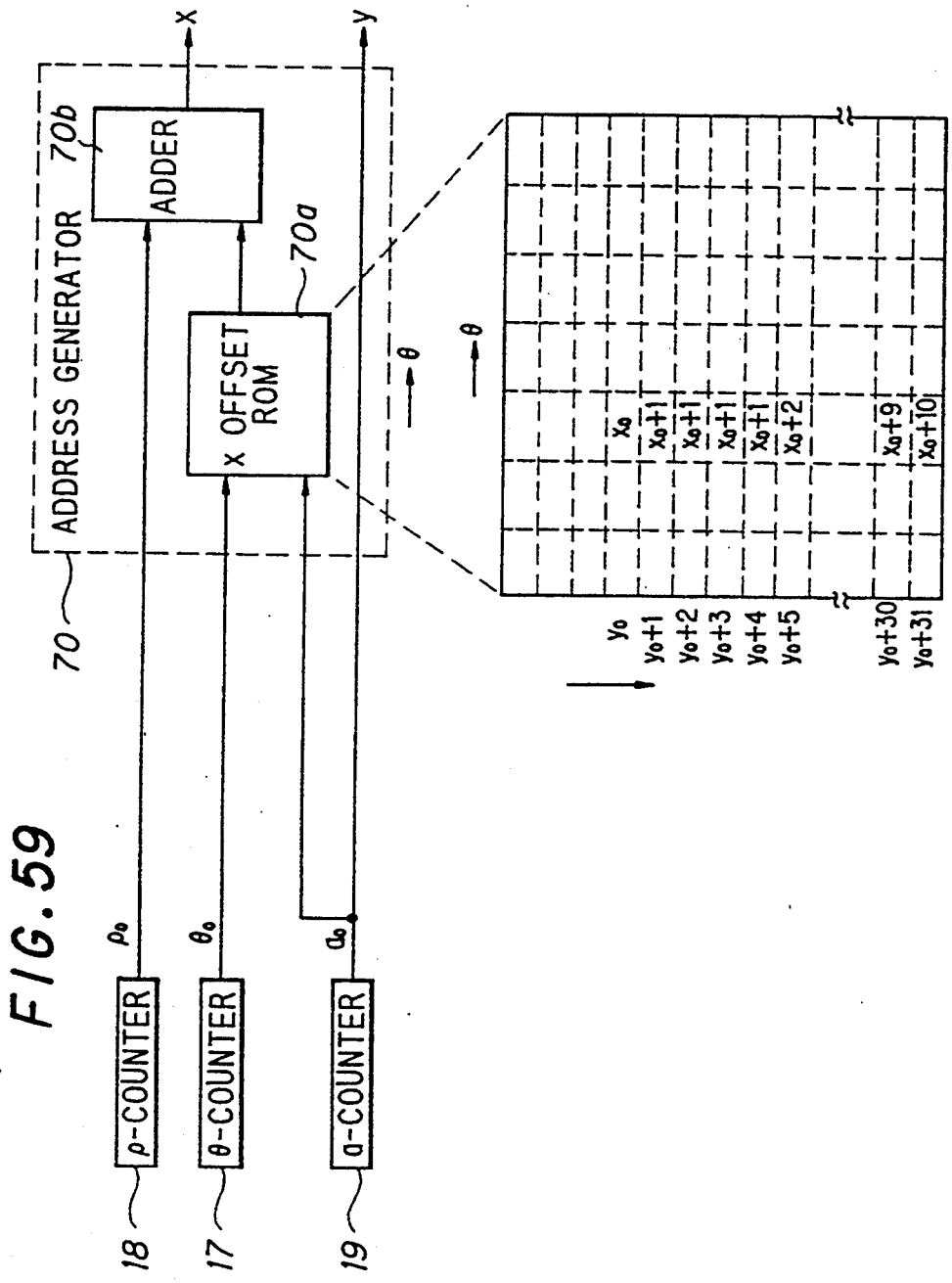
FIG. 59 is a block diagram showing an address generator.

FIG. 59 is a block diagram illustrating the configuration of the address generator 70. The address generator 70 includes a memory (x-offset ROM), which stores the x address of the pixel group in the receptive-field pixel pattern conforming to the slit-shaped parallelogram 15a [FIG. 57(a)], in correlation with the y address and for each projection direction, and an adder 70b, which adds the content $\rho_0$ of the $\rho$-counter to the x address outputted by the memory 70a, and outputs the x address of each pixel of the receptive-field pixel pattern at $\rho = \rho_0$.

(d-6) Overall operation

Figure 60:
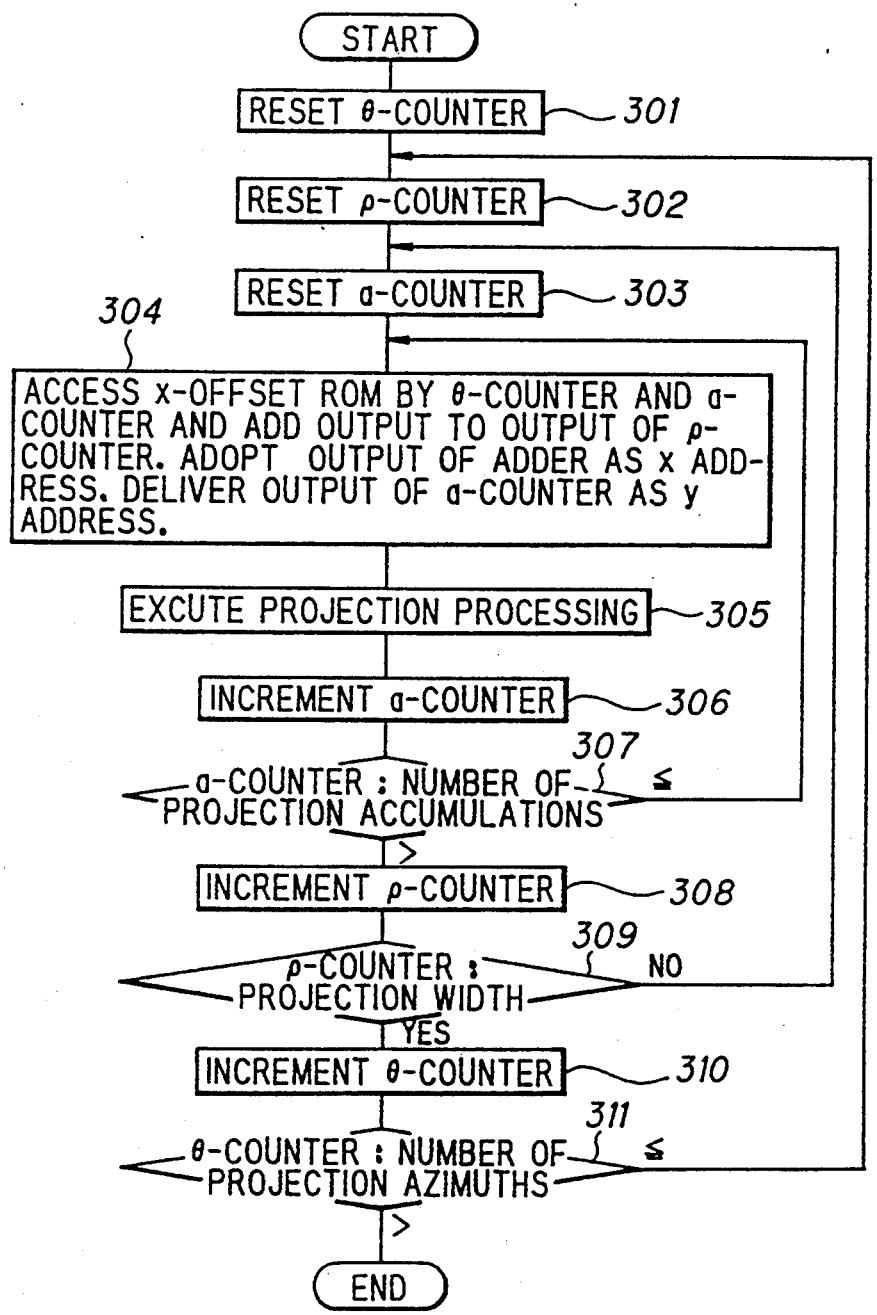
FIG. 60 is a flowchart showing processing for extracting line segments.

FIG. 60 is a flowchart illustrating the line-segment extraction processing performed by the apparatus of FIG. 58.

In response to start of image processing, the clipping controller 12a clips the enlarged receptive-field image that conforms to the receptive field designated by the area counter 16 and transfers the receptive-field image from the image memory 12 to the receptive-field memory 14, where the image is stored. Thereafter, the $\theta$-counter 17, $\rho$-counter 18 and a-counter 19 are reset to 0. That is, the operations $0 \rightarrow \theta_0$, $0 \rightarrow \theta_0$ and $0 \rightarrow a_0$ are performed (steps 301~303).

Next, the address generator 70 (FIG. 59) outputs the count $a_0$ (the initial value of which is 0) of the a-counter 19 as the y address of the lead pixel in the receptive-field pixel pattern at $\rho = \rho_0$. The memory 70a is accessed by the y address value ($=a_0$) and the count $\theta_0$ of the $\theta$-counter 17, the x address of the pixel in the receptive-field pixel pattern is read out and the x address is fed into the adder 70b. The adder 70b adds the x address to the presently prevailing count ($=\rho_0$) of the $\rho$-counter, obtains the x address and delivers it as an output (step 304).

The receptive-field memory 14 reads out image data from the entered x, y addresses and inputs these addresses to the projection-line arithmetic unit 21. The latter successively accumulates the entered image data (step 305).

Thereafter, the count in the a-counter 19 is incremented by one ($a_0 + 1 \rightarrow a_0$) and it is determined whether the count $a_0$ in the a-counter 19 has exceeded a predetermined number of projection accumulations (the width of the projection grid along the a axis) (steps 306~307). If the decision rendered is "NO", the program returns to step 304, the x address of the next pixel is obtained and processing is repeated. When the count $a_0$ in the a-counter 19 exceeds the width of the projection grid along the a axis owing to repetition of the foregoing processing, the projection value at $\rho = \rho_0$ for a projection direction of $\theta_0$ is obtained and the projection-value arithmetic unit 21 inputs the accumulated results to the FIR filter 22 as the projection value prevailing at $\rho = \rho_0$. The FIR filter 22 executes the linear differentiation processing whenever a projection value enters from the projection-value arithmetic unit 21. The resulting differential value is applied to the memory 23, which stores the differential value at a location designated by the count $\rho_0$ of the $\rho$-counter 18 and the count $\theta_0$ of the $\theta$-counter 17.

Next, the content of the $\rho$-counter 18 is incremented by one ($\rho_0 + 1 \rightarrow \rho_0$) (step 308) and it is determined (step 309) whether the value $p_0$ of the $p$-counter 18 has exceeded the width of the projection grid 15 (FIG. 57) along the $\rho$ axis. If the answer at step S309 is "NO", the program returns to step 303, the count in the a-counter 19 is cleared to 0 and the foregoing processing is repeated.

Thereafter, projection values at each $\rho_0$ are obtained in successive fashion by the foregoing processing, the projection values are applied to the FIR filter 22 and the resulting differential values are stored in the memory 23. When the value $\rho_0$ of the $\rho$-counter 18 has exceeded the width of the projection grid 15 along the $\rho$ axis, the calculation of the projection values at the projection direction $\theta_0$ is completed and all of the differential values along the $\rho$ axis at $\theta = \theta_0$ are stored in the memory 23.

Next, the count in the $\theta$-counter 17 is incremented ($\theta_0 + 1 \rightarrow \theta_0$) (step 310) and it is determined (step 311) whether the count $\theta_0$ in the $\theta$-counter 17 is greater than the set number of projection azimuths. If the count $\theta_0$ is equal to or less than the set number of projection azimuths, the program returns to step 302, the contents of the a-counter 19 and $\rho$-counter 18 are cleared to 0 and the foregoing processing is repeated. The differential values of the projection values in all projection directions are stored in the memory 23.

When the differential values of the projection values in all projection directions are stored on the $\rho$-$\theta$ plane of the memory 23, peak position is detected in the manner described earlier and is stored in the memory 25. As a result, the direction $\theta$ of the line segment, such as an edge or contour line, contained in the prescribed receptive-field image and the position along the $\rho$ axis are stored in the memory 25. If the area counter 16 is subsequently incremented and the foregoing processing is executed with regard to all of the receptive-field images, the direction $\theta$ and the $\rho$-direction position regarding the entire image will be stored in the memory 25.

(d-7) Alternative Configuration of address generator

In the address generator shown in FIG. 59, the x address of the group of pixels in the receptive-field pixel pattern conforming to the slit-shaped parallelogram 15a [FIG. 57(a)] is correlated with the y address value and stored in the memory 70a for each and every angle $\theta$ of the projection directions. However, an alternative configuration is possible. Specifically, an arrangement can be adopted in which the x address of the receptive-field pixel that corresponds to the lead pixel (the pixel forming the vertex in the projection grid) of the slit-shaped parallelogram 15a is stored in memory for each and every angle of the projection directions, an increment dx of the x address of each pixel of the receptive-field pattern conforming to the slit-shaped parallelogram 15a is correlated with the y address value and stored for each and every angle of the projection directions, and these items of stored data are used to obtain the x, y addresses of each receptive-field pixel.

Figure 61:
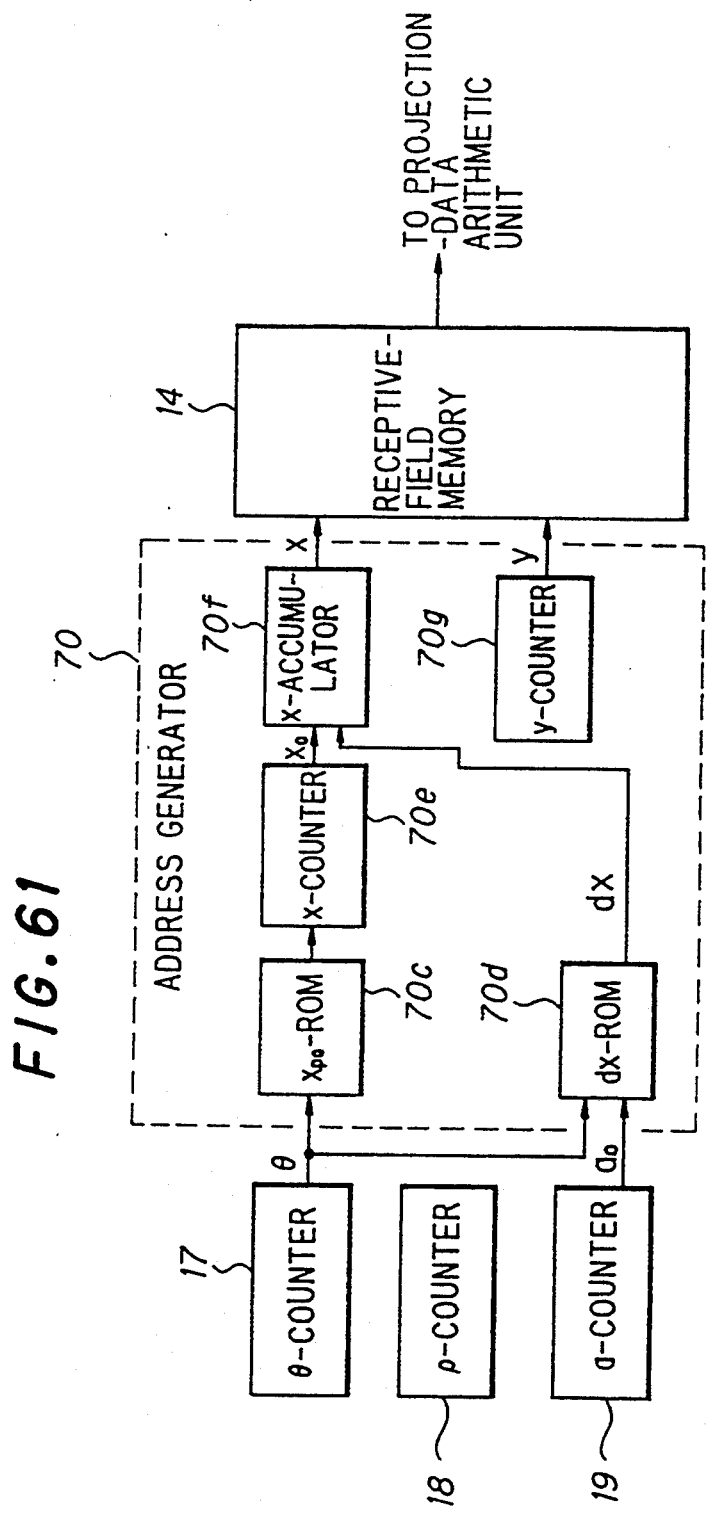
FIG. 61 is a block diagram showing another address generator.

FIG. 61 is a block diagram showing the configuration of such an address generator. Elements in FIG. 61 identical with those shown in FIG. 58 are designated by like reference characters. The address generator 70 includes a first memory ($x\rho_0$-ROM) 70c that stores, for each and every angle $\theta$ of the projection directions, the x address of the pixel, within the receptive field, that corresponds to the pixel (the first diamond-shaped pixel of the slit-shaped parallelogram 15a) forming the vertex of the projection grid 15 (see FIG. 57), a second memory (dx-ROM) 70d for storing, in correlation with the y address and for each and every angle of the projection directions, the increment dx of the x address of the receptive-field pixel that corresponds to the slit-shaped parallelogram 15a, an x-counter 70e in which the x address at a predetermined projection direction $\theta_0$ is set and subsequently incremented, an x-accumulator for adding the count from the x-counter 70e and dx so as to output an x address, and a y-counter 70g incremented by 1 successively starting from 0 so as to output a y address. The counts in the a-counter and y-counter are identical in value.

(d-8) Overall operation

In response to start of image processing, the clipping controller 12a (FIG. 58) clips the enlarged receptive-field image that conforms to the receptive field designated by the area counter 16, transfers the receptive-field image from the image memory 12 to the receptive-field memory 14, where the image is stored, and clears the $\theta$-counter 17 to 0. The controller 12a then clears the $\rho$-counter 18, reads the x address of the vertex pixel conforming to $\theta = \theta_0$ out of the first memory 70c and sets this address in the x-counter 70e.

The controller then clears the a-counter 19, clears the y-counter 70g and applies the value of the count of the x-counter 70e to the x-accumulator 70f.

The output of the x-accumulator 70f is applied to the receptive-field memory 14 as the x address (initially, dx=0 holds), and the output of the y-counter 70g is applied to the receptive-field memory 14 as the y address. The receptive-field memory 14 reads image data out of the location of the entered x and y addresses and inputs the image data to the projection-value arithmetic unit 21. The latter successively accumulates the entered image data.

The increment dx of the x address corresponding to $\theta = \theta_0$ and a $= a_0$ is read out of the second memory 70d and fed into the x-accumulator 70f, the ladder adds dx to the content of the x-counter 30e so as to output the x address, and the y-counter 70g is incremented by 1 and outputs the counted value as the y address. It should be noted that the a-counter 19 also is incremented by 1 so that the contents of the a-counter and y-counter will coincide.

The foregoing processing is thenceforth repeated until the count $a_0$ in the a-counter 19 exceeds a predetermined number of projection accumulations (the width of the projection grid along the a axis), and the receptive-field memory 14 is accessed by the x, y addresses.

If the foregoing processing is repeated and the count $a_0$ in the a-counter 19 exceeds the width of the projection grid along the a axis, a projection value at $\rho = \rho_0$ is obtained for the projection direction $\theta_0$, and the projection-value arithmetic unit 21 inputs the accumulated results to the FIR filter 22 as the projection value prevailing at $\rho = \rho_0$. Next, the $\rho$-counter 18 is incremented ($\rho_0 + 1 \rightarrow \rho_0$), the x-counter 70e is incremented ($x_0 + 1 \rightarrow x_0$) and an operation similar to the foregoing is repeated.

Figure 62A:
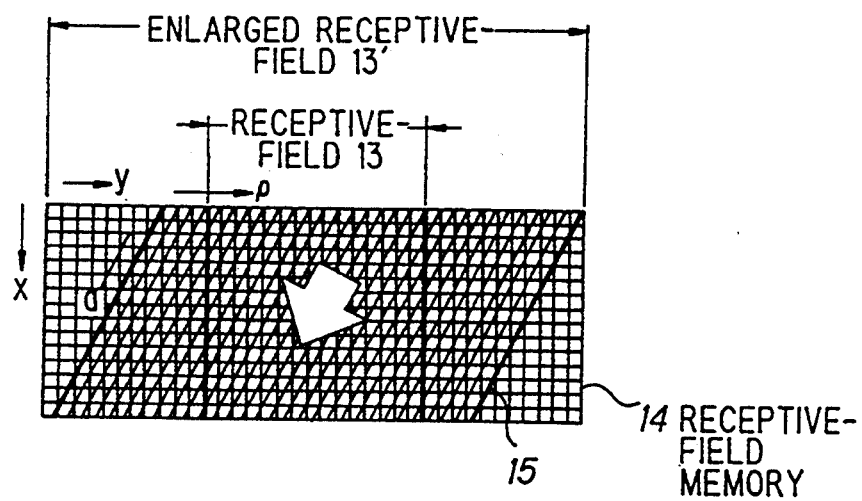
FIGS. 62(a)-(b) are a diagram useful in describing the overlapping of mutually adjacent enlarged receptive fields.

(e) Considerations when using a parallelogram-shaped grid (e-1) Shortening data-transmission time Though not described above in detail, the parallelogram-shaped grid 15 is such that the length of the side along the $\rho$-axis is greater than the length of the corresponding side of the receptive field 13, as shown in FIG. 62(a). Further, the image portion (the enlarged receptive-field image) in the enlarged receptive field 13', which is wider than the receptive field 13, is clipped from the image memory and read out to the receptive-field memory 14.

Figure 62B:
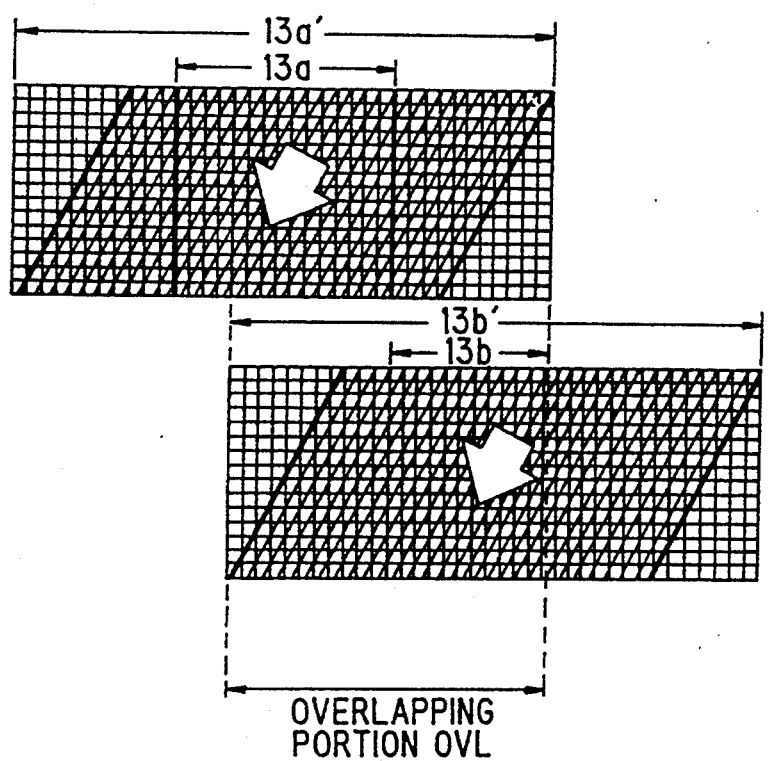

As shown in FIG. 62(b), two enlarged receptive fields 13a', 13b' of mutually adjacent receptive fields 13a, 13b have overlapping portions OVL. When the overlapping portions OVL is transferred from the image memory to the receptive-field memory 14 again after the image processing of the receptive field 13a ends, a corresponding amount of transfer time is required and high-speed image processing cannot be performed. Accordingly, when the clipping control unit 12a (FIG. 58) reads the next adjoining enlarged receptive-field image out of the receptive-field memory 14 and image processing is performed at the end of the image processing of the present enlarged receptive-field image, the portion (OVL) of the present enlarged receptive-field image that overlaps the next adjoining enlarged receptive-field image is left in the receptive-field memory 14, and only the portion of the next adjoining enlarged receptive-field image not overlapped is clipped from the image memory 12, stored in the receptive-field memory 14 and subjected to image processing. If this arrangement is adopted, the amount of data to be transferred from the image memory to the receptive-field memory is reduced and time required for data transfer is shortened, thereby making high-speed image processing possible.

Figure 63A:
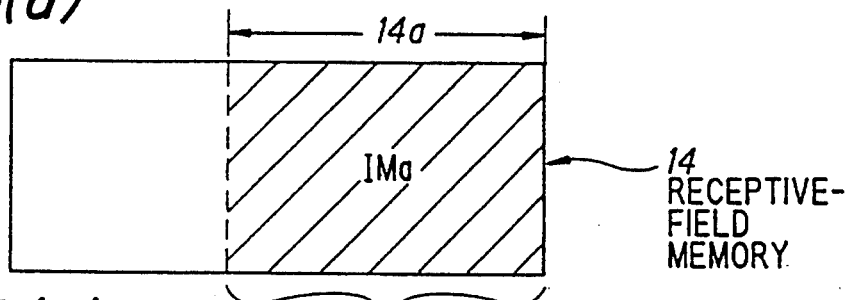
FIG. 63 is an explanatory view of a data transfer method.
Figure 63B:
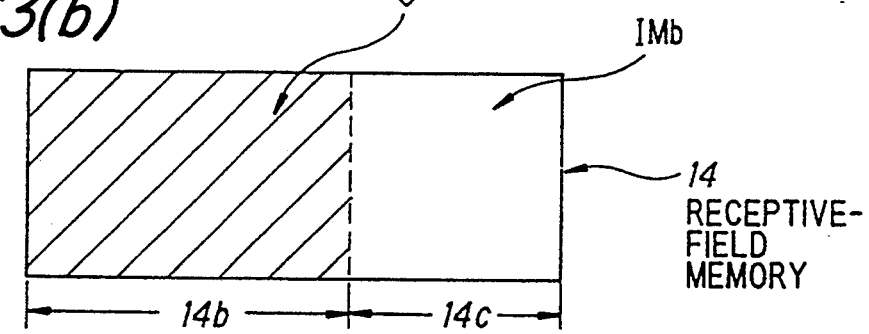

More specifically, as illustrated in FIGS. 63(a) and 63(b), the foregoing is carried out by moving image data IMa of FIG. 63(a), which has been stored in an overlapping-image storage area 14a of the receptive-field memory 14, to a header storage area 14b of the receptive-field memory 14 of FIG. 63(b), and then writing the portion of the next enlarged receptive-field image IMb not overlapped in a storage area 14c of the receptive-field memory 14 that follows the storage area 14b.

(e-2) Reducing number of projection-value calculations

Figure 64:
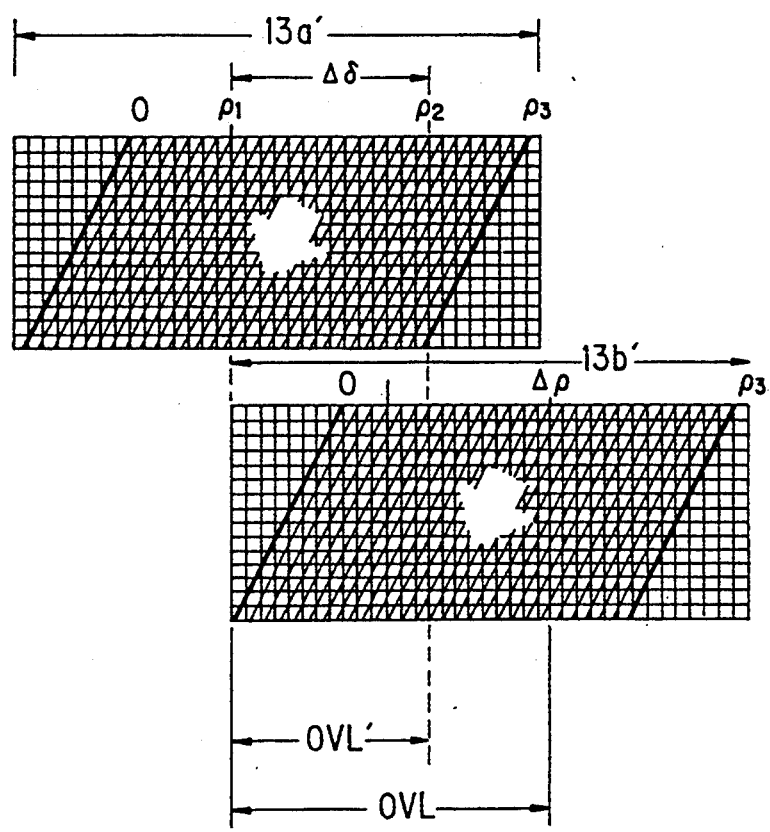
FIG. 64 is a diagram for describing the principle through which the number of calculations for projection values is reduced.

As shown in FIG. 64, two mutually adjacent enlarged receptive fields 13a', 13b' have overlapping portions OVL. In the overlapping portions OVL, results of projections in a region indicated by OVL' take on identical values since image data of identical pixels is accumulated. Accordingly, when the next adjoining enlarged receptive-field image is read out of the receptive-field memory 14 and image processing is performed at the end of image processing applied to the present enlarged receptive-field image, the results of projection in OVL', from among the results of projection regarding the present enlarged receptive-field image, are stored in advance. If this is done, these results of projection can be used as is. This makes it possible to achieve high-speed image processing by reducing the number of arithmetic operations concerning the projection data.

Figure 65:
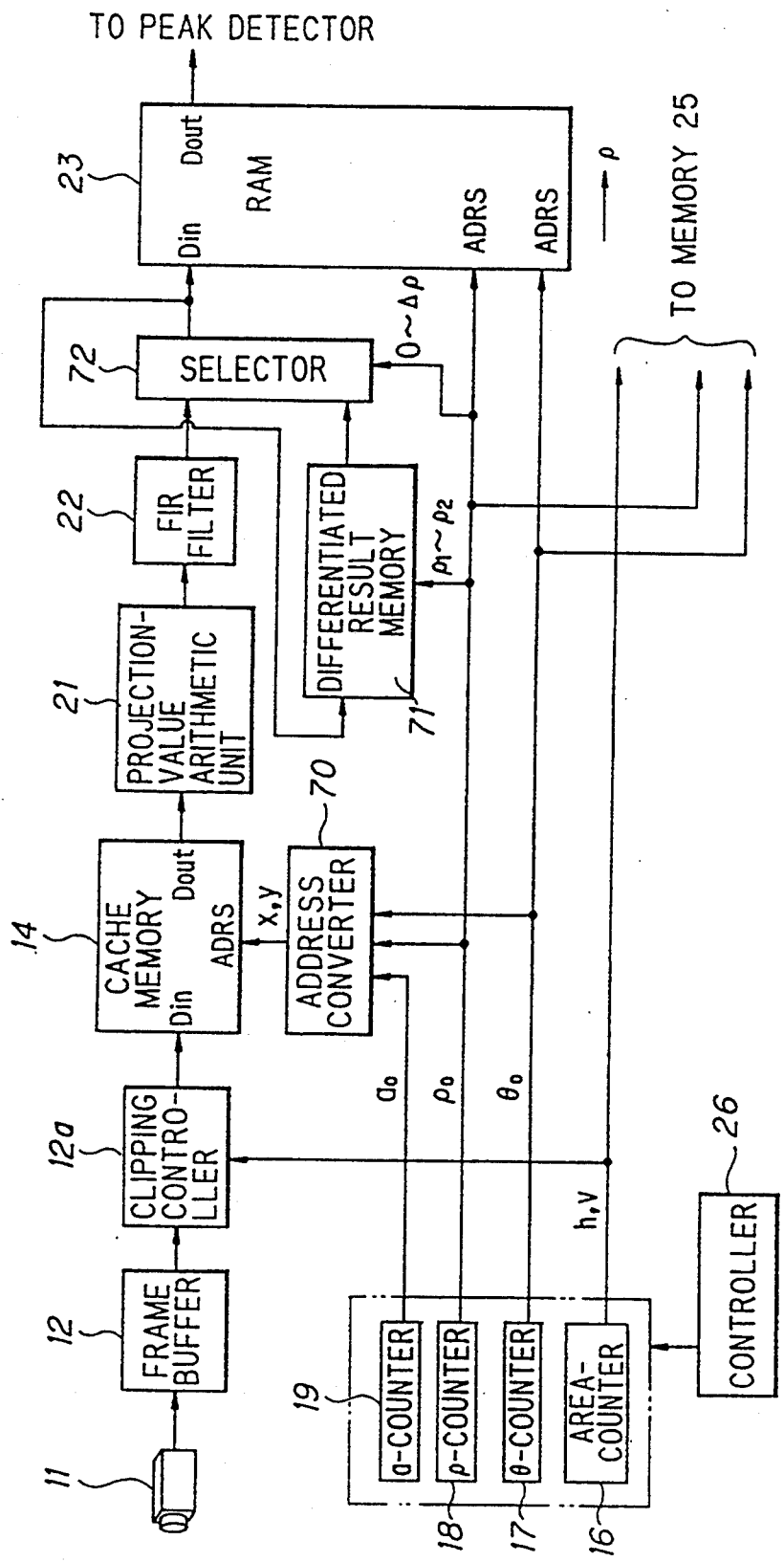
FIG. 65 is a block diagram illustrating a line-segment extracting apparatus for reducing the number of calculations for projection values.

FIG. 65 is a block diagram showing the configuration of a line-segment extracting apparatus according to the invention for a case in which the apparatus employs the principle described above. Elements in FIG. 65 identical with those shown in FIG. 58 are designated by like reference characters. The apparatus of FIG. 65 differs from that of FIG. 58 in that a differentiated-result memory 71 and a selector 72 are provided. The differentiated-result memory 71 stores, for each and every projection direction, the results of differentiation over the region OVL' ($p1 \sim p2$), shown in FIG. 64, for which redundant calculation has been completed. When the projection values of the next enlarged receptive-field image are calculated, the selector 72 selects the output of the FIR filter 22 or the output of the differentiated-result memory 71, depending upon the value of the count in the $\rho$-counter. That is, the stored value of the memory 71 conforming to the projection direction $\theta$ is outputted when the count in the $\rho$-counter 18 ranges from 0 to $\Delta\rho$ ($\Delta\rho$ is the width of the region OVL' already computed), and the results of differentiation outputted by the FIR filter 22 are selected when the count in the $\rho$-counter 18 ranges from $\Delta\rho+1$ to $\rho_3$.

(f) High-speed image processing by scan projection method

In the foregoing, image processing is executed for each and every receptive field and the problems involved in transferring overlapping image portions and in calculating overlapping projections are solved. These problems involved in transferring overlapping image portions and in calculating overlapping projections arise because image processing is executed for each and every receptive field. Accordingly, a method can be adopted which includes performing scanning with regard to all receptive fields lying in the horizontal direction, calculating the results of projection in each projection direction en masse and storing the results in memory, subsequently reading the results of projection corresponding to a prescribed receptive field out of the memory and subjecting these results to differentiation processing, reading out the results of projection that prevail when the angle $\theta$ of the projection direction is successively varied by a prescribed increment, subjecting these results to differentiation processing and obtaining the peak of the differentiated results of all receptive fields. If this approach is adopted, it will be unnecessary to transfer overlapping portions of the enlarged receptive fields again and to recalculate projection data in the overlapping portions. As a result, image processing can be performed at high speed.

(f-1) Overall configuration

Figure 66:
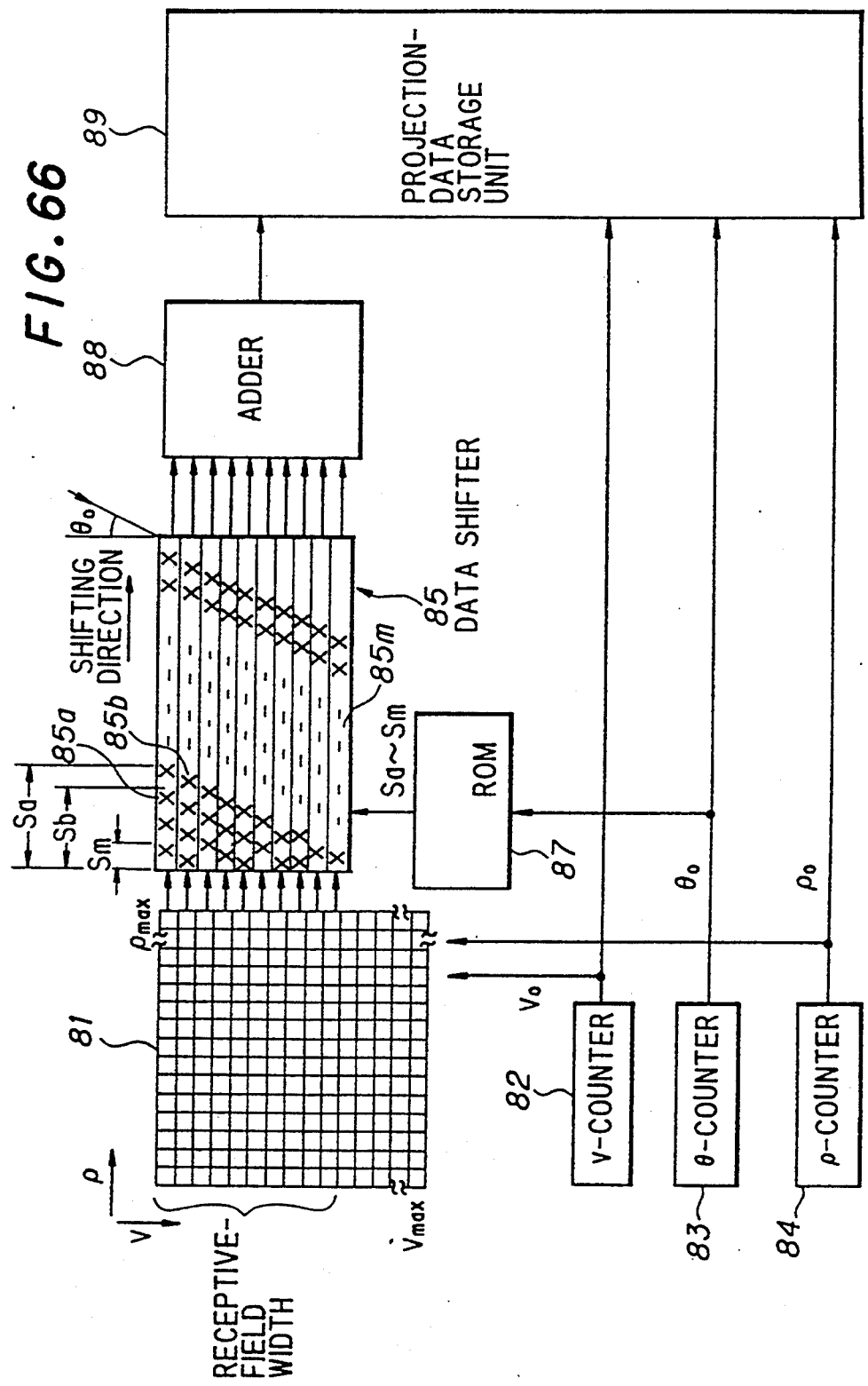
FIG. 66 is a block diagram illustrating a line-segment extracting apparatus that relies upon a scanning projection method.

FIG. 66 is a block diagram illustrating a line-segment extracting apparatus that relies upon such a scanning projection method. The apparatus includes an image memory 81 for storing the entire image captured by the camera, a v-counter 82 for designating a position $v_0$ (the initial value of which is 0) along the vertical direction of a receptive field, a $\theta$-counter 83 for designating a projection direction $\theta_0$ (the initial value of which is 0), and a data shifter 85 in which the amount of shift is capable of being varied. The data shifter 85 includes m-number of variable shift registers 85a, 85b, ... 85m, where m represents the number of pixels along the vertical direction of one receptive field. The shift registers have amounts of shift Sa, Sb, ... Sm that differ from one another. The arrangement is such that the amount of shift vary depending upon the angle $\theta_0$ of the projection direction. More specifically, the data positions of each of the variable shift registers 85a, 85b, ... 85m are as indicated by x in FIG. 66. The greater the amount of shift, the further ahead the data position is. As a result, the items of image data of pixels to be added along the projection direction $\theta$ are successively outputted to an adder 88 at the same time. A ROM 87 stores, for each and every projection direction $\theta$, the amounts of shift Sa~Sm in the m-number of variable shift registers 85a~85m. The adder 88 adds the items of image data successively entered in parallel fashion from the m-number of variable shift registers 85a~85m, thereby calculating and outputting a projection value. A projection-value storage unit 89 stores the projection value, which is outputted by the adder 88, in a storage area designated by the counts $v_0$, $\theta_0$ and $\rho_0$ of the v-counter 82, $\theta$-counter 83 and $\rho$-counter 84, respectively.

Figure 67:
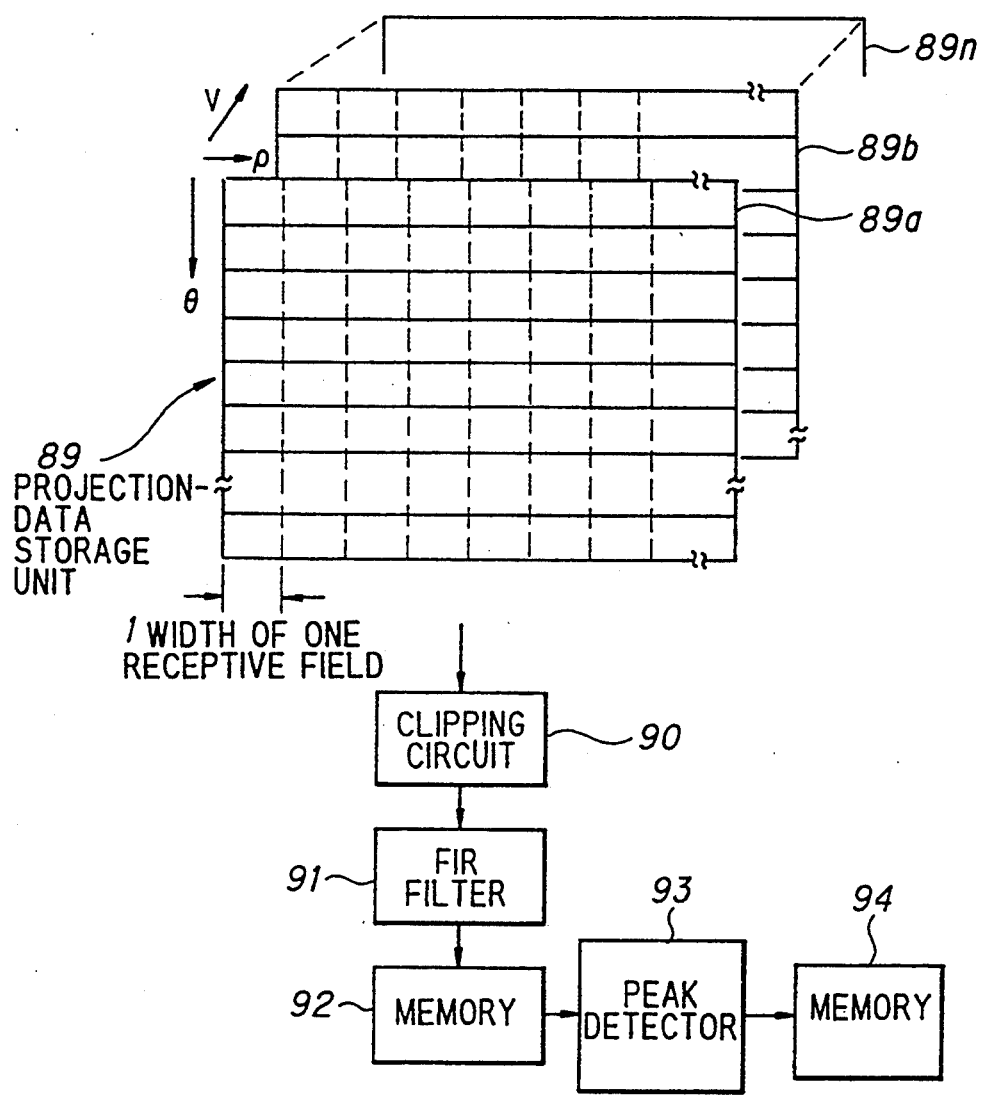
FIG. 67 is a partial block diagram illustrating a line-segment extracting apparatus that relies upon a scanning projection method.

As shown in FIG. 67, the projection-value storage unit 89 has storage areas 89a, 89b, ... 89n conforming to the receptive-field position v along the vertical direction. Each storage area forms a $\rho$-$\theta$ plane. The projection values of all receptive fields along the horizontal direction are successively stored at matrix cross points having a $\rho$ address and $\theta$ address in a prescribed storage area. Numeral 90 denotes a clipping circuit for clipping projection values conforming to a prescribed receptive field, 91 a FIR filter for subjecting the projection values to linear differentiation successively along the direction, 92 a memory for storing the results of differentiation, 94 a peak detector, and 95 a memory for storing peak position.

(f-2). Overall operation

Figure 68:
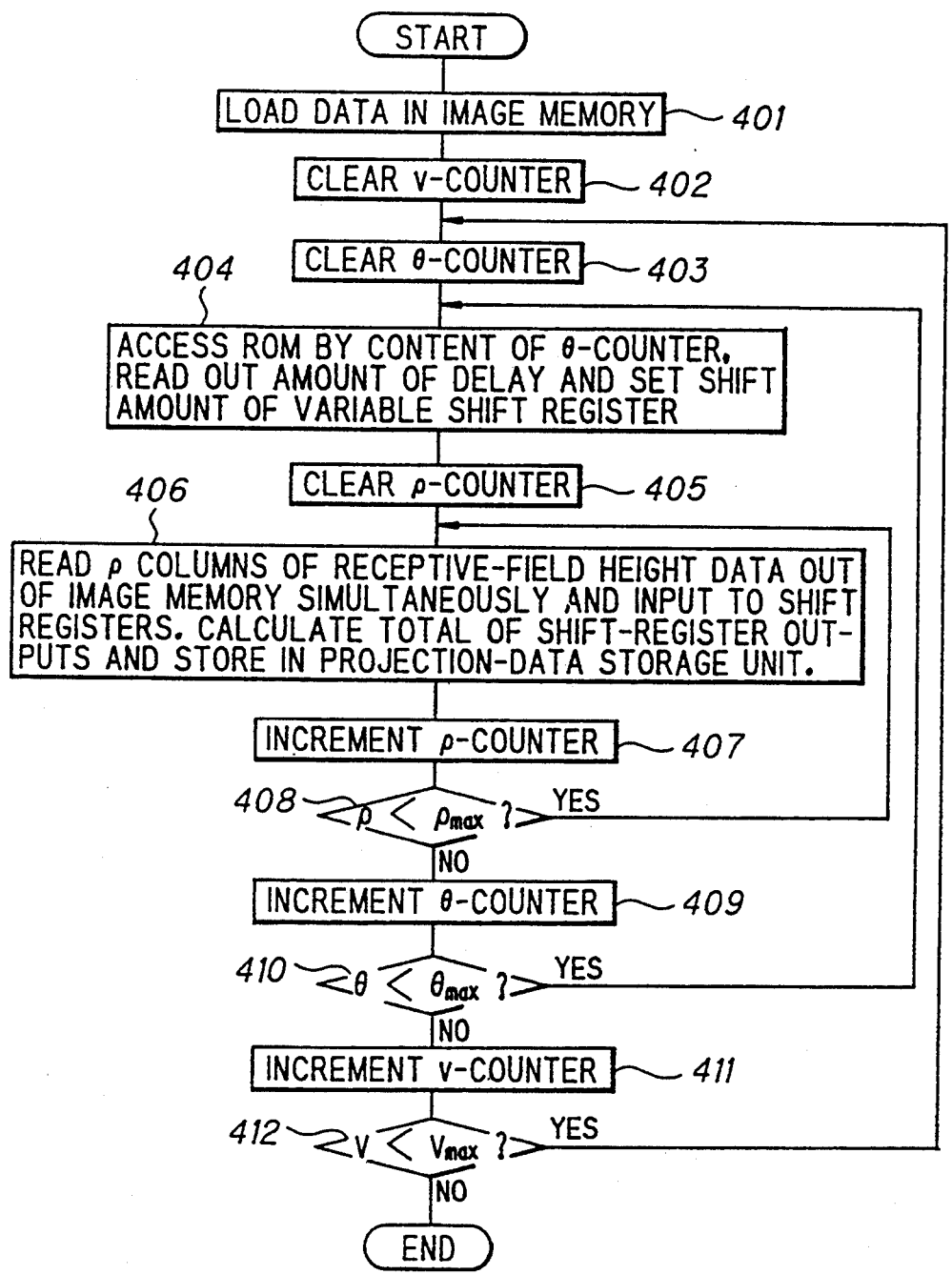
FIG. 68 is a flowchart illustrating line-segment extracting processing that relies upon a scanning projection method.

FIG. 68 is a flowchart of image processing according to the scan projection method.

The image captured by the camera is stored in the image memory 81 (step 401), the v-counter 82 is cleared ($0 \rightarrow v_0$; step 402) and the $\theta$-counter 83 is cleared ($0 \rightarrow \theta_0$; step 403).

This is followed by accessing the ROM 87 based upon the count $\theta_0$ of the $\theta$-counter 83, reading out the shift quantities Sa~Sm of the m-number of variable shift registers and applying them to the data shifter 85 (step 404).

Next, the $\rho$-counter 84 is cleared (step 405), m-items of image data along the vertical direction in the receptive-field image are read out simultaneously and in parallel from the addresses of the image memory 81 designated by the v-counter 82 and $\rho$-counter 84, and the image data is fed into the variable shift registers 85a~85m. Each variable shift register sets the image data at a position conforming to whichever of the shift quantities Sa~Sn has been designated and thereafter shifts the image data by one bit. The outputs of the shift registers are then totaled by the adder 88 to calculate the projection value, and the projection value is stored in the storage area of the projection-value storage unit 89 designated by the counts $v_0$, $\theta_0$ and $\rho_0$ of the v-counter 82, $\theta$-counter 83 and $\rho$-counter 84, respectively (step 406). After the projection value is stored, the count in the $\rho$-counter is incremented ($\rho_0 + 1 \rightarrow \rho_0$) (step 407) and it is determined (step 408) whether the count $\rho_0$ of the $\rho$-counter 84 has exceeded the image width $\rho_{max}$ along the horizontal direction. If $\rho_{max}$ has not been exceeded, the program returns to step 406 and the foregoing processing is repeated.

Thereafter, projection values at each $\rho_0$ are obtained in successive fashion by the foregoing processing and the projection values are stored in the projection-value storage unit 89. When the value $\rho_0$ of the $\rho$-counter 84 has exceeded $\rho_{max}$, the calculation of the projection values at the projection direction $\theta_0$ is completed and the projection results in all receptive fields along the horizontal direction at $\theta = \theta_0$ are stored. Next, the count in the $\theta$-counter 83 is incremented ($\theta_0 + 1 \rightarrow \theta_0$) (step 409) and it is determined (step 410) whether the count $\theta_0$ in the $\theta$-counter 83 is greater than a set number $\theta_{max}$ of projection azimuths. If the count $\theta_0$ is equal to or less than the set number of projection azimuths, the program returns to step 404 and the foregoing processing is repeated. If $\theta_0 > \theta_{max}$ holds, the projection values in all projection directions of all receptive fields along the horizontal direction are stored in the projection-value storage unit 89.

The count in the v-counter 82 is then incremented (step 411) and it is determined whether $v > v_{max}$ holds (step 412). If $v \leq v_{max}$ holds, the program returns to step 403 and the foregoing processing is repeated. If $v > v_{max}$ holds, the results of projection in all receptive fields along all horizontal directions will be stored in the projection-value storage unit 89.

When the calculation of projection values ends by virtue of the above-described operation, the clipping circuit 90 reads the results of projection corresponding to a prescribed receptive field out of the projection-value storage unit 89 and applies linear differentiation. Thereafter, the slicing circuit 90 applies linear differentiation to the results of projection that prevail when the angle $\theta$ of the projection direction is successively varied by a prescribed increment and stores the results of differentiation of all receptive fields in the memory 92. The peak detector 93 obtains the peak positions of the results of differentiation in all receptive fields and stores the peak positions in the memory 94.

In the foregoing, the projection results in all receptive fields are calculated and stored in the projection-value storage unit 89, after which processing for differentiation and peak detection is executed. However, an arrangement can be adopted in which the results of projection in all receptive fields along one horizontal direction are calculated and stored in the projection-value storage unit 89, after which processing for differentiation and peak detection is executed followed by processing similar to the foregoing for each and every receptive field along one horizontal direction.

Figure 70A:
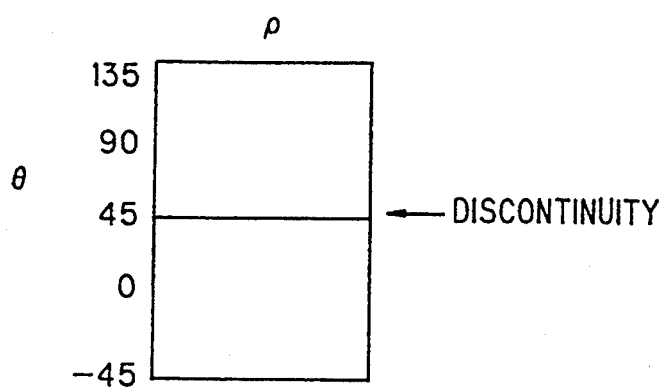
FIGS. 70(a)-(b) are a diagram for describing reduction of an error produced when changing over a projection grid having the shape of a parallelogram.

In the foregoing, the data shifter 85 is composed of variable shift registers. However, an arrangement can be adopted in which delay circuits and shift registers are provided instead of the variable shift registers, the data is delayed by a predetermined amount of shift by means of the delay circuits and then the data is shifted successively one bit at a time by the shift registers and inputted to an adder (g) Control for changing over projection grids In a case where a projection grid having the shape of a parallelogram is used, the number of pixels (the area of the pixels) in the receptive field 13 overlapped by the projection grid 15 diminishes depending upon the projection direction (the direction along the a axis), as shown in FIG. 69, as a consequence of which an error develops in the projection results. Accordingly, a projection grid in the shape of a vertical parallelogram [FIGS. 69(a)~(c)] having a side parallel to the projection direction (a axis) and a side parallel to the x axis is used when the angle of the projection direction ranges from $-45°$ to $+45°$, and a projection grid in the shape of a horizontal parallelogram [FIGS. 69(d)~(e)] having a side parallel to the projection direction (a axis) and a side parallel to the y axis is used when the angle of the projection direction ranges from $45°$ to $135°$. If this arrangement is adopted, the decrease in the number of pixels (pixel area) in the receptive field overlapped by the projection grid can be suppressed, thereby reducing the error. However, since the shape of the projection grid is changed at the above-mentioned changeover angle ($\theta = 45°$), a discontinuity develops in the results of projection and, hence, a discontinuity develops in the differentiated results [see FIG. 70(a)]. As a consequence, a detection error is produced when the peak detector 24 (FIG. 58) reads the differentiated results out of the $\rho$-$\theta$ plane of the memory 23 in increments of $3 \times 3$ pixels and detects the peak position.

Figure 70B:
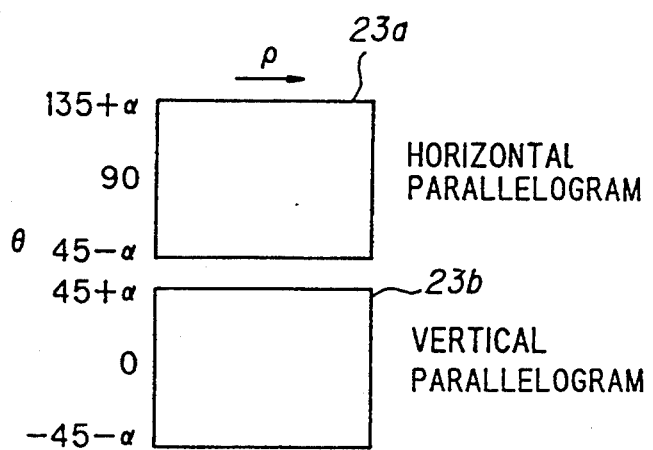

Accordingly, an angular range that sets a projection grid having the shape of a vertical parallelogram or horizontal parallelogram is widened by an angle α(e.g., 2~3°) on both sides so that overlapping occurs in the vicinity of the changeover angle ($\theta$=45°). More specifically, as shown in FIG. 70(b), when the angle $\theta$ of the projection direction lies in a range of from $(-45-\alpha)°\sim(45+\alpha)°$, a projection grid in the shape of the vertical parallelogram is set, the calculation of projection values is performed, differentiation processing is executed and the results are stored in a first storage area 23a of the memory 23. Further, when the angle $\theta$ of the projection direction lies in a range of from $(45-\alpha)°\sim(135+\alpha)°$, a projection grid in the shape of the horizontal parallelogram is set, the calculation of projection values is performed, differentiation processing is executed and the results are stored in a second storage area 23b of the memory 23.

In peak-value detection from −45° to +45°, peak position is obtained based upon differentiated results from $(-45-\alpha)°$ to $(45+\alpha)°$. In peak-value detection from 45° to 135°, peak position is obtained based upon differentiated results from $(45-\alpha)°$ to $(135+\alpha)°$. If this expedient is adopted, it is possible to eliminate peak-position detection error arising from a discontinuity in the differentiated results at the shape changeover angle (=45°).

(h) Control for correction of error due to parallelogram-shaped projection grid

Figure 71:
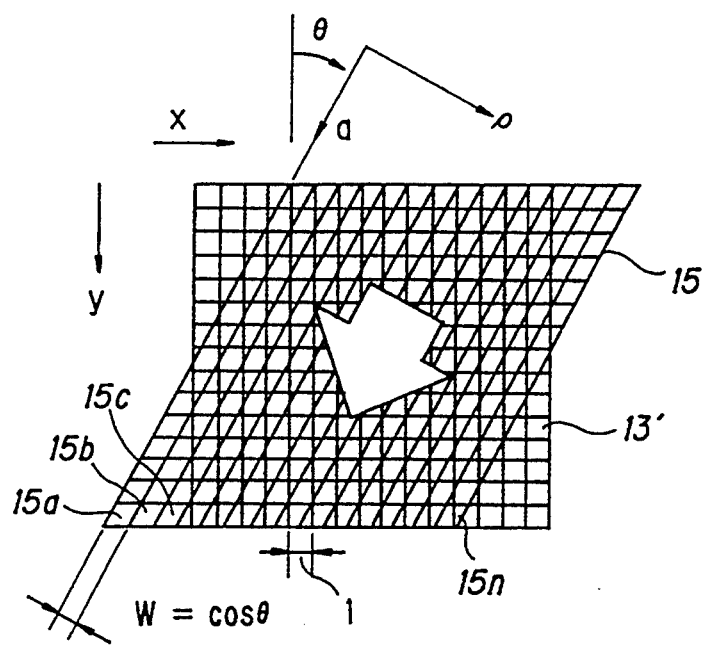
FIG. 71 is a diagram for describing a projection-value error in a case where use is made of a projection grid having the shape of a parallelogram.

In the case where the shape of the projection grid 15 is a parallelogram having a side parallel to the projection direction (a axis) and a side parallel to the x axis or y axis, the projection grid 15 is subdivided into slit-shaped parallelograms 15a, 15b, 15c, . . . 15n that extend by a width of one pixel along the projection direction, as illustrated in FIG. 71, and items of image data composed of the group of pixels, in the enlarged receptive field, that are overlapped by each slit-shaped parallelogram are accumulated to calculate the projection values.

Ideally, the results of projection should be those obtained by projecting the receptive-field image from a prescribed direction upon an axis (the ρ axis) that is perpendicular to this projection direction. (Thus far, the direction along the x axis has been regarded as the ρ axis for the sake of convenience.) In the case where the projection grid 15 is in the shape of the parallelogram, however, the width w of each of the slit-shaped parallelograms 15a, 15b, 15c, . . . 15n along the ρ axis is cos$\theta$ of the length of one pixel, an error develops in the results of projection and the edge extracting performance varies depending upon the angle $\theta$ of the projection direction. In other words, diagonal edges are difficult to extract.

(h-1) First method of solution

Figure 72:
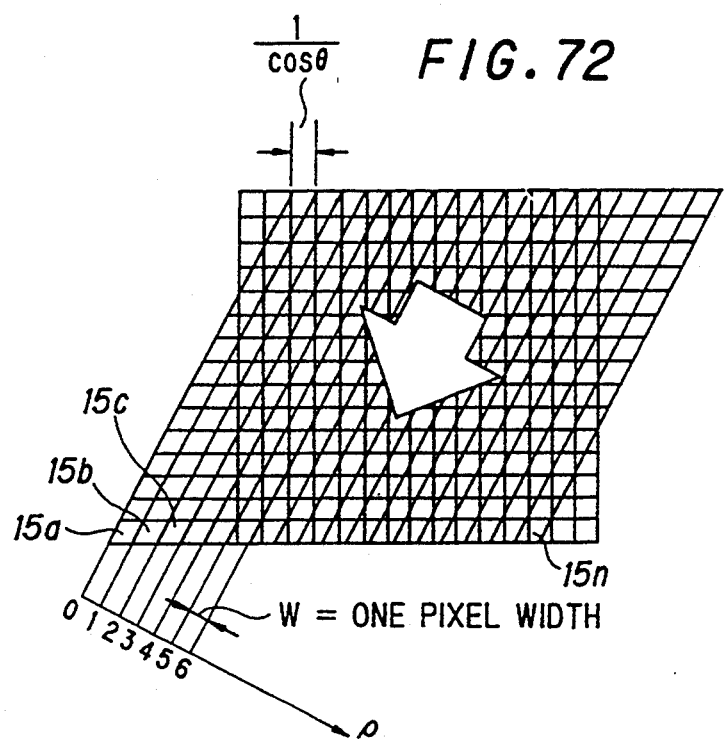
FIG. 72 is a first explanatory view of a method of correcting projection-value error.

Accordingly, as shown in FIG. 72, the width w of each of the slit-shaped parallelograms 15a, 15b, 15c, . . . 15n along the ρ axis is enlarged to the length of one pixel, and the items of image data of the groups of pixels, in the enlarged receptive field 13', overlapped by the slit-shaped parallelograms 15a, 15b, 15c, . . . 15n having this width are accumulated to calculate the projection values. More specifically, the address generator 70 of FIG. 58 is so adapted that the pixel addresses of the pixels of the enlarged receptive field 13' that are overlapped by the slit-shaped parallelograms 15a, 15b, 15c, . . . 15n having this width are outputted in successive fashion.

(h-2) Second method of solution

Figure 73:
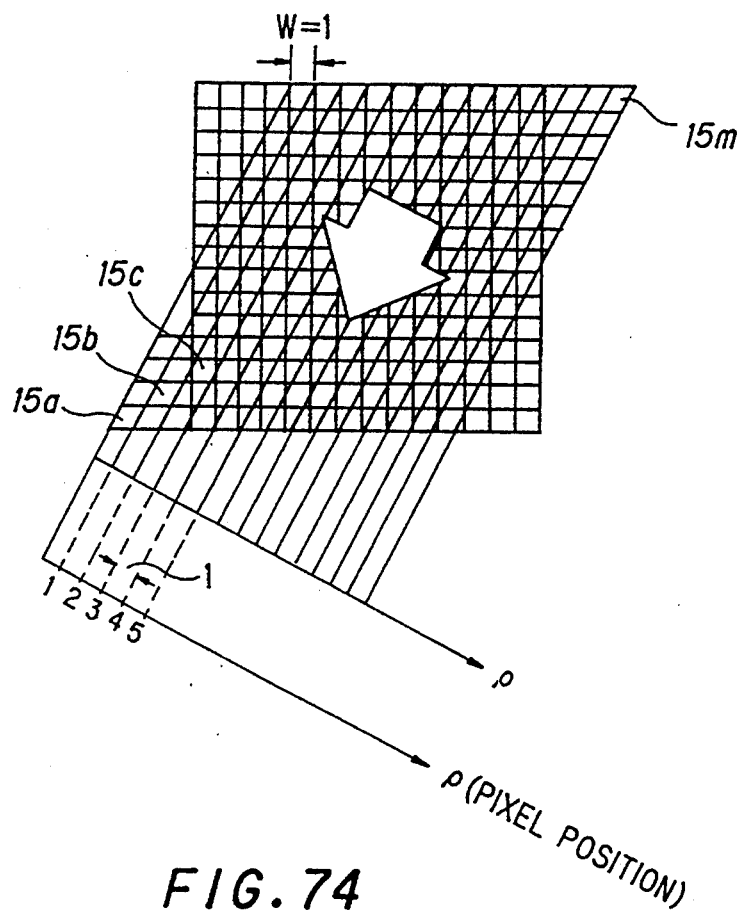
FIG. 73 is a second explanatory view of a method of correcting projection-value error.
Figure 74:
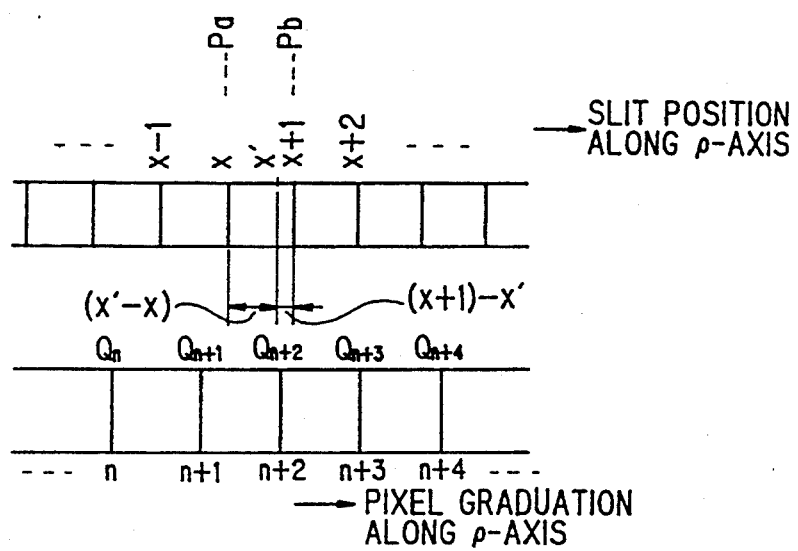
FIG. 74 is an explanatory view of an arithmetic operation for correcting projection-value error.

In a second method of solution, the slit-shaped parallelograms 15a, 15b, 15c, . . . 15n are reduced in width, i.e., the projection values are obtained using the width along the x axis as the width of one pixel, and the projection values are corrected by being enlarged in such a manner that the width along the ρ axis becomes equal to the width of one pixel. More specifically, the positions along the ρ axis that correspond to the slit-shaped parallelograms 15a, 15b, 15c, . . . 15n of reduced width do not coincide with the pixel positions along the ρ axis, as illustrated in FIG. 73. Accordingly, as shown in FIG. 74, let positions along the ρ axis corresponding to the slit-shaped parallelograms of reduced width be represented by . . . , x−1, x, x+1, x+2, . . . . If a pixel graduation position exists between any of these positions (e.g., a pixel graduation position $Q_{n+2}$ exists between x and x+1), the length (x'−x) from x to the pixel graduation position $Q_{n+2}$ and the length (x+1−x') from the position $Q_{n+2}$ to (x+1) are obtained as weighting coefficients. Let Pa represent a projection value in conformity with the x position, and let Pb represent a projection value in conformity with the x+1 position. A projection value Pm at the pixel graduation position $Q_{n+2}$ along the ρ axis is found in accordance with the following equation:

$$Pm = Pa \cdot (x'-x) + Pb \cdot (x+1-x') \quad (15)$$

and the projection value Pm is fed into the FIR filter 22 (FIG. 58). It should be noted that the weighting coefficients (x'−x), (x+1 −x') differ depending upon the projection direction $\theta$ and the position along the ρ axis. Therefore, the weighting coefficients are stored in a ROM in advance and the coefficients are obtained from the ROM subsequently.

Figure 75:
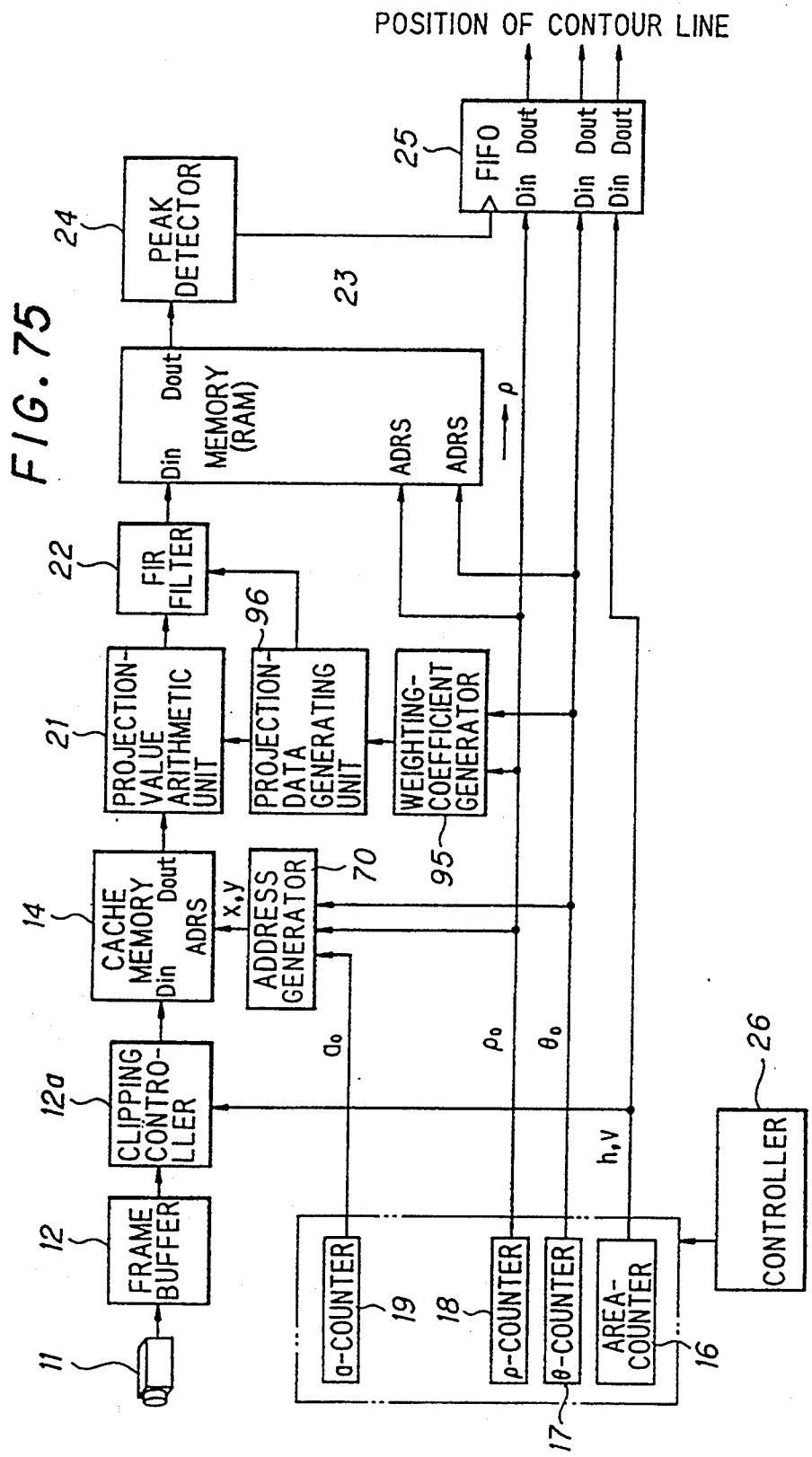
FIG. 75 is a block diagram illustrating a line-segment extracting apparatus equipped with a function for correcting projection-value error.

FIG. 75 is a block diagram illustrating a line-segment extracting apparatus equipped with a function for correcting projection values. Elements in FIG. 75 identical with those in FIG. 58 are designated by like reference characters. This apparatus differs from that of FIG. 58 in that there are provided a weighting-coefficient generator 95 and a projection-value correcting unit 96 for correcting projection values in accordance with Equation (15).

(i) Modifications (i-1) First modification

Figure 76:
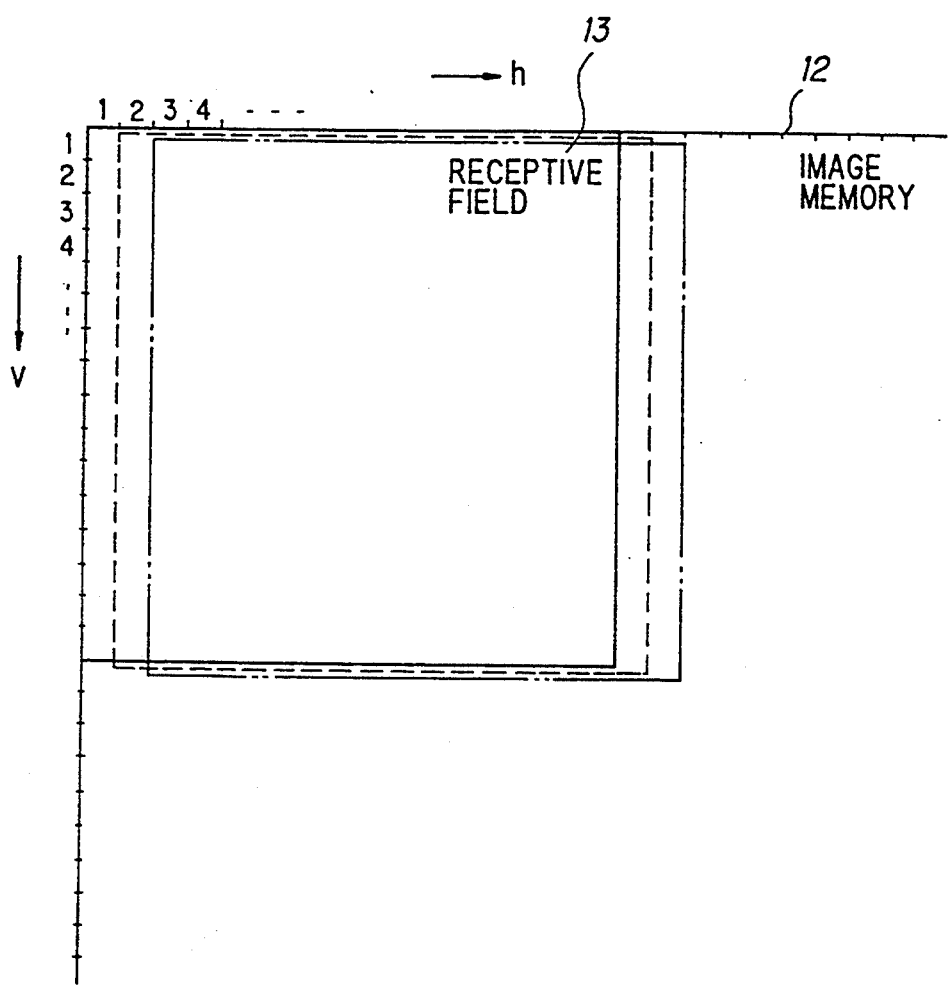
FIG. 76 is a diagram for describing a case in which a line segment is extracted by moving a receptive field one pixel at a time.

In the foregoing, the original image is subdivided into receptive fields and a line segment is extracted for each and every receptive-field image. However, an arrangement can be adopted in which, rather than subdividing the original image into receptive fields, line segments are extracted while the position (h,v) of a receptive-field image clipped from the original image stored in the image memory 12 is moved one pixel at a time in the horizontal and/or vertical direction, as shown in FIG. 76. In this case, since the receptive-field image is shifted one pixel at a time, it is unnecessary to always extract the line segment of the entire receptive-field image; all that need be extracted is the line segment through the center of the receptive field.

More specifically, (1) one receptive-field image comprising m×n pixels clipped from the original image is projected from a prescribed projection direction upon the axis (ρ axis) perpendicular to the projection direction, and the projection values are obtained. (2) The projection values are subjected to differentiation along the ρ axis to obtain a differential value at a center position ρc along the ρ axis. (3) Thereafter, and in similar fashion, projection values obtained while varying the angle θ of the projection direction successively by a prescribed incremental amount are differentiated along the ρ axis to obtain differential values at the center position ρc along the ρ axis in all projection directions. (4) Next, the position (h,v) of the receptive-field image clipped from the original image is shifted one pixel at a time in the horizontal and/or vertical direction and a differential value at the center position ρc along the ρ axis in all projection directions of each receptive field is obtained. (5) Thereafter, the peak positions (ρc, θ, h, v) of the differential values are back-projected onto the receptive fields and the line segment contained in the receptive-field images is extracted.

Figure 77:
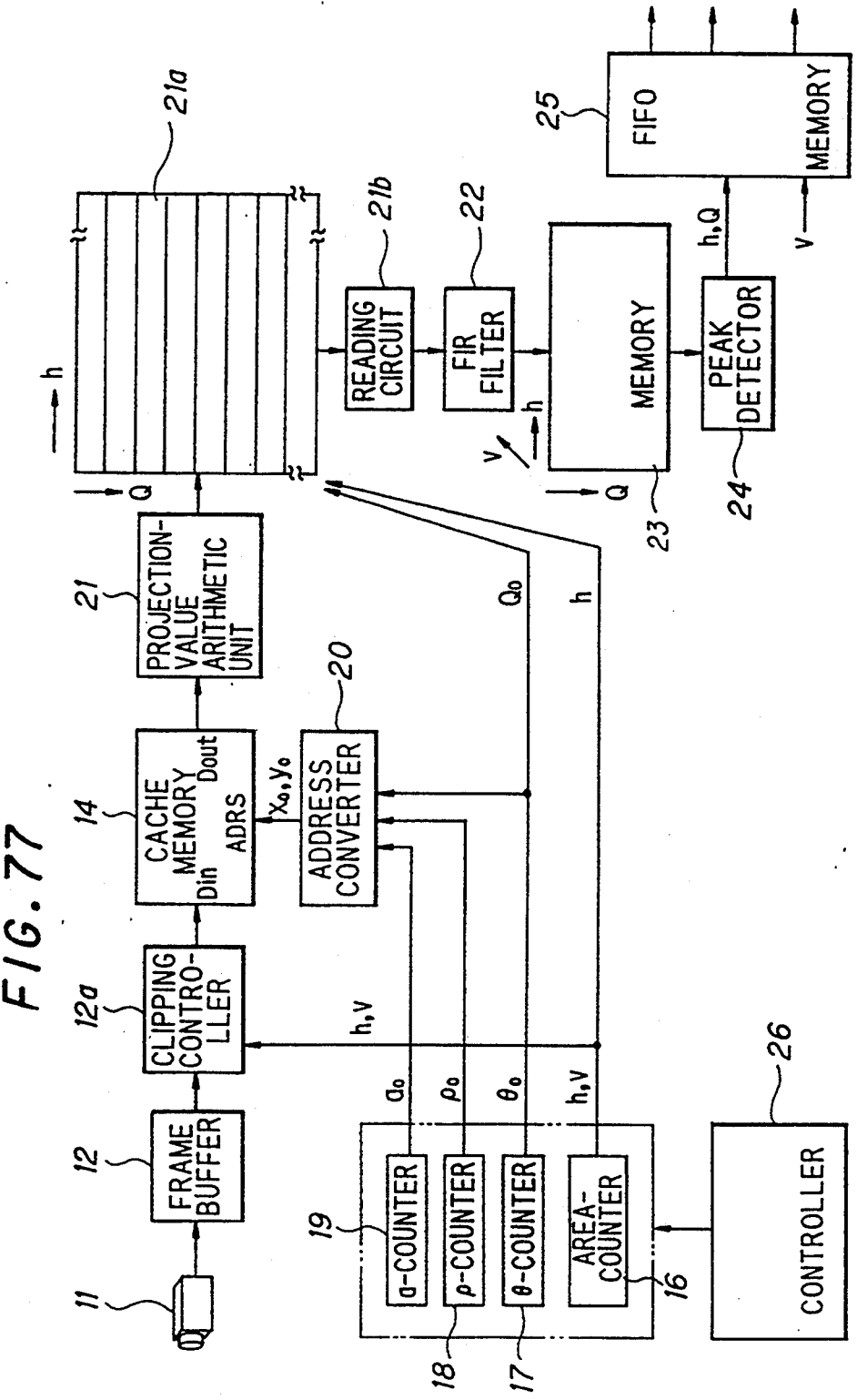
FIG. 77 is a block diagram of an apparatus for extracting a line segment by moving a receptive field one pixel at a time.

In the foregoing, a case is described in which projection values are differentiated and the differential values are stored on a (θ,h,v) plane. However, it is also possible to adopt an arrangement in which the projection values at the center positions ρc along the ρ axis of the receptive fields are successively stored on the (θ,h,v) plane, the projection values are successively read out and subjected to differentiation processing to obtain the differential values at the center positions along the ρ axis. FIG. 77 is a block diagram showing the configuration of such an arrangement. Elements in FIG. 77 identical with those shown in FIG. 9 are designated by like reference characters. Numeral 12a denotes a clipping circuit for clipping a receptive-field image from the position (h,v) designated by the area counter 16 and storing the clipping receptive-field image in the receptive-field memory (cache memory) 14. Numeral 21a denotes a projection-value memory and 21b a reading circuit.

The controller 26 fixes the count of the ρ-counter 18 at the center position ρc along the ρ axis. The clipping circuit 12a reads the receptive-field image out of the image memory 12 from the location designated by the area counter 16 and stores the receptive-field image in the receptive-field memory 14.

The address converter 20 generates a pixel memory address $(x_0, y_0)$ of the receptive field conforming to $θ_0$, ρc, $a_0$. Image data is read out of the receptive-field memory 14 and applied to the projection-value arithmetic unit 21. The latter accumulates the projection values applied thereto.

Since the a-counter 19 successively increments $a_0$ up to the grid width, the projection value at the center position ρc along the ρ axis at a prescribed $θ_0$ is calculated by the projection-value arithmetic unit 21. This is stored at the address of the memory 21a indicated by $θ_0$, h, v. Thereafter, $θ_0$ is incremented up to the set number of azimuths and similar processing for calculating projection values is executed.

When calculation of a projection value at the center position along the ρ axis of the receptive-field images ends by virtue of the foregoing operation, the area counter 16 is incremented by, for example, h. As a result, the clipping circuit 12a clips a receptive-field image that has been shifted to the right by one pixel and the above-described processing is executed. Thereafter, similar processing is executed to calculate projection values for one horizontal portion.

Thereafter, the reading circuit 21b reads the projection values out of the projection-value memory 21a successively in the horizontal direction and applies them to the FIR filter 22. The results of differentiation are stored in the memory 23.

If v is subsequently incremented, h is reset to 0 and the foregoing processing is executed, the differential values of the image within the entire range or a prescribed range are stored in the memory 23. Accordingly, if peak position (ρc,θ,h,v) is obtained by the peak detector 24 and is then back-projected, the line segment contained in the image will be obtained.

In accordance with this method, the receptive field is shifted one pixel at a time. As a result, the joints in line segments between receptive fields can be smoothened. If the line segment that passes through the center of the receptive field is extracted, the line segment of the entire image can be extracted while following up the line segment by moving the receptive field in the direction of the line segment.

(i-2) Second modification

In the foregoing, the receptive-field image is read out of the image memory at the size of the receptive field, line-segment extraction is performed and line segments are extracted for all of the receptive fields. Consequently, processing requires time. Accordingly, if the original image is subdivided into partial areas larger than the receptive field, the number of pixels taken from each partial area is the same as the number of pixels in the receptive field, these pixels are inputted to the receptive-field memory and line-extraction is performed, then line extraction can be performed generally and at high speed, though at a lower accuracy. Further, if size of the partial areas is made smaller as needed, lines can be extracted at successively higher degrees of accuracy.

Figure 78:
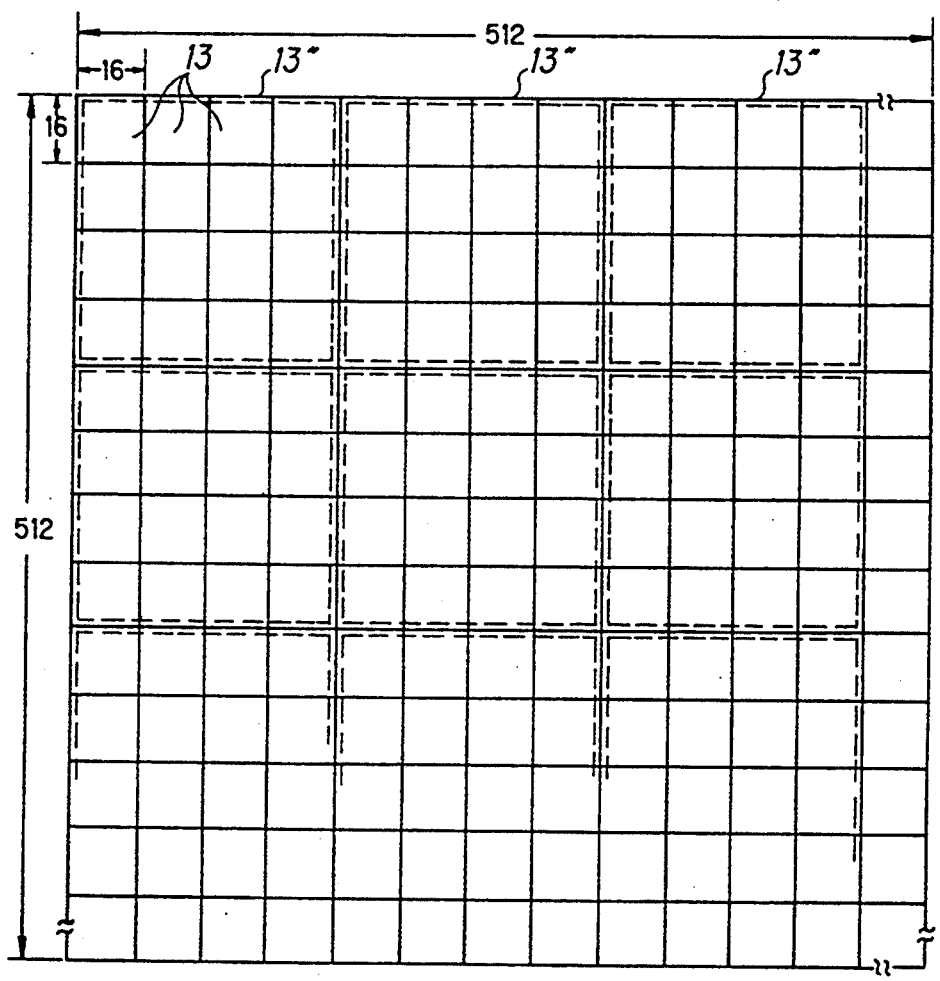
FIG. 78 is a diagram for describing a case in which coarse line extraction is performed by subdividing an original image into partial areas larger than a receptive field.

FIG. 78 is a diagram for describing such a second modification. Here the original image has a size of 512×512, and the receptive field 13 has a size of m×n (e.g., 16×16). In accordance with the second modification, the original image is subdivided into partial areas 13″, in which the numbers of pixels in the horizontal and vertical directions are $p_1 \cdot m$, $p_2 \cdot m$ (where $p_1$, $p_2$ represent integers of 2 or more; in this example, $p_1$, $p_2$=4), m pixels per $p_1$ pixels are taken from the partial areas in the horizontal direction, n pixels per $p_2$ pixels are taken from the partial areas in the vertical direction, and these pixels are adopted as the receptive-field image. This receptive-field image is subjected to line-segment extraction and line segments are extracted while successively reducing the values of $p_1$, $p_2$.

(i-3) Third modification

In the foregoing, an image is projected, projection values are differentiated and lines are extracted based upon peak positions of the differential values. However, an arrangement may be adopted in which the image is subjected to edge detection processing and line segments are extracted based upon the peak positions of the projection values of the image obtained by edge detection processing. Specifically, (1) a receptive-field image is subjected to edge detection processing, (2) the image obtained by edge detection processing is projected from a prescribed projection direction upon the axis (ρ axis) perpendicular to the projection direction and the projection values are obtained, (3) projection values are similarly obtained while varying the angle θ of the projection direction successively by a prescribed incremental amount to obtain projection values at each of the positions on the ρ-θ plane, and (4) the peak positions (ρ,θ) of the projection values are back-projected upon the receptive field to extract the line segment contained in the receptive-field image.

Figure 79:
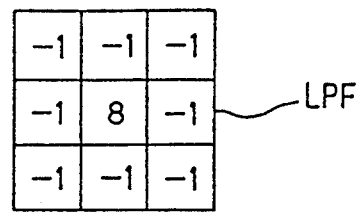
FIG. 79 is an explanatory view of a Laplacian filter used in edge detection processing.

Edge detection processing is executed in the following manner: As shown in (FIG. 79, a Laplacian filter LPF comprising, say, 3×3 pixels and having weightings of 8 at the central pixel and −1 at each of the surrounding pixels. The Laplacian filter LPF is superimposed upon the receptive-field image, the sum of the products of the weight of each pixel of the filter LPF and the image data of the receptive-field pixels corresponding to the pixels of the filter is calculated, and the result of calculation is adopted as image data of the receptive-field pixel conforming to the central pixel of the Laplacian filter LPF.

More specifically, assume that the items of image data of receptive-field pixels corresponding to the pixels of the 3×3 Laplacian filter LPF are f(x−1,y−1), f(x,y−1), f(x+1,y−1), f(x−1,y), f(x,y), f(x+1,y), f(x−1,y+1), f(x,y+1), f(x+1,y+1) . In such case, image data F(x,y) at (x,y) in the receptive field will be calculated in accordance with the following equation:

$$F(x,y) = \{-f(x-1,y-1) - f(x,y-1) - \\ f(x+1,y-1) - f(x-1,y) + \\ f(x,y) - f(x+1,y) - f(x-1,y+1) - \\ f(x,y+1) - f(x+1,y+1)\} \quad (16)$$

Figure 80A:
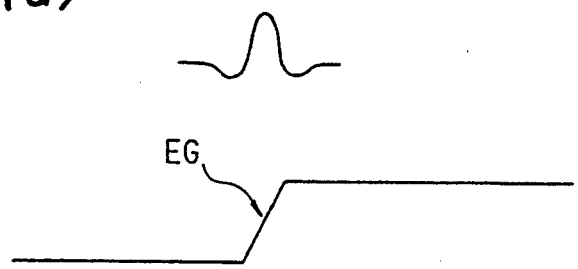
FIG. 80 is an explanatory view of edge detection processing using a Laplacian filter.
Figure 80B:
Figure 80C:
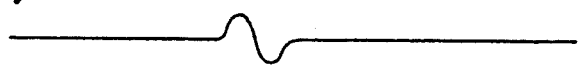

Since a Laplacian filter has the characteristic shown in FIG. 80(a), moving the Laplacian filter LPF means moving this characteristic. Accordingly, if the characteristic is moved with respect to an edge EG [FIG. 80(b)] between light and dark areas, the edge detection signal shown in FIG. 80(c) is obtained.

FIG. 81 illustrates a hardware configuration for executing edge detection processing. The apparatus includes the receptive-field memory (cache memory) 14, an edge detecting processor 22', a read controller 22a', a convolution arithmetic unit 22b' for executing the edge detection operation of Equation (16), a memory 22c' for storing the results of edge detection processing, and the Laplacian filter LPF. The read controller 22a' reads out the image data of a 3×3 area (the hatched area) overlapped by the Laplacian filter LPF and applies the image data to the convolution arithmetic unit 22b'. The latter performs the operation of Equation (16) and stores the results at the hatched location of the memory 22c'. Next, the read controller shifts the 3×3 area, which is overlapped by the Laplacian filter, one pixel in the horizontal direction (see the dashed line), similar edge detection processing is performed as the result is stored at the location indicated by the dashed line in the memory 22c'. Thereafter, and in similar fashion, edge detection processing is executed while successively shifting, one pixel at a time, the position of the 3×3 receptive-field image read out of the receptive-field memory 14. This is performed in the same manner as raster scanning.

Figure 82:
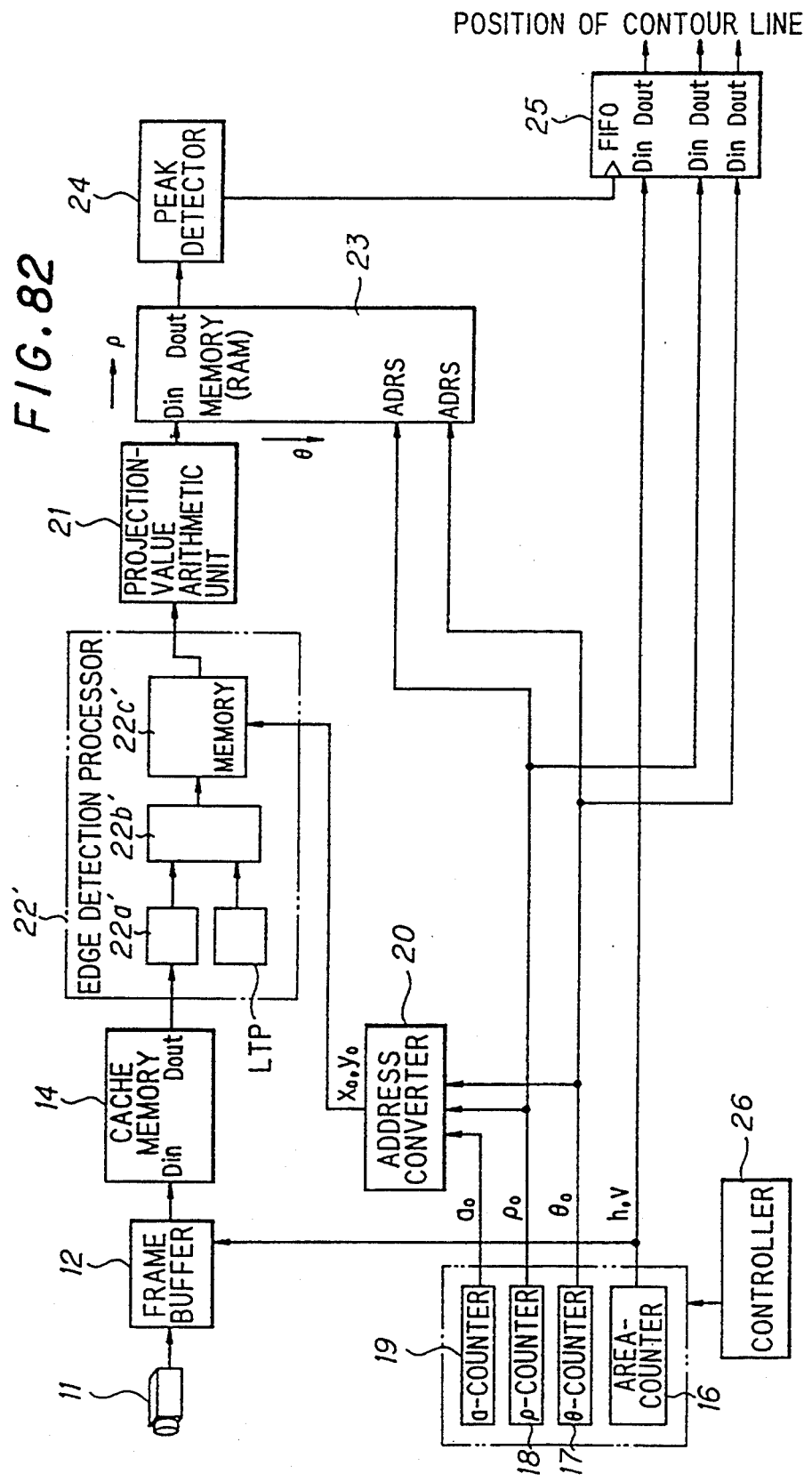
FIG. 82 is a block diagram showing a line-segment extracting apparatus in which edge detection processing is executed before calculation of projection values.

An operation for calculating projection values is applied to the image data thus subjected to edge detection processing. FIG. 82 is a block diagram of the third modification. Elements in FIG. 82 similar to those in the arrangement of FIG. 9 are designated by like reference characters. The apparatus differs from that of FIG. 9 in that (1) the FIR filter 22 is eliminated and the edge detecting processor 22' is provided instead; (2) the memory 22c' is addressed by the address $x_0, y_0$ outputted by the address converter 20; (3) the image data that has been subjected to edge processing is accumulated to calculate projection values; and (4) the peak positions of the projection values are obtained and a line segment is extracted from the peak values.

Figure 83A:
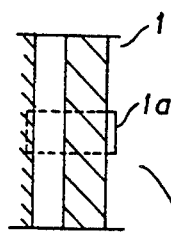
FIG. 83 is a view of an original image in which the luminance of a striped pattern is illustrated three-dimensionally on an X-Y plane.
Figure 83B:
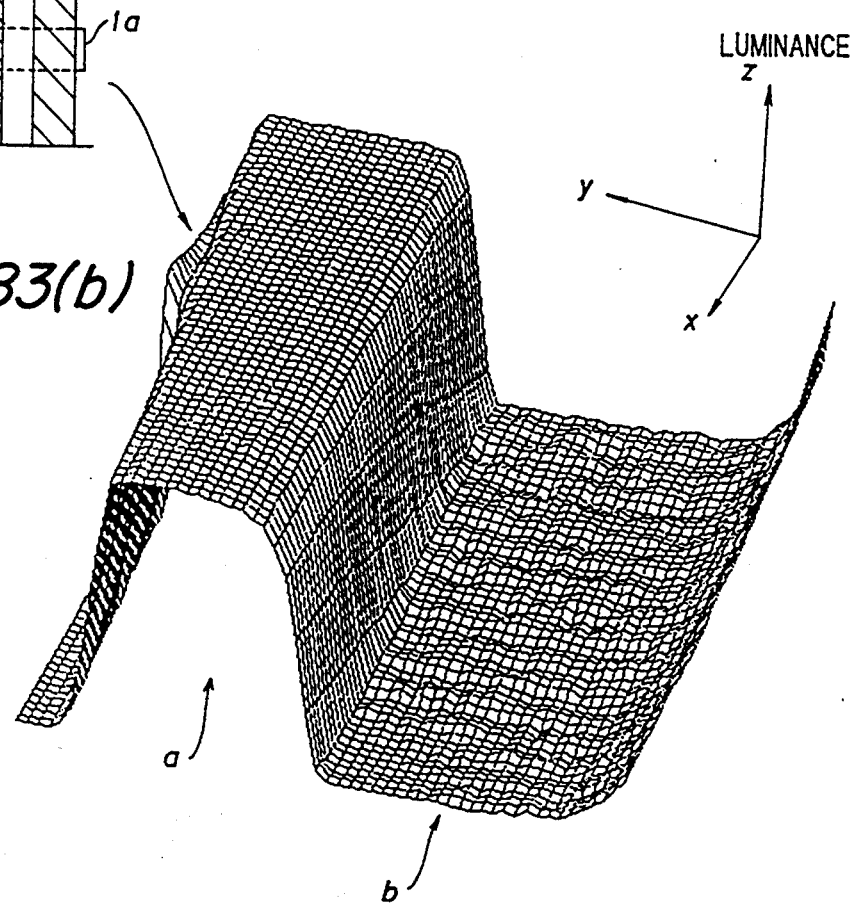

(j) Examples of image data and differential data processed by the embodiment (j-1) Original image indicated by luminance Z on X-Y plane FIGS. 83(a) and 83(b) shows an original image in which the luminance of part (the portion indicated by the dashed line) of a black-and-white striped pattern 1 of FIG. 83(a) is illustrated three-dimensionally on an X-Y plane in FIG. 83(b). The portion a is white and the portion b is black.

(j-2) Contour diagram of original image

Figure 84A:
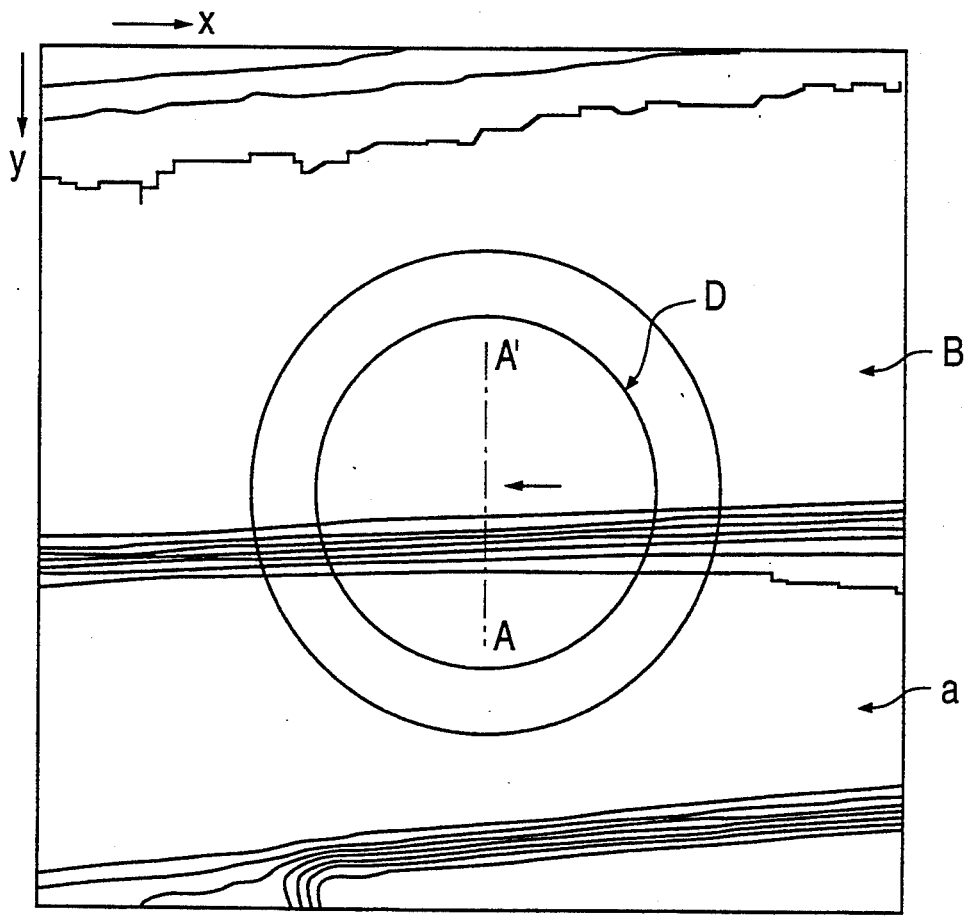
FIGS. 84(a)-(b) are a diagram showing contour lines of an original image.
Figure 84B:

FIG. 84(a) is a diagram showing contour lines of an original image. The portions a, b correspond to the portions a, b in FIG. 83. FIG. 84(b) is a sectional view (gradient of luminance) taken along line A—A' in FIG. 84(a).

(j-3) Projection values on ρ-θ plane

Figure 85:
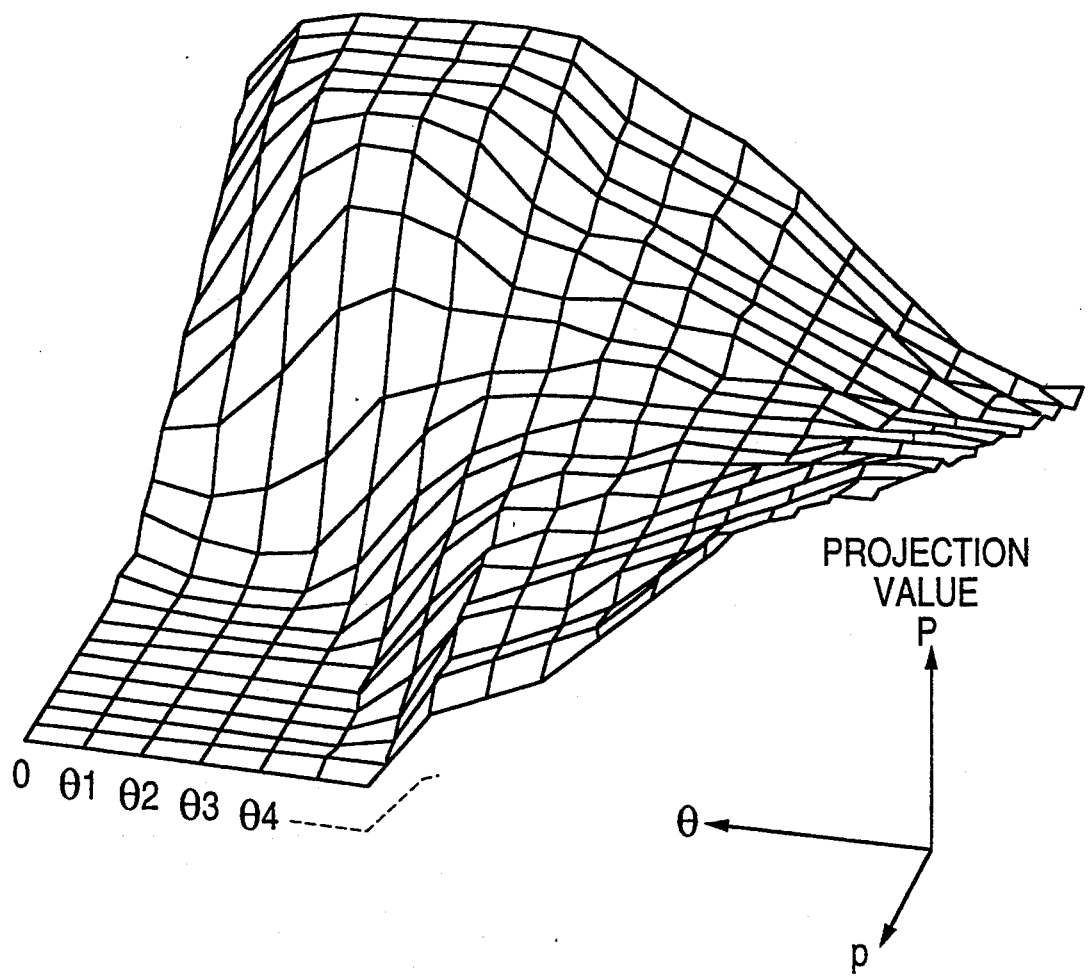
FIG. 85 is a distribution of projection values on the ρ-θ plane.

FIG. 85 is a distribution of projection values on the ρ-θ plane, the projection values being obtained by projecting the pixels within a receptive field D (FIG. 84) with regard to a plurality of directions θ.

(j-4) Contour diagram of projection values

Figure 86A:
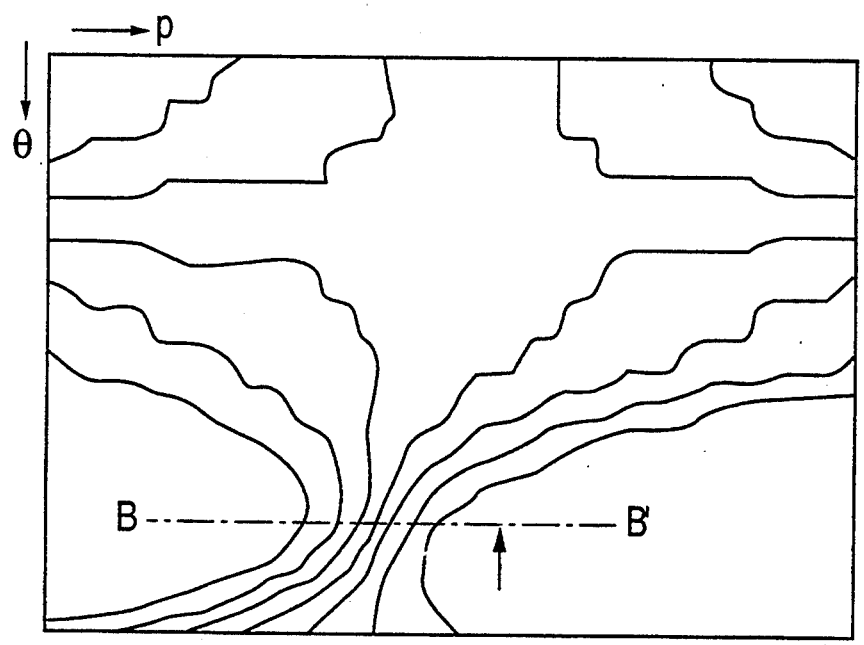
FIGS. 86(a)-(b) are a diagram showing contour lines of projection values on the ρ-θ plane.
Figure 86B:
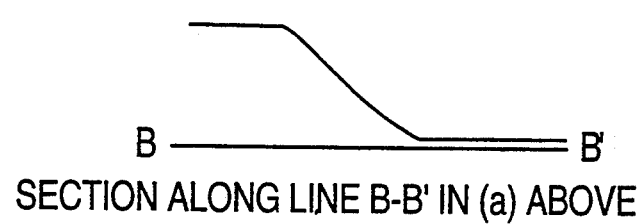

FIG. 86(a) is a projection-value contour diagram, on the ρ-θ plane, obtained by projecting the pixels within the receptive field D (FIG. 84) with regard to a plurality of directions θ, and FIG. 86(b) is a sectional view taken along line B—B' in FIG. 86(b). It will be understood that the projection values have a slope, i.e., that an edge is present.

(j-5) Two-dimensional distribution of differential values

Figure 87A:
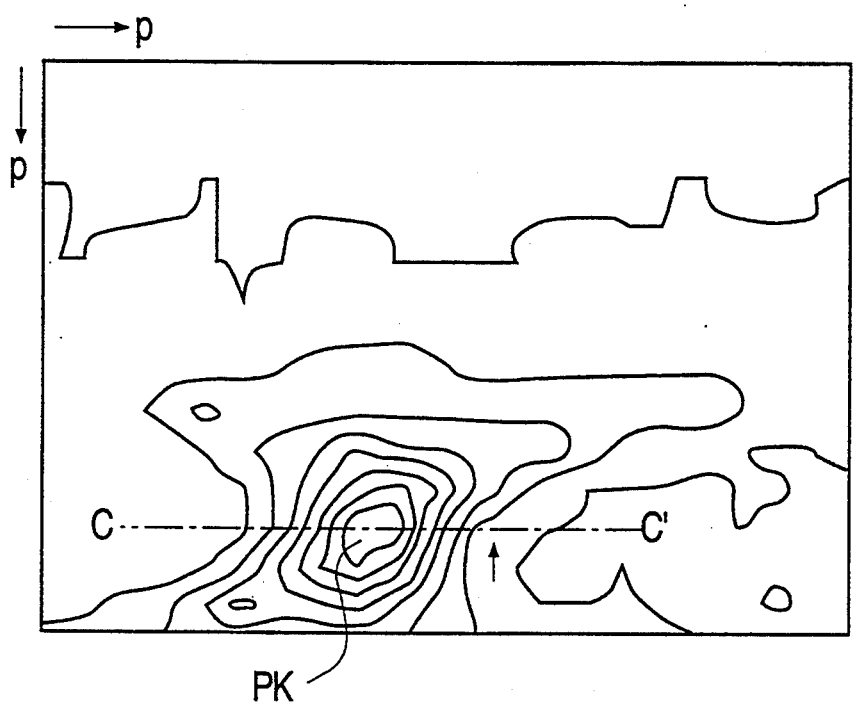
FIGS. 87(a)-(b) are a diagram of contour lines, on the ρ-θ plane, of differential values that have been differentiated along the ρ axis.
Figure 87B:
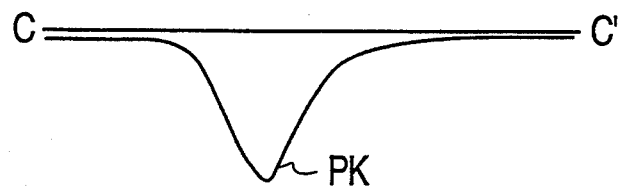

FIG. 87(a) is a diagram of contour lines, on the ρ-θ plane, of differential values that have been obtained by differentiating the projection values (FIG. 86) along the ρ axis. FIG. 87(b) is a sectional view taken along line C—C' in FIG. 87(b). A peak PK of the differential values is present at a point where the slope of the projection values is maximum, namely at the portion of an edge.

As many apparently widely different embodiments of the present invention can be made without departing from the spirit and scope thereof, it is to be understood that the invention is not limited to the specific embodiments thereof except as defined in the appended claims.

What is claimed is:

1. A computer-implemented method of extracting a line segment contained in an original image, comprising the steps of:

inputting an original two-dimensional image of an object;

clipping an image, which corresponds to the size of a receptive field defining a small area, from the original two-dimensional image;

projecting the clipped receptive-field image from a predetermined projection direction onto an axis (ρ axis) that intersects said projection direction and obtaining projection values at positions along the ρ axis;

subjecting the projecting values to differentiation processing along the ρ axis;

similarly subjecting projection values, which are obtained by successively varying a projection-direction angle θ incrementally a predetermined amount, to differentiation processing along the ρ axis to thereby obtain a differential value at each position on a ρ-θ plane;

extracting a line segment contained in the receptive-field image based upon a peak position (ρ,θ) of the differential values; and generating a one-dimensional image representing one of a contour line of the object and an edge between light and dark of the object based on the extracted line segment.

2. The computer-implemented method according to claim 1, wherein the original image is subdivided into receptive fields, said line-segment extraction processing is applied to each receptive-field image, and a line segment contained in the original image is extracted.

3. The computer-implemented method according to claim 1, wherein a step of calculating a projection value at the projection-direction angle θ includes steps of:

setting a projection grid having sides parallel to a and ρ axes on a receptive field, where an axis along the projection axes is the a axis and an axis perpendicularly intersecting the a axis is the ρ axis;

accumulating image data of pixels, of the receptive field, that are overlapped by each pixel within the projection grid for which the value along the ρ axis is $\rho_0$; and calculating, as a projection value that prevails when the projection-direction angle is θ, each accumulated value obtained by varying $\rho_0$ incrementally a predetermined amount up to the width of the projection grid.

4. The computer-implemented method according to claim 3, wherein a center of the projection grid and a center of the receptive field are made to coincide, the projection grid is successively rotated incrementally a predetermined amount and projection values in all projection directions are calculated.

5. The computer-implemented method according to claim 4, wherein all projection directions range from 0° to 180°.

6. The computer-implemented method according to claim 3, wherein there is provided coordinate transformation means for coordinate-transforming pixel positions within the projection grid into pixel positions within the receptive field, pixel positions, within the projection grid, for which the value along the ρ axis is $\rho_0$ are subjected to a coordinate transformation to obtain corresponding pixel positions within the receptive field.

7. The computer-implemented method according to claim 3, wherein the size of the receptive-field is larger than the size of the projection grid.

8. The computer-implemented method according to claim 3, further including the steps of:

modifying shape of the projection grid in such a manner that the number of pixels accumulated gradually diminishes as the edge of said grid is approached from the center thereof; and dividing the accumulated value of the image data at each position along the ρ axis by the number of pixels accumulated, thereby calculating projection values by performing normalization.

9. The computer-implemented method according to claim 3, further including steps of:

reducing weighting of pixels as the periphery of said receptive field is approached from the center thereof;

obtaining a weighted image by multiplying each item of pixel data of the receptive-field image by a weighting; and calculating projection values using said weighted value.

10. The computer-implemented method according to claim 3, further including steps of:

enlarging degree of vignetting of pixels as the periphery of said receptive field is approached from the center thereof;

obtaining a vignetted image by applying vignetting processing to each item of pixel data of the receptive-field image; and calculating projection values using said vignetted image.

11. The computer-implemented method according to claim 1, further including steps of:

detecting a peak position (ρ,θ) having a maximum value among said differential values; and extracting a line segment contained in the receptive-field image based upon said peak position (ρ,θ).

12. The computer-implemented method according to claim 1, further including steps of:

comparing a differential value at a predetermined position on the ρ-θ plane and differential values at surrounding positions; and adopting the predetermined position as the peak position if the differential value at said predetermined position is maximum.

13. The computer-implemented method according to claim 11, further including steps of:

deciding a function, in which a variable is ρ or θ, that gives the differential value at the peak position and a differential value at a position adjacent to said peak position along the ρ or θ axis; and adopting the peak position of said functional value as a true peak position.

14. The computer-implemented method according to claim 2, further including steps of:

subdividing the original image into partial areas in which numbers of pixels in horizontal and vertical directions are $p_1 \cdot m$, $p_2 \cdot m$ (where $p_1$, $p_2$ represent integers of 2 or more and m, n represent numbers of pixels in the horizontal and vertical directions of the receptive field);

taking m pixels per $p_1$ pixels from the partial areas in the horizontal direction and n pixels per $p_2$ pixels from the partial areas in the vertical direction; and performing line-segment extraction using the m pixel and n pixels as the receptive-field image; and performing line-segment extraction upon successively reading the values of $p_1$, $p_2$.

15. A computer-implemented method of extracting a line segment contained in an original image, comprising the steps of:

inputting an original two-dimensional image of an object;

adopting a small area comprising m×n pixels as a receptive field, projecting one receptive-field image, which has been clipped from the original two-dimensional image, from a prescribed projection direction upon the axis (ρ axis) perpendicular to the projection direction to obtain projection values, and subjecting said projection values to differentiation processing along the ρ axis to obtain a differential value at a center position ρc along the ρ axis;

similarly applying differentiation processing, along the ρ axis, to projection values obtained while varying the angle θ of the projection direction successively by a prescribed incremental amount, thereby obtaining differential values at the center position ρc along the ρ axis in all projection directions;

shifting a position (h,v) of the receptive-field image, which is clipped from the original image, one pixel at a time in the horizontal and/or vertical direction;

obtaining a differential value at the center position $\rho c$ along the $\rho$ axis in all projection directions of each receptive field;

extracting a line segment contained in the receptive-field images based upon the peak positions ($\rho c$, $\theta$) of the differential values; and generating a one-dimensional image representing one of a contour line of the object and an edge between light and dark of the object based on the extracted line segment.

16. A line-segment extracting computer-implemented method for subdividing an image into receptive fields each of which defines a small area, projecting an image of the receptive field from a predetermined projection direction onto an axis ($\rho$ axis) that perpendicularly intersects said projection direction to obtain projection values at positions along the $\rho$ axis, subjecting the projection values to differentiation processing along the $\rho$ axis, similarly subjecting projection values, which are obtained by successively varying a projection-direction angle $\theta$ incrementally a predetermined amount, to differentiation processing along the $\rho$ axis to thereby obtain a differential value at each position on a $\rho$-$\theta$ plane, and extracting a line segment contained in the receptive-field image based upon a peak position ($\rho$,$\theta$) of the differential values, said method comprising the steps of:

inputting an original two-dimensional image of an object;

setting a projection grid, which has sides parallel to an a axis and the $\rho$ axis, on the receptive field of the original two-dimensional image, in which the a axis is an axis in the projection direction;

accumulating image data of pixels, of the receptive field, corresponding to respective ones of a number of pixels within said projection grid for which the value along the $\rho$ axis is $\rho 0$;

calculating, as projection values that prevail when the projection-direction angle is $\theta$, accumulated values, at positions along the $\rho$ axis, obtained by varying $\rho 0$ incrementally a predetermined amount up to the width of the projection grid; and generating a one-dimensional image representing one of a contour line of the object and an edge between light and dark of the object based on the extracted line segment;

said step of accumulating the image data includes steps of:

providing coordinate transformation means for coordinate-transforming a pixel position within the projection grid into a pixel position within the receptive field, and obtaining a position within the receptive field by applying a coordinate transformation to a pixel position, within the projection grid, for which the value along the $\rho$ axis is $\rho 0$;

obtaining a weighted mean value of each item of pixel data indicative of a pixel within the receptive field belonging to said position and a pixel adjacent to said pixel;

calculating said weighted mean value with respect to each pixel position, within the projection grid, for which the value along the $\rho$ axis is $\rho 0$; and calculating a projection value, for which the value along the $\rho$ axis is $\rho 0$, by accumulating the weighted mean value obtained.

17. The computer-implemented method according to claim 16, wherein said coordinate transformation means has a ROM for storing, for each and every projection direction, data indicating a position, within the receptive field, conforming to each pixel position ($\rho$,$\theta$) within the projection grid.

18. The computer-implemented method according to claim 16, wherein said weighted mean value is calculated upon weighting the image data of each pixel based upon a distance from a position, within the receptive field, obtained by said coordinate transformation to centers of adjacent pixels within the receptive field.

19. The computer-implemented method according to claim 16, further including steps of:

setting first and second parallel lines at positions on both sides of a projection center line at a predetermined distance from the projection center line, wherein said projection center line connects the centers of pixels, within the projection grid, for which the value along the $\rho$ axis is $\rho_0$; and calculating said weighted mean value by weighting the image data of each pixel in conformity with distances from a boundary line between said adjacent pixels within the receptive field to said first and second parallel lines.

20. A line-segment extracting computer-implemented method for subdividing an image into receptive fields each of which defines a small area, projecting an image of the receptive field from a predetermined projection direction onto an axis ($\rho$ axis) that perpendicularly intersects said projection direction to obtain projection values at positions along the $\rho$ axis, subjecting the projection values to differentiation processing along the $\rho$ axis, similarly subjecting projection values, which are obtained by successively varying a projection-direction angle $\theta$ incrementally a predetermined amount, to differentiation processing along the $\rho$ axis to thereby obtain a differential value at each position on a $\rho$-$\theta$ plane, and extracting a line segment contained in the receptive-field image based upon a peak position ($\rho$,$\theta$) of the differential values, said method comprising the steps of:

inputting an original two-dimensional image of an object;

setting a projection grid, which has sides parallel to an a axis and the $\rho$ axis, on the receptive field of the original two-dimensional image, in which the a axis is an axis in the projection direction;

coordinate-transforming each pixel position within the projection grid, for which the value along the $\rho$ axis is $\rho 0$, into pixel positions within the receptive field;

accumulating pixel data of each pixel, within the receptive field, obtained by the coordinate transformation;

calculating, as projection values that prevail when the projection-direction angle is $\theta$, accumulated values, at positions along the $\rho$ axis, obtained by varying $\rho 0$ incrementally a predetermined amount up to the width of the projection grid; and generating a one-dimensional image representing one of a contour line of the object and an edge between light and dark of the object based on the extracted line segment;

said coordinate transformation step including steps of:

storing, in correlation with position along the $\rho$ axis, a y address (where a pixel position within the receptive field is expressed by an x-y address)

of a pixel group, within the receptive field, that corresponds to a pixel group of a=0 among pixels within said projection grid, and storing said correlation, in a first memory, for each and every projection direction;

storing, in correlation with the y address, an x address of a pixel group, within the receptive field, that corresponds to a pixel group of $\rho=0$ among pixels within said projection grid, and storing said correlation, in a second memory, for each and every projection direction; and calculating an x, y address of each pixel, within the receptive field, that conforms to each pixel, within said projection grid, for which the value along the $\rho$ axis is $\rho 0$ using said correlation data, which conforms to the projection-direction angle $\theta$, that has been stored in the first and second memories.

21. The computer-implemented method according to claim 20 wherein said step of calculating the x, y address includes steps of:

obtaining, from said first memory, the y address ($=y_0$) of a pixel, within the receptive field, that corresponds to a first pixel at a position $(0,\rho_0)$ within said projection grid;

obtaining a value conforming to the y address ($=y_0$) from said second memory and adding $\rho_0$ to said value to obtain the x address; and subsequently incrementing the previous y address to obtain a y address of a pixel, within the receptive field, that corresponds to a second pixel, within the projection grid, for which the position along the $\rho$ axis is $\rho_0$, obtaining a value conforming the obtained address from said second memory, adding $\rho_0$ to said value to obtain the x address, and thereafter obtaining the x, y address in similar fashion.

22. A line-segment extracting computer-implemented method for subdividing an original image into receptive fields each of which defines a small area, projecting an image of the receptive field from a predetermined projection direction onto a $\rho$ axis that intersects said projection direction to obtain projection values at positions along the $\rho$ axis, subjecting the projection values to differentiation processing along the $\rho$ axis, similarly subjecting projection values, which are obtained by successively varying a projection-direction angle $\theta$ incrementally a predetermined amount, to differentiation processing along the $\rho$ axis to thereby obtain a differential value at each position on a $\rho$-$\theta$ plane, and extracting a line segment contained in the receptive-field image based upon a peak position $(\rho,\theta)$ of the differential values, said method comprising the steps of:

inputting an original two-dimensional image of an object;

expressing a pixel position of the receptive field of the original two-dimensional image by an x-y address and making the $\rho$ axis coincide with either the x axis or y axis;

setting a projection grid on the receptive field, said projection grid defining a parallelogram having a side parallel to an a axis, which is the projection direction, and a side parallel to the $\rho$ axis;

subdividing said projection grid into slit-shaped parallelograms extending along the projection direction by a width of one pixel;

calculating a projection value of the projection-direction angle $\theta$ at a position $\rho 0$ along the $\rho$ axis by accumulating image data of pixels, within the receptive field, that overlap a slit-shaped parallelogram corresponding to the position $\rho 0$; and generating a one-dimensional image representing one of a contour line of the object and an edge between light and dark of the object based on the extracted line segment.

23. The computer-implemented method according to claim 22, further including steps of:

clipping a portion of an image of an enlarged receptive field, which has a range wider than that of the receptive field, from the original image and storing the clipped image in a memory;

setting the projection grid, which is in the shape of the parallelogram having sides parallel to the a and $\rho$ axes, on said enlarged receptive field and subdividing said projection grid into slit-shaped parallelograms extending along the projection direction by the width of one pixel; and calculating a projection value of the projection-direction angle $\theta$ at a position $\rho_0$ along the $\rho$ axis by accumulating image data of pixels, within the enlarged receptive field, that overlap a slit-shaped parallelogram corresponding to the position $\rho_0$.

24. The computer-implemented method according to claim 23, wherein when an enlarged receptive-field image conforming to the next adjoining receptive field is read out to the memory and image processing is performed after image processing regarding the present enlarged receptive-field image ends, a portion of the present enlarged receptive-field image that overlaps the next adjoining enlarged receptive-field image is left in the memory and only the portion of the next adjoining enlarged receptive-field image not overlapped is read out to the memory and subjected to image processing.

25. The computer-implemented method according to claim 23, wherein when an enlarged receptive-field image conforming to the next adjoining receptive field is read out to the memory and image processing is performed after image processing regarding the present enlarged receptive-field image ends, those projection values regarding the present enlarged receptive-field image that relate to an image portion in which the present enlarged receptive-field image and the next adjoining receptive-field image overlap are utilized as projection values of the next adjoining receptive-field image.

26. The computer-implemented method according to claim 22, wherein the width of each slit-shaped parallelogram in the direction that perpendicularly intersects the projection direction is made the width of one pixel.

27. The computer-implemented method according to claim 22, wherein if the width of each slit-shaped parallelogram in the direction that perpendicularly intersects the projection direction is less the width of one pixel, the adjacent projection value is used to apply a correction to the projection value of one pixel width in the direction that perpendicularly intersects the projection direction.

28. The computer-implemented method according to claim 22, wherein the step of accumulating image data of each pixel in the receptive field that overlaps each slit-shaped parallelogram includes steps of:

storing, in a memory in correlation with a y address, an x address of a pixel group, within the receptive field, that corresponds to a pixel group constituting a slit-shaped parallelogram of $\rho=0$ among pixels within said projection grid, the correlation being stored in said memory as the projection-direction angle $\theta$ is changed;

obtaining the y address of each pixel, within the receptive field, that corresponds to each pixel, within said projection grid, for which the value along the $\rho$ axis is $\rho_0$ by successively incrementing the address y from an initial value, and obtaining an x address corresponding to said y address from said memory;

obtaining an x address of each pixel within the receptive field by adding $\rho_0$ to said x address; and accumulating image data of each receptive-field pixel designated by each obtained x,y address, and calculating an accumulated value for which the value along the $\rho$ axis is $\rho_0$.

29. The computer-implemented method according to claim 22, wherein the step of accumulating image data of each pixel in the receptive field that overlaps each slit-shaped parallelogram includes steps of:

storing an x address of a pixel, within the receptive field, that corresponds to a vertex pixel of $\rho=0$ within said projection grid;

storing, in correlation with the y address, and for each and every projection direction, an incremental value dx of the x address of the pixel group, within the receptive field, that corresponds to the pixel group constituting the slit-shaped parallelogram of $\rho_0$ among the pixels within said projection grid;

obtaining the y address of each pixel, within the receptive field, that corresponds to each pixel, within said projection grid, for which the value along the $\rho$ axis is $\rho_0$ by successively incrementing the y address from an initial value;

obtaining the x address of each receptive-field pixel by adding the incremental value dx of the x address conforming to said y address and the x address of said vertex point conforming to the projection direction $\theta$; and calculating a projection value by accumulating image data of the receptive-field pixel designated by each obtained x-y address.

30. A line-segment extracting computer-implemented method for subdividing an image into receptive fields each of which defines a small area, projecting an image of a receptive field from a predetermined projection direction, subjecting projection values to differentiation processing, obtaining differential values by successively varying a projection-direction angle $\theta$ incrementally a predetermined amount, extracting a line segment contained in the receptive-field image based upon a peak position of said differential values, and combining line segments of each of the receptive-field images, said method comprising the steps of:

inputting an original two-dimensional image of an object;

obtaining all projection values in a horizontal direction by projecting all receptive-field images of the original two-dimensional image along the horizontal direction from a prescribed projection direction, successively varying the projection-direction angle $\theta$ incrementally a predetermined amount and similarly storing projection values in a memory;

successively reading the projection values of the projection-direction angle $\theta$ out of the memory and applying differentiation processing thereto;

subsequently reading projection values, which prevail when the projection-direction angle $\theta$ is successively varied incrementally a predetermined amount, out of the memory and applying differentiation processing thereto;

extracting line segments contained in the receptive-field images based upon peak positions of the differential values; and generating a one-dimensional image representing one of a contour line of the object and an edge between light and dark of the object based on the extracted line segments.

31. The computer-implemented method according to claim 30, wherein said step of calculating all projection values in the horizontal direction includes steps of:

providing m-number of data shifting means each having a variable amount of shift (where represents the number of pixels of the receptive field in the vertical direction thereof), and a memory for storing each amount of shift of the m-number of data shifting means in dependence upon the projection direction $\theta$;

successively inputting, to said m-number of data shifting means in linear fashion, image data of m-number of pixels in the vertical direction of all receptive-field images along the horizontal direction;

causing each of said data shifting means to input, to adding means, a respective item of input image data upon shifting the image data by each amount of shift conforming to the projection direction angle $\theta$; and causing said adding means to add m-number of items of image data outputted by said m-number of data shifting means.

32. A computer-implemented method of extracting a line segment contained in an original image, comprising the steps of:

inputting an original two-dimensional image of an object;

clipping an image, which conforms to the size of a receptive field defining a small area, from the original two-dimensional image;

subjecting the receptive-field image that has been clipped to edge detection processing;

projecting an image obtained by the edge detection processing from a prescribed projection direction upon an axis ($\rho$ axis) that intersects said projection direction and obtaining a projection value at each position along the $\rho$ axis;

similarly obtaining projection values by successively varying the projection-direction angle $\theta$ incrementally a predetermined amount, and obtaining a projection value at each position on a $\rho\theta$ plane;

extracting a line segment contained in the receptive-field image based upon a peak position ($\rho,\theta$) of the projection values; and generating a one-dimensional image representing one of a contour line of the object and an edge between light and dark of the object based on the extracted line segment.

33. The computer-implemented method according to claim 32, further including subdividing the original image into receptive fields, applying the line-segment extraction processing to each receptive-field image and extracting a line segment contained in the original image.

34. An apparatus for extracting a line segment contained in an original image, comprising:

means for inputting an original two-dimensional image of an object image clipping means for clipping an image, which conforms to the size of a receptive field defining a small area, from the original two-dimensional image;

projection-value arithmetic means for projecting the clipped receptive-field image from a prescribed projection direction upon an axis ($\rho$ axis) that intersects said projection direction, and calculating a projection value at each position along the $\rho$ axis;

differentiating means for subjecting the projection value to differentiation processing along the $\rho$ axis;

peak-position detecting means for detecting a peak position ($\rho,\theta$) at a differential value at each position on a $\rho$-$\theta$ plane obtained by successively varying a projection-direction angle $\theta$ incrementally a predetermined amount;

means for extracting a line segment contained in the receptive-field image based upon the peak positions; and means for generating a one-dimensional image representing one of a contour line of the object and an edge between light and dark of the object based on the extracted line segment.

35. An apparatus for extracting a line segment contained in an original image, comprising:

means for inputting an original two-dimensional image of an object;

image clipping means for clipping an image, which conforms to the size of a receptive field defining a small area, from the original two-dimensional image;

edge detection processing means for subjecting the receptive-field image that has been clipped to edge detection processing;

projection-value arithmetic means for projecting an image obtained by the edge detection processing from a prescribed projection direction upon an axis ($\rho$ axis) that intersects said projection direction, calculating a projection value at each position along the $\rho$ axis, and calculating a projection value at each position on a $\rho$-$\theta$ plane by successively varying the projection-direction angle $\theta$ incrementally a predetermined amount;

peak-position detecting means for detecting a peak position ($\rho,\theta$) of the projection value;

means for extracting a line segment contained in the receptive-field image based upon the peak position ($\rho,\theta$); and means for generating a one-dimensional image representing one of a contour line of the object and an edge between light and dark of the object based on the extracted line segment.

* * * * *

UNITED STATES PATENT AND TRADEMARK OFFICE
CERTIFICATE OF CORRECTION

PATENT NO. : 5,422,962
DATED : June 6, 1995
INVENTOR(S) : Yasukawa et al.

It is certified that error appears in the above-indentified patent and that said Letters Patent is hereby corrected as shown below:

Col. 2, line 33, change "a" to --$\underline{a}$--;
    line 34, change "a" to --$\underline{a}$--;
    line 36, change "a" to --$\underline{a}$--.

Col. 7, line 10, change "a" to --$\underline{a}$--;
    line 12, change "a" to --$\underline{a}$--.
Col. 8, line 37, change "10" to --IC--.
Col. 9, lines 3, 45, 47, 49, 60 change "a" to --$\underline{a}$--.
Col. 10, line 5, change "a" to --$\underline{a}$--.
Col. 14, line 2, change "$p\text{ -1,}$" to --$p$-1,--
Col. 15, line 31, change "VMIN" to --$^V$MIN--
    line 50, before "If" start new paragraph.
Col. 16, line 20, in formula change "$\leq$" both occurrences to --$\underline{\leq}$--.
    line 21, delete indentation;
    line 37, change "$\theta$" to --[--;
    line 38, change "a" to --$\underline{a}$--, second occurrence.
    lines 41, 46, 63 change "a" to --$\underline{a}$--.

UNITED STATES PATENT AND TRADEMARK OFFICE
CERTIFICATE OF CORRECTION

PATENT NO. : 5,422,962
DATED : June 6, 1995
INVENTOR(S) : Yasukawa et al.

It is certified that error appears in the above-indentified patent and that said Letters Patent is hereby corrected as shown below:

Col. 17, line 6, change $\leq$" both occurrences to
--$\leq$--.
    line 9, change "a" to --$\underline{a}$--;
    line 16, change $\leq$" both occurrences to
--$\leq$--.
    line 25, after "/" change formula "$p^2$max + $^a{}^2$max" to
--$p$max$^2$ + $^a$max$^2$--;
    line 47, after "/" change contents of formula "$^{x2}$max + $^{ya}$max"
to --x max$^2$ + y max$^2$--.
Col. 18, line 49, change "1holds" to --1 holds--;
    line 52, change "cab" to --can--;
    line 57, after "C" insert --(--, change formula "$^{x2}$max + $^{ya}$max"
to --x max$^2$ + y max$^2$--.
Col. 19, line 56, change "a" to --$\underline{a}$--.
Col. 20, line 8, delete extra spaces;
    lines 43, 53, 54, change "a-axis" to --$\underline{a}$-axis--, each occurrence.
Col. 22, line 6, at end of line, delete " +1-";
    lines 15, 17, 19, 42, change "a" to --$\underline{a}$--, each occurrence.

UNITED STATES PATENT AND TRADEMARK OFFICE
CERTIFICATE OF CORRECTION

PATENT NO. : 5,422,962
DATED : June 6, 1995
INVENTOR(S) : Yasukawa et al.

It is certified that error appears in the above-indentified patent and that said Letters Patent is hereby corrected as shown below:

Col. 24, lines 7, 16, 20, 28, change "a" to --$\underline{a}$--, each occurrence.
Col. 25, line 12, change "92" to --$p$--, change "a" to --$\underline{a}$--.
Col. 26, lines 1, 6, 8, 11, 12, 29, 48, change "a" to --$\underline{a}$--, each occurrence.
Col. 27, line 20, change "a" to --$\underline{a}$--.
Col. 28, lines 27, 31, 46, 48, 50, 54, 55, change "a" to --$\underline{a}$--, each occurrence.
Col. 29, lines 4, 23, change "a" to --$\underline{a}$--.
Col. 30, lines 10, 23, 41, 47, 51, change "a" to --$\underline{a}$--, each occurrence.
Col. 34, line 3, change "$\leq$" to --$\leqq$--
      lines 45, 50, 54 change "a" to --$\underline{a}$--, each occurrence.
Col. 35, line 32, change "a" to --$\underline{a}$--, first occurrence.

Col. 41, lines 16, 18, 19, change "a" to --$\underline{a}$--, each occurrence.
Col. 43, lines 33, 34, change "a" to --$\underline{a}$--, each occurrence.
Col. 44, lines 45, 46, change "a" to --$\underline{a}$--, each occurrence.
Col. 45, line 61, change "a" to --$\underline{a}$--.
Col. 46, line 14, change "a" to --$\underline{a}$--.
Col. 48, line 68, after "object" insert --;--.

Signed and Sealed this

Seventeenth Day of October, 1995

Attest:

BRUCE LEHMAN

*Attesting Officer*     *Commissioner of Patents and Trademarks*